(12) United States Patent
Van Doan et al.

(10) Patent No.: US 7,664,727 B2
(45) Date of Patent: Feb. 16, 2010

(54) METHOD OF CONSTRUCTING PREFERRED VIEWS OF HIERARCHICAL DATA

(75) Inventors: Khanh Phi Van Doan, Noranda (AU); Alison Joan Lennon, Balmain (AU)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 10/570,822

(22) PCT Filed: Nov. 26, 2004

(86) PCT No.: PCT/AU2004/001676
§ 371 (c)(1),
(2), (4) Date: Oct. 16, 2006

(87) PCT Pub. No.: WO2005/052810
PCT Pub. Date: Jun. 9, 2005

(65) Prior Publication Data
US 2007/0073734 A1    Mar. 29, 2007

(30) Foreign Application Priority Data
Nov. 28, 2003    (AU) ............................... 2003906611

(51) Int. Cl.
*G06F 7/00* (2006.01)
*G06F 17/30* (2006.01)
(52) U.S. Cl. .......................................... 707/2; 707/101
(58) Field of Classification Search ........................ None
See application file for complete search history.

(56) References Cited

U.S. PATENT DOCUMENTS

| | | | |
|---|---|---|---|
| 4,325,120 A | * | 4/1982 | Colley et al. ................. 711/202 |
| 6,012,052 A | * | 1/2000 | Altschuler et al. ............. 707/2 |
| 6,058,385 A | * | 5/2000 | Koza et al. ..................... 706/13 |
| 6,986,121 B1 | * | 1/2006 | Boshier et al. .............. 717/108 |
| 7,013,289 B2 | * | 3/2006 | Horn et al. ..................... 705/26 |

(Continued)

FOREIGN PATENT DOCUMENTS

WO    01/24045    4/2001

(Continued)

OTHER PUBLICATIONS

V. Hristidis et al, "Keyword Proximity Search on XML Graphs", Proc. 19th International ConferenceonDataEngineering,Mar. 2003, <http://www.cs.cornell.edu/courses/cs732/2003sp/papers/Hristidis2003.pdf>.

(Continued)

*Primary Examiner*—Jean M Corrielus
*Assistant Examiner*—Angelica Ruiz
(74) *Attorney, Agent, or Firm*—Fitzpatrick, Cella, Harper & Scinto

(57) ABSTRACT

Disclosed is a method of constructing at least one data structure from at least one data source. A representation is constructed of the data source and at least one previous view of the data source. From the representations, at least one compulsory entity (eg. "branch") is then identified. This may generally be performed by a user selection. The method then constructs the data structure comprising the compulsory entity and one or more context entities, where the context entities are obtained from the representation and context data obtained from the previous view. Typically the data source is hierarchical and the data structure is hierarchical.

22 Claims, 35 Drawing Sheets

U.S. PATENT DOCUMENTS

| | | | |
|---|---|---|---|
| 7,017,162 B2* | 3/2006 | Smith et al. | 719/328 |
| 7,043,716 B2* | 5/2006 | Zimmer et al. | 717/107 |
| 7,065,250 B1 | 6/2006 | Lennon | 382/224 |
| 7,099,946 B2 | 8/2006 | Lennon et al. | 709/227 |
| 7,158,983 B2* | 1/2007 | Willse et al. | 707/101 |
| 7,181,438 B1* | 2/2007 | Szabo | 707/2 |
| 7,251,637 B1* | 7/2007 | Caid et al. | 706/15 |
| 2002/0032672 A1* | 3/2002 | Keith, Jr. | 707/2 |
| 2002/0035555 A1* | 3/2002 | Wheeler et al. | 707/1 |
| 2002/0055955 A1 | 5/2002 | Lloyd-Jones et al. | 707/512 |
| 2002/0059204 A1* | 5/2002 | Harris | 707/3 |
| 2002/0065857 A1* | 5/2002 | Michalewicz et al. | 707/532 |
| 2003/0051226 A1* | 3/2003 | Zimmer et al. | 717/102 |
| 2003/0101169 A1* | 5/2003 | Bhatt et al. | 707/3 |
| 2003/0101187 A1* | 5/2003 | Gaussier et al. | 707/100 |
| 2003/0212664 A1* | 11/2003 | Breining et al. | 707/3 |
| 2004/0015783 A1 | 1/2004 | Lennon et al. | 715/523 |
| 2004/0059705 A1* | 3/2004 | Wittke et al. | 707/1 |
| 2004/0059736 A1* | 3/2004 | Willse et al. | 707/100 |
| 2004/0234995 A1* | 11/2004 | Musick et al. | 435/6 |
| 2005/0138109 A1* | 6/2005 | Redlich et al. | 709/201 |
| 2005/0138110 A1* | 6/2005 | Redlich et al. | 709/201 |
| 2005/0289168 A1* | 12/2005 | Green et al. | 707/101 |
| 2006/0020586 A1* | 1/2006 | Prompt et al. | 707/3 |
| 2006/0107251 A1* | 5/2006 | Boshier et al. | 717/108 |
| 2006/0149719 A1* | 7/2006 | Harris | 707/3 |
| 2007/0112714 A1* | 5/2007 | Fairweather | 706/46 |
| 2007/0156677 A1* | 7/2007 | Szabo | 707/5 |

FOREIGN PATENT DOCUMENTS

WO     02/27544     4/2002

OTHER PUBLICATIONS

S. Cohen et al, "XSEarch: A Semantic Search Engine for XML", Proc. 29th International Conference on Very Large Databases, Sep. 2003, <http://www.vldb.org/conf/2003/papers/S03P02.pdf>.

L. Guo et al, "XRANK: Ranked Keyword Search over XML Documents", Proc. 2003 ACM SIGMOD International Conference on Management of Data, pp. 16-27, Jun. 2003 <http://www.cs.cornell.edu/People/jai/papers/XRank.pdf>.

D. Florescu et al, "Integrating Keyword Search into XML Query Processing", Proc. 9th International World Wide Web Conference on Computer Networks, pp. 119-135, 2000 <http://www.cs.cornell.edu/courses/cs732/2003sp/papers/Florescu2000.pdf>.

Hristidis, V. and Papakonstantinou, Y., "DISCOVER: Keyword Search in Relational Databases", Proceedings of the 28th VLDB Conference, Hong Kong, China, 2002.

* cited by examiner

General case $P_j$ lying along path to hit node

| X | freq(X) |
|---|---|
| 1 | 2 |
| 2 | 2 |
| 3 | 2 |
| 4 | 1 |
| 5 | 1 |
| 6 | 2 |
| 7 | 2 |
| 8 | 1 |
| 9 | 1 |
| 10 | 1 |
| 11 | 1 |
| 12 | 1 |
| 13 | 1 |
| 14 | 1 |
| 15 | 1 |
| 16 | 1 |
| 17 | 1 |
| 18 | 1 |
| 19 | 1 |
| 20 | 1 |
| 21 | 1 |
| 22 | 1 |

27000

*freq(Y$_i$, X)*

28000

| X | \ Y$_i$ 1 | 3 | 8 | 9 | 10 |
|---|---|---|---|---|---|
| 2 | 2 | | | | |
| 3 | 1 | | | | |
| 4 | 1 | | | | |
| 5 | 1 | | | | |
| 6 | 1 | 2 | | | |
| 7 | 1 | 2 | | | |
| 8 | 1 | 1 | | | |
| 9 | 1 | 1 | | | |
| 10 | 0 | 1 | | | |
| 11 | 1 | 1 | 1 | | |
| 12 | 1 | 1 | 1 | | |
| 13 | 1 | 1 | 1 | | |
| 14 | 1 | 1 | 1 | | |
| 15 | 1 | 1 | | 1 | |
| 16 | 1 | 1 | | 1 | |
| 17 | 1 | 1 | | 1 | |
| 18 | 0 | 1 | | | 1 |
| 19 | 0 | 1 | | | 1 |
| 20 | 0 | 1 | | | 1 |
| 21 | 0 | 1 | | | 1 |
| 22 | 0 | 1 | | | 1 |

*freq(Y$_i$, P$_j$ leaf)*

29000

| P$_j$ | \ Y$_i$ 1 | 3 |
|---|---|---|
| 3 | 0 | |
| 8 | 0 | 0 |
| 9 | 0 | 0 |
| 10 | 0 | 0 |

Fig. 29

*freq(P$_j$ has 1 child, X)*

| X | _____ P$_j$ _____ | | | | |
|---|---|---|---|---|---|
|  | 1 | 3 | 8 | 9 | 10 |
| 2 | 0 |   |   |   |   |
| 3 | 0 |   |   |   |   |
| 4 | 0 |   |   |   |   |
| 5 | 0 |   |   |   |   |
| 6 | 0 | 0 |   |   |   |
| 7 | 0 | 0 |   |   |   |
| 8 | 0 | 0 |   |   |   |
| 9 | 0 | 0 |   |   |   |
| 10 | 0 | 0 |   |   |   |
| 11 | 0 | 0 | 0 |   |   |
| 12 | 0 | 0 | 0 |   |   |
| 13 | 0 | 0 | 0 |   |   |
| 14 | 0 | 0 | 0 |   |   |
| 15 | 0 | 0 |   | 0 |   |
| 16 | 0 | 0 |   | 0 |   |
| 17 | 0 | 0 |   | 0 |   |
| 18 | 0 | 0 |   |   | 0 |
| 19 | 0 | 0 |   |   | 0 |
| 20 | 0 | 0 |   |   | 0 |
| 21 | 0 | 0 |   |   | 0 |
| 22 | 0 | 0 |   |   | 0 |

$freq(C_k, P_j, X): P_j =$ node 1

31000

| X | $C_k$ | | | |
|---|---|---|---|---|
| | 2 | 3 | 4 | 5 |
| 2 |   | 1 | 1 | 1 |
| 3 | 1 |   | 0 | 0 |
| 4 | 1 | 0 |   | 1 |
| 5 | 1 | 0 | 1 |   |
| 6 | 1 |   | 0 | 0 |
| 7 | 1 |   | 0 | 0 |
| 8 | 1 |   | 0 | 0 |
| 9 | 1 |   | 0 | 0 |
| 10 | 0 |   | 0 | 0 |
| 11 | 1 |   | 0 | 0 |
| 12 | 1 |   | 0 | 0 |
| 13 | 1 |   | 0 | 0 |
| 14 | 1 |   | 0 | 0 |
| 15 | 1 |   | 0 | 0 |
| 16 | 1 |   | 0 | 0 |
| 17 | 1 |   | 0 | 0 |
| 18 | 0 |   | 0 | 0 |
| 19 | 0 |   | 0 | 0 |
| 20 | 0 |   | 0 | 0 |
| 21 | 0 |   | 0 | 0 |
| 22 | 0 |   | 0 | 0 |

Fig. 31

$freq(C_k, P_j, X): P_j =$ node 3

|   | \multicolumn{5}{c}{$C_k$} | |   |   |   |
|---|---|---|---|---|---|
| $X$ | 6 | 7 | 8 | 9 | 10 |
| 6 |   | 2 | 1 | 1 | 1 |
| 7 | 2 |   | 1 | 1 | 1 |
| 8 | 1 | 1 |   | 1 | 0 |
| 9 | 1 | 1 | 1 |   | 0 |
| 10 | 1 | 1 | 0 | 0 |   |
| 11 | 1 | 1 |   | 1 | 0 |
| 12 | 1 | 1 |   | 1 | 0 |
| 13 | 1 | 1 |   | 1 | 0 |
| 14 | 1 | 1 |   | 1 | 0 |
| 15 | 1 | 1 | 1 |   | 0 |
| 16 | 1 | 1 | 1 |   | 0 |
| 17 | 1 | 1 | 1 |   | 0 |
| 18 | 1 | 1 | 0 | 0 |   |
| 19 | 1 | 1 | 0 | 0 |   |
| 20 | 1 | 1 | 0 | 0 |   |
| 21 | 1 | 1 | 0 | 0 |   |
| 22 | 1 | 1 | 0 | 0 |   |

$freq(C_k, P_j, X): P_j = $ node 8       33000

| $X$ | $C_k$ | | | |
|---|---|---|---|---|
|  | 11 | 12 | 13 | 14 |
| 11 |  | 1 | 1 | 1 |
| 12 | 1 |  | 1 | 1 |
| 13 | 1 | 1 |  | 1 |
| 14 | 1 | 1 | 1 |  |

Fig. 33

$freq(C_k, P_j, X): P_j = $ node 9       34000

| $X$ | $C_k$ | | |
|---|---|---|---|
|  | 15 | 16 | 17 |
| 15 |  | 1 | 1 |
| 16 | 1 |  | 1 |
| 17 | 1 | 1 |  |

Fig. 34

$freq(C_k, P_j, X): P_j = $ node 10      35000

| $X$ | $C_k$ | | | | |
|---|---|---|---|---|---|
|  | 18 | 19 | 20 | 21 | 22 |
| 18 |  | 1 | 1 | 1 | 1 |
| 19 | 1 |  | 1 | 1 | 1 |
| 20 | 1 | 1 |  | 1 | 1 |
| 21 | 1 | 1 | 1 |  | 1 |
| 22 | 1 | 1 | 1 | 1 |  |

Fig. 35

METHOD OF CONSTRUCTING PREFERRED VIEWS OF HIERARCHICAL DATA

COPYRIGHT NOTICE

This patent specification contains material that is subject to copyright protection. The copyright owner has no objection to the reproduction of this patent specification or related materials from associated patent office files for the purposes of review, but otherwise reserves all copyright whatsoever.

TECHNICAL FIELD OF THE INVENTION

The present invention relates to the general field of information retrieval and, in particular, to the automatic identification and retrieval of relevant data from large hierarchical data sources.

BACKGROUND

Extensible Markup Language (XML) is increasingly becoming a popular hierarchical format for storing and exchanging information. Whilst the hierarchical nature of XML makes it an excellent means for capturing relationships between data objects, it also makes keyword searching more difficult.

Keyword searching is of particular importance when dealing with a structured data format such as XML because it allows the user to locate particular keywords quickly without the need to know the internal structure of the data. It is a challenge when working with XML because there is no optimal or clearly preferred method for presenting the result of a keyword search. In the traditional unstructured text environment, the data system typically presents the user with the located keywords together with other text in their vicinity. If there are more than one 'hit', then the neighbouring text provides a useful context for distinguishing between hits, thereby allowing the user to quickly select the most relevant hit according to user's needs.

In the structured XML environment, there is no clear concept of 'neighbouring data' since data that are related to one another may reside at several disjoint locations within an XML document. Thus it is difficult to identify or construct a suitable context for a hit in a keyword search. Consequently, most existing XML based systems simply return an entire XML document (out of a collection of XML documents) if a keyword hit occurs within the document, with the entire document effectively serving as the context for the hit. This is undesirable when documents are large and the user is not interested in seeing all of their contents.

Practical data sources, especially databases, often contain much more data than a user typically wants to see at any one time. For example, a database in a mail order store may contain details about all of its product lines, customers, suppliers, couriers, and lists of past and pending orders. A store clerk may at one time wish to see the current stock level for a particular product, and at another time may want to check the status of an order for a customer. A store manager on the other hand may wish to see the variation of the total sales for a particular product line over a number of months. In each of these cases it would be too distracting to the user if an avalanche of additional irrelevant data were to be also presented. Further, unless the user is familiar with the structure of the database, the user would typically be unable to identify information about which the user has an interest.

The traditional method for providing only relevant data is through the use of pre-created "views", prepared by someone who is familiar with the structure of the data source, such as a system administrator. Each view draws together some subset of the data source and is tailored for a distinct purpose. In the previously given examples, the store clerk would consult a "stock level" view or an "order status" view, whilst the manager would bring up a "sales" view.

Whilst this approach of using pre-created views may be satisfactory when all likely usage scenarios can be anticipated, it is inadequate for keyword searching. In a keyword search operation, a user enters one or more keywords and the system responds with a data set or view that includes occurrences of all keywords (assuming an AND Boolean keyword search operation). In a hierarchical environment such as XML, keyword hits may occur in several data items residing at different locations in the hierarchy. Since it is not feasible to anticipate all possible keyword combinations that a user may provide, it is not possible to pre-determine where in the hierarchy hits will occur. Consequently it is not possible to provide pre-created views that will cater for all search scenarios.

An analogous keyword searching problem also exists in the relational database environment. A relational database comprises tables joined through their primary and foreign keys, where each table comprises a plurality of rows each denoting an n-tuple of attribute values for some entity. A traditional solution to keyword searching in a relational database, described by Hristidis, V. and Papakonstantinou, Y., "DISCOVER: Keyword Search in Relational Databases", *Proceedings of the* 28*th VLDB Conference,* 2002, is to return a minimal joining network, which is the smallest network of joined rows across joined tables that contain all keyword hits. A problem with this approach is that it effectively treats rows as the smallest data "chunks" in that if a keyword hit occurs any where in a row of a database table then the entire row is returned as context for the hit. This may lead to excessive amounts of data being presented to the user since a typical relational database table often contains many columns that are not usually of interest to the user.

Further, adapting the above technique to hierarchical data structures such as XML may result in insufficient context information. In a hierarchical environment, related data may be stored at different levels in the hierarchy, and thus often data stored in a parent or ancestor node or their children may provide very useful context for a keyword hit, even though these may not be included in the minimal data set.

some attempts have been made to address the keyword searching problem in hierarchical data. Florescu, D. et al, "integrating Keyword Search into XML Query Processing", *Ninth International World Wide Web Conference,* May 2000, discloses a method of augmenting a structural query language with a keyword searching operator contains. This operator evaluates to TRUE if a specified sub-tree contains some specified keywords. The user can use this operator when constructing queries to filter out unwanted data. Whilst this useful feature does not require the user to specify the exact location of hit keywords within a given sub-tree, it does not go far enough since the user is still required to specify the exact format of the returned data in the search query and hence the user would still need to be familiar with the structure of the data source. In other words, free-text keyword searching is still not possible, unless the user is willing to accept an entire data source as a result of the search.

Another existing approach to keyword searching in an XML data source requires the user to select from a given list of schema elements, the element representing the root node of the returned data. If a keyword hit occurs in a descendant node of a data element represented by the selected schema element, then the entire sub-tree below the data element, containing the hit keyword, is returned to the user. This approach is cumbersome because it requires user interventions. Furthermore, the user is forced to accept an entire sub-tree even though it may contain data not of interest to the user.

Accordingly, there is a need for a method for determining a set of relevant data in a hierarchical data environment in response to a keyword search operation involving arbitrary combinations of keywords that does not require user interventions or prior user knowledge of the structure of the hierarchical data.

SUMMARY

It is an object of the present invention to substantially overcome, or at least ameliorate, one or more disadvantages of existing methods.

In accordance with one aspect of the present invention, there is disclosed a method of presenting data from at least one data source, said method comprising the steps of:
(i) holding a representation of said least one data source and at least one previous view of said least one data source;
(ii) identifying at least one compulsory entity in said representation; and
(iii) presenting data structure said least one compulsory entity and one or more context entities, where said context entities are obtained from said representation and context data obtained from said least one previous view.

More specifically disclosed is a method of constructing at least one data structure from at least one data source, said method comprising the steps of:
(i) constructing a representation of said least one data source and at least one previous view of said least one data source;
(ii) identifying at least one compulsory entity in said representation; and
(iii) constructing said at least one data structure comprising said least one compulsory entity and one or more context entities, where said context entities are obtained from said representation and context data obtained from said least one previous view.

Typically one or both of the data sources and the data structures are hierarchical.

In accordance with another aspect of the present invention, there is disclosed a method of selecting data from a data source, said method comprising the steps of
(i) forming a graphical representation of said data source;
(ii) detecting a user selection of part of said representation;
(iii) selecting a set of components in said user-selected part based on an occurrence probability of said set of components given a component of said user-selected part.

In accordance with another aspect of the present invention, there is disclosed a method of construction and presentation of data for a keyword searching operation in at least one data source involving at least one search keyword, said method comprising the steps of:
(i) constructing a graphical representation of said least one data source and at least one previous view of said least one data source;
(ii) identifying at least one compulsory entity in said graphical representation, where said compulsory entity is a node in said graphical representation representing a location of one or more said least one search keyword;
(iii) constructing at least one data structure comprising said least one compulsory entity and one or more context entities, where said context entities are obtained from said graphical representation and context data obtained from said least one previous view; and
(iv) presenting said least one data structure as result of said keyword searching operation.

In accordance with another aspect of the present invention, there is disclosed a method of presentation of data sourced from a sub-tree of a hierarchically-presented data, said method comprising the steps of
(i) selecting a set of descendant nodes in said sub-tree based on context data obtained from at least one previous presentation of said hierarchically-presented data; and
(ii) constructing and presenting a hierarchical data structure comprising a root node of said sub-tree and said selected set of descendant nodes.

Other aspects of the present invention, including apparatus and computer media, are also disclosed.

BRIEF DESCRIPTION OF THE DRAWINGS

At least one embodiment of the present invention will now be described with reference to the drawings in which:

FIG. 28 is a co-occurrence frequency table arising from the data views in FIGS. 24, 25 and 26;

FIG. 29 is a leaf co-occurrence frequency table arising from the data views in FIGS. 24, 25 and 26;

FIG. 30 is a sole child co-occurrence frequency table arising from the data views in FIGS. 24, 25 and 26;

FIG. 31 is a portion of a joint-occurrence frequency table arising from the data views in FIGS. 24, 25 and 26;

FIG. 32 is another portion of a joint-occurrence frequency table arising from the data views in FIGS. 24, 25 and 26;

FIG. 33 is yet another portion of a joint-occurrence frequency table arising from the data views in FIGS. 24, 25 and 26;

FIG. 34 is yet another portion of a joint-occurrence frequency table arising from the data views in FIGS. 24, 25 and 26;

FIG. 35 is yet another portion of a joint-occurrence frequency table arising from the data views in FIGS. 24, 25 and 26;

DETAILED DESCRIPTION INCLUDING BEST MODE

Figure 1:
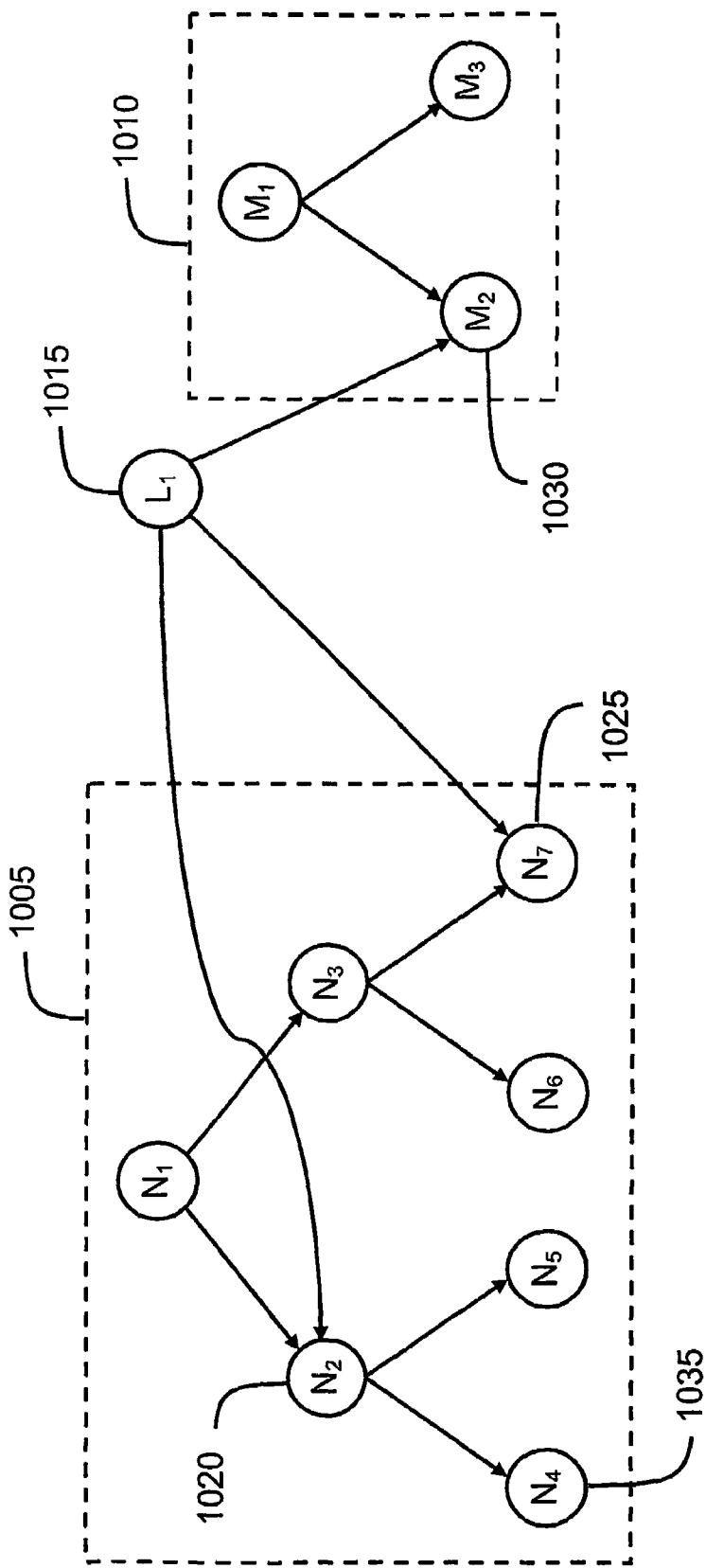
FIG. 1 is an example schema graph.

The present disclosure provides a method for determining a set of relevant data in a hierarchical data environment in response to a keyword search operation involving one or more keywords. A preferred implementation includes a Bayesian probabilistic based method that constructs preferred views of data in a hierarchical data structure based on how data is accessed in past episodes. More specifically, the method makes use of the frequencies of past joint-occurrences between pairs and vectors of data items to compute the probability that a data item is relevant to some other compulsory data items. Typically, the compulsory data items are those containing keyword hits, and thus must be returned to the user in the keyword search results. If a non-compulsory data item has a high probability of being relevant to a compulsory data item, then it is likely to be returned in the search results to serve as context for the keyword hits.

A distinguishing feature of the presently disclosed arrangements with respect to traditional pre-created view based approaches is that the former is able to synthesise new views, rather than merely returning an existing stored view. Such arrangements are thus able to handle keyword search operations involving arbitrary keyword combinations, and since views are dynamically generated, they can be better tailored to individual operations than those obtained from a fixed pool of pre-created views.

The presently disclosed methods typically construct a number of alternative views, and assign a score for each view, signifying how much the view may be of interest to the user. In one implementation, a single view that has the highest score among those constructed is returned to the user. In an alternative implementation, a list of views is returned, sorted according to their scores, from highest to lowest.

Although keyword searching is its primary motivation, the presently disclosed methods can also be used to enhance a method of presentation of hierarchical data, such as that described in Australian Patent Application No. 2003204824 filed 19 Jun. 2003 and corresponding U.S. patent application Ser. No. 10/465,222 filed 20 Jun. 2003, both entitled "Methods for Interactively Defining Transforms and for Generating Queries by Manipulating Existing Query Data. In that publication, a method for selecting the most appropriate presentation type (such as tables, graphs, plots, tree, etc . . . ) based on the structure and contents of a hierarchical data source is disclosed. That method can be enhanced by incorporating a preferred implementation of the present disclosure as a means for automatically selecting a most preferred subset of the data source for display, prior to the selection of presentation type. It is often useful to display only a preferred subset of data in this way since hierarchical data sources often contain more information than what would normally be of interest to the user, and hence a method for filtering out 'uninteresting' data such as the preferred embodiment of the present invention can help to make the user's experience more satisfying and productive.

some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities. Unless specifically stated otherwise, and as apparent from the following, it will be appreciated that throughout the present specification, discussions utilizing terms such as "scanning", "calculating", "determining", "replacing", "generating" "initializing", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also discloses a computer readable medium comprising a computer program for performing the operations of the methods. The computer readable medium is taken herein to include any transmission medium for communicating the computer program between a source and a designation. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not intended to be limited to any particular programming language and implementation thereof. It will be appreciated that a variety of programming languages and coding thereof may be used to implement the teachings of the disclosure contained herein.

Where reference is made in any one or more of the accompanying drawings to steps and/or features, which have the same reference numerals, those steps and/or features have for the purposes of this description the same function(s) or operation(s), unless the contrary intention appears.

Figure 36:
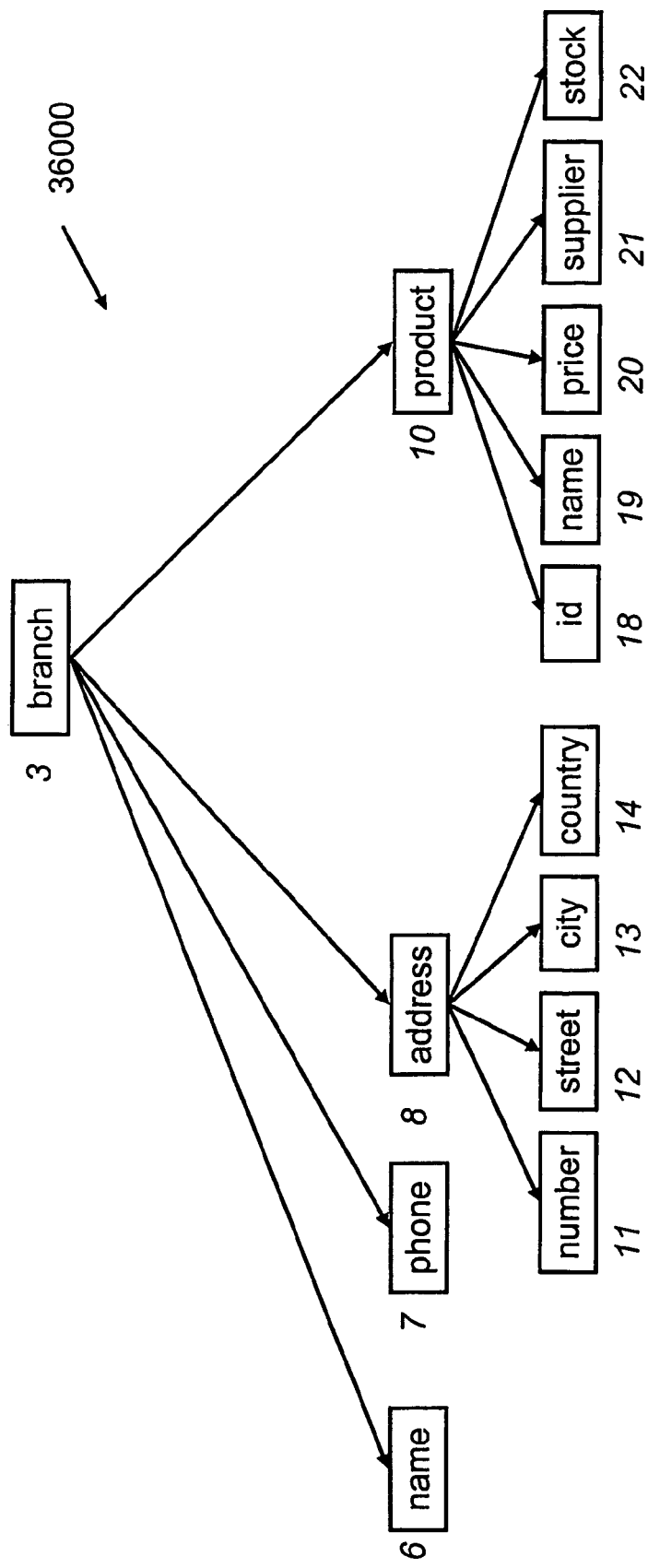
FIG. 36 is the schema graph of a context tree returned as a result of a keyword search operation involving two keywords.
Figure 37:
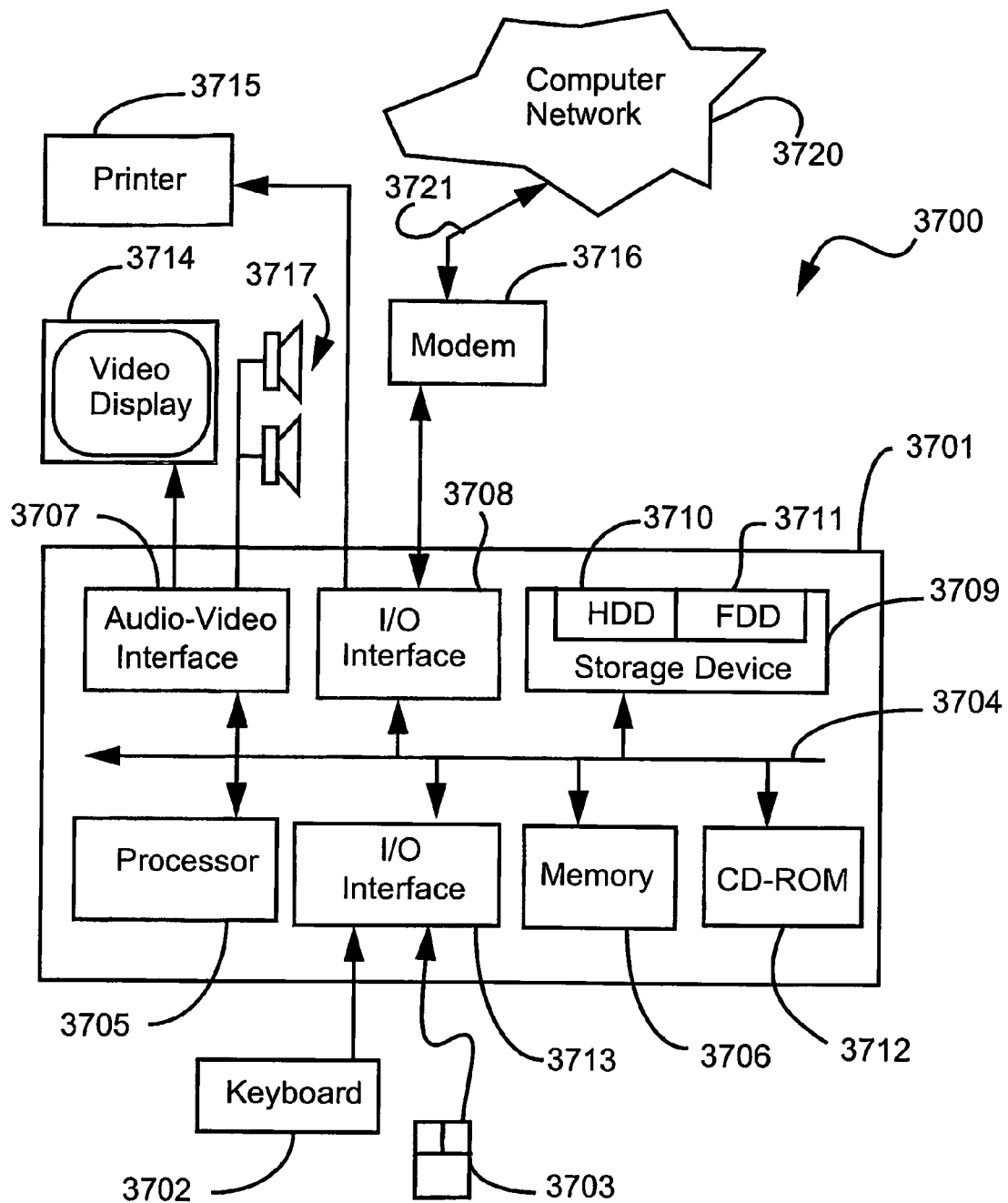
FIG. 37 is a schematic block diagram of a general purpose computer upon which the arrangements described may be practiced.
Figure 38:
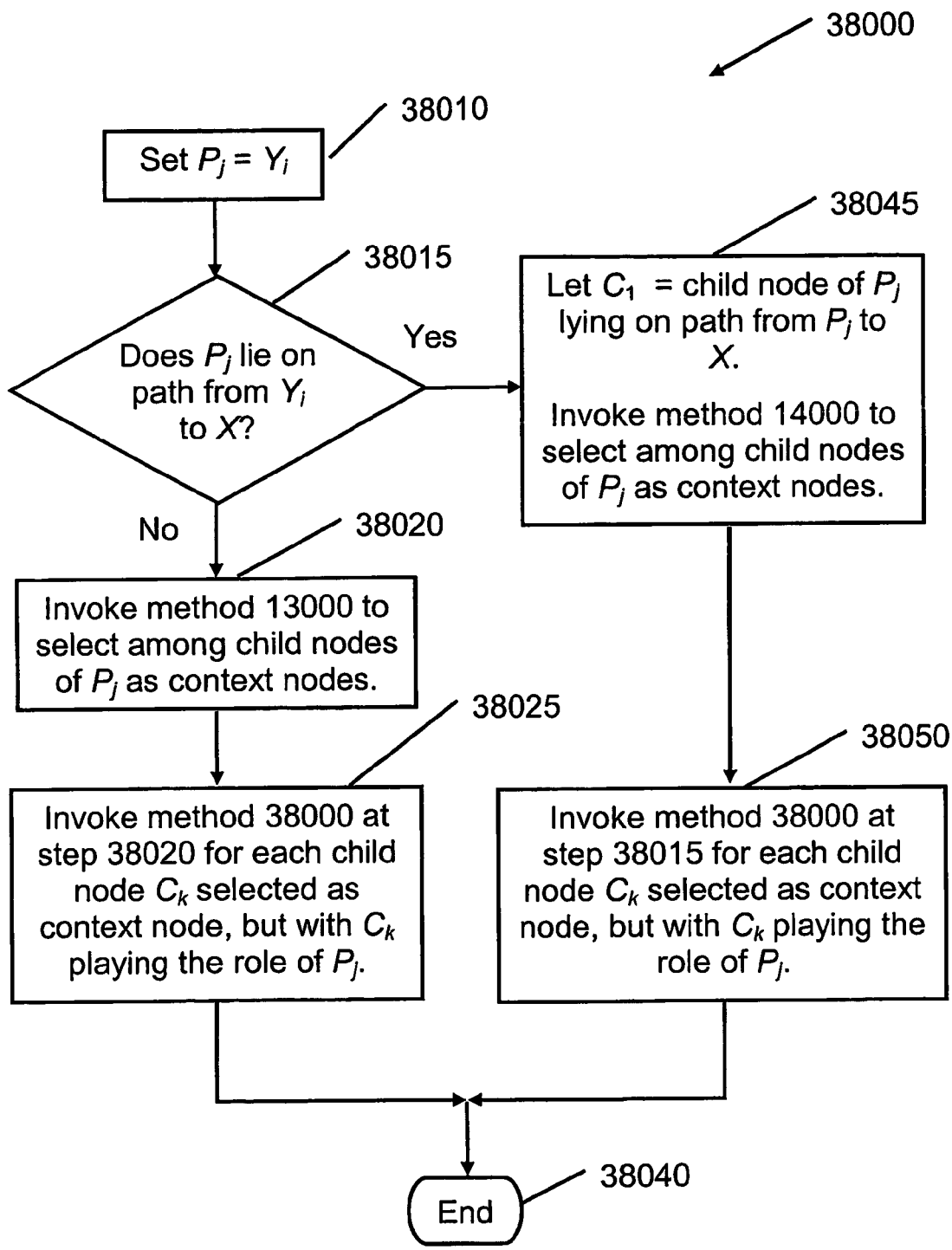
FIG. 38 is a flowchart of a sub-process within the method for constructing context trees for cases involving a single hit node depicted in FIG. 19.
Figure 39:
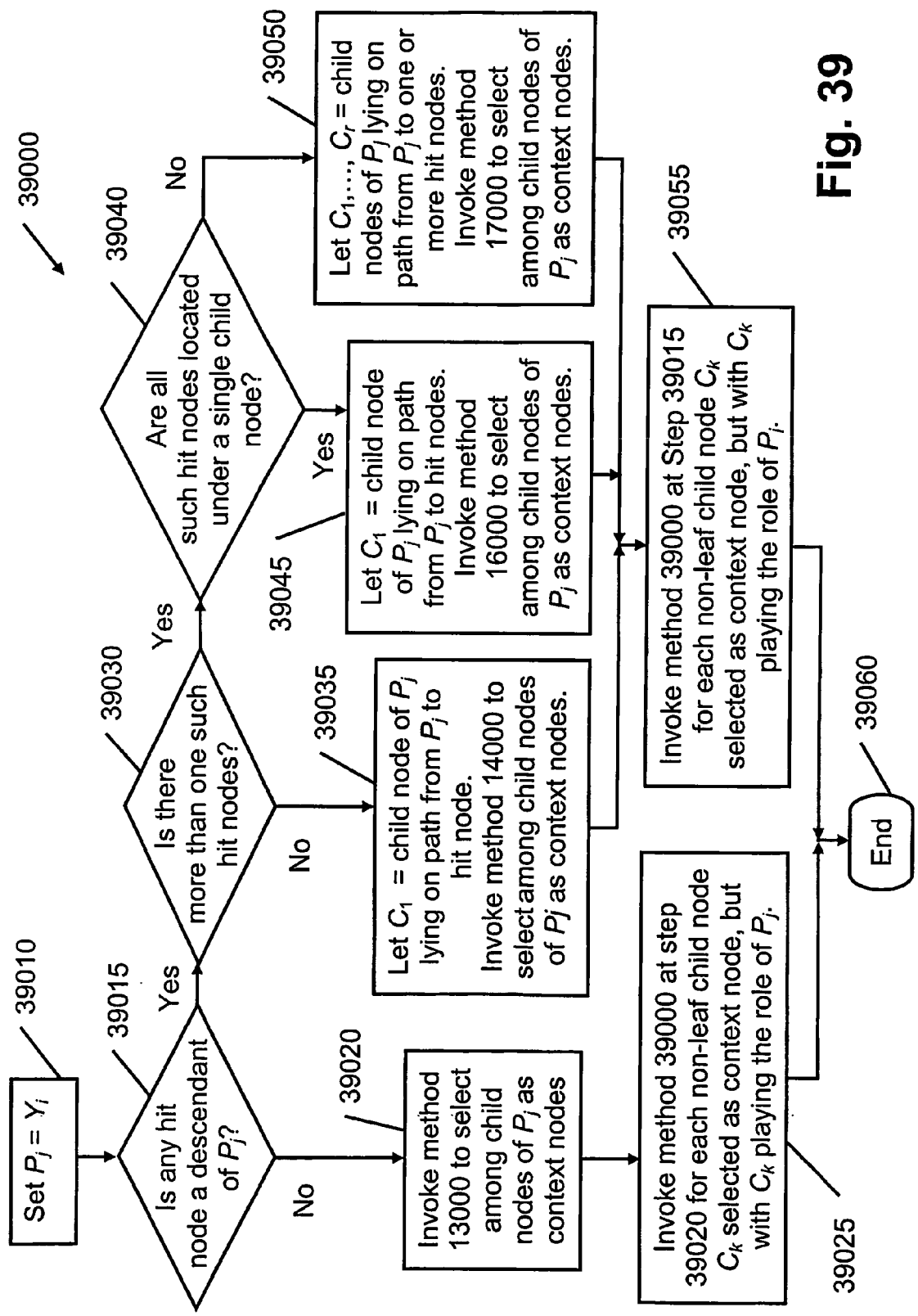
FIG. 39 is a flowchart of a sub-process within the method for constructing context trees for cases involving multiple hit nodes depicted in FIG. 20.

The methods of keyword searching in general, and hierarchical data structure construction in particular, are preferably practiced using a general-purpose computer system 3700, such as that shown in FIG. 37 wherein the processes of FIGS. 1 to 36 may be implemented as software, such as an application program executing within the computer system 3700. In particular, the steps of keyword searching are effected by instructions in the software that are carried out by the computer. The instructions may be formed as one or more code modules, each for performing one or more particular tasks. The software may also be divided into two separate parts, in which a first part performs the searching methods and a second part manages a user interface between the first part and the user. The software may then be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for keyword searching and hierarchical data structure construction.

The computer system 3700 is formed by a computer module 3701, input devices such as a keyboard 3702 and mouse 3703, output devices including a printer 3715, a display device 3714 and loudspeakers 3717. A Modulator-Demodulator (Modem) transceiver device 3716 is used by the computer module 3701 for communicating to and from a communications network 3720, for example connectable via a telephone line 3721 or other functional medium. The modem 3716 can be used to obtain access to the Internet, and other network systems, such as a Local Area Network (LAN) or a Wide Area Network (WAN), and may be incorporated into the computer module 3701 in some implementations.

The computer module 3701 typically includes at least one processor unit 3705, and a memory unit 3706, for example formed from semiconductor random access memory (RAM) and read only memory (ROM). The module 3701 also includes an number of input/output (I/O) interfaces including an audio-video interface 3707 that couples to the video display 3714 and loudspeakers 3717, an I/O interface 3713 for the keyboard 3702 and mouse 3703 and optionally a joystick (not illustrated), and an interface 3708 for the modem 3716 and printer 3715. In some implementations, the modem 3716 may be incorporated within the computer module 3701, for example within the interface 3708. A storage device 3709 is provided and typically includes a hard disk drive 3710 and a floppy disk drive 3711. A magnetic tape drive (not illustrated) may also be used. A CD-ROM drive 3712 is typically provided as a non-volatile source of data. The components 3705 to 3713 of the computer module 3701, typically communicate via an interconnected bus 3704 and in a manner which results in a conventional mode of operation of the computer system 3700 known to those in the relevant art. Examples of computers on which the described arrangements can be practised include IBM-PC's and compatibles, Sun Sparcstations or alike computer systems evolved therefrom.

Typically, the application program is resident on the hard disk drive 3710 and read and controlled in its execution by the processor 3705. Intermediate storage of the program and any data fetched from the network 3720 may be accomplished using the semiconductor memory 3706, possibly in concert with the hard disk drive 3710. In some instances, the application program may be supplied to the user encoded on a CD-ROM or floppy disk and read via the corresponding drive 3712 or 3711, or alternatively may be read by the user from the network 3720 via the modem device 3716. Still further, the software can also be loaded into the computer system 3700 from other computer readable media. The term "computer readable medium" as used herein refers to any storage or transmission medium that participates in providing instructions and/or data to the computer system 3700 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 3701. Examples of transmission media include radio or infra-red transmission channels as well as a network connection to another computer or networked device, and the Internet or Intranets including e-mail transmissions and information recorded on Websites and the like.

Keyword searching in a hierarchical environment comprises identifying the nodes or elements in the hierarchical data structure where the keyword or keywords occur and then determining what other data elements are relevant to the keywords. In a typical keyword searching scenario, the resulting data presented to the user is a second hierarchical data structure extracted from the first data structure and containing all or some of the search keywords and other data considered to be relevant to these keywords. Such a hierarchical data structure presented to the user as a result of the keyword search operation is referred to as a context tree.

When the hierarchical data being searched has a governing schema, as is often is the case with XML, it is generally advantageous to employ a method for identifying relevant data that operates at the schema level. That is, elements within the schema representation are analysed to determine whether they are relevant to the search keywords. All instances of data items in the data source collectively represented by the relevant schema elements are then returned to the user as the result of the keyword search operation. In XML the governing schema can be in the form of an XML Schema, which itself is another hierarchical data structure. An XML Schema specifies the structure of the associated XML data, the list of elements and attributes in the XML data and their parent-child relationships. Since each element or attribute in an XML Schema typically represents many instances of elements and attributes in the XML data, an XML Schema is potentially a much smaller data structure and hence can be analysed more efficiently.

It is often desirable to search for keywords in more than one hierarchical data source. Although each hierarchical data source on its own is tree-structured, when multiple data sources are considered together the resulting data structure may take on a more general form. One such form that invariably arises in a database environment is illustrated in FIG. 1. This structure essentially comprises a number of trees with shared nodes, where each tree represents the schema of a distinct hierarchical data source and the shared nodes are the result of data views whose contents span multiple data sources. Specifically the dotted boxes 1005 and 1010 in FIG. 1 denote the schemas of a first and second data source respectively, and node 1015 is the root node of a data view that brings together nodes 1020 and 1025 from the first data source and node 1030 from the second data source. The multiple shared-tree structure in the FIG. 1, referred herein as a schema graph, is a special form of a directed acyclic graph with an important characteristic that there is at most a single directed path between any two nodes. For example, there is only one directed path from node 1015 to node 1035 and this path passes through node 1020.

The schema graph is preferably constructed prior to a keyword searching operation and is made up of the initially disjoint individual tree-structured schemas of the hierarchical data sources. These schema trees are then joined when a data view is created that spans more than one data source. A data view typically comprises a query (such as an XQuery in an XML environment) and may be created by a database administrator or user.

In either case, the database system preferably logs or records these queries in its storage device. During the construction of the schema graph, a schema representation of each logged query is created and inserted into the schema graph. This results in a joining of two or more separate schema trees if the schema being inserted contains nodes from these trees, as illustrated in FIG. 1. It is also possible that the schema being inserted into the schema graph contains nodes from only one data source, in which case a joining of separate schema trees does not arise. Instead the insertion operation simply results in new nodes being added and linked to existing nodes from a single schema tree in the schema graph.

The schema graph may be updated continually as new queries are logged, or it may be updated on one or more occasions after new queries and data views have been collected over some period of time. Regardless of how often the schema graph is updated, when a keyword search operation is initiated, the schema graph current at the time of the operation is the one that is used to determine data views that are returned to the user. For the remainder of this document, the term "schema graph" refers to the schema graph that is current at the time a keyword search operation is performed.

As in the case of a single data source, keyword searching within multiple hierarchical data sources involves first identifying nodes within the schema graph where the search keywords are found, referred to as "hit" nodes, and then identifying nodes that are relevant to the hit nodes, referred to as "context" nodes. A data structure comprising the hit and context nodes is then constructed and presented to the user. Since hit nodes can be located in more than one data source, the resulting data structure presented to the user may span multiple data sources. The resulting data structure is preferably also tree-structured since its intended applications are in hierarchical data environments.

Figure 4:
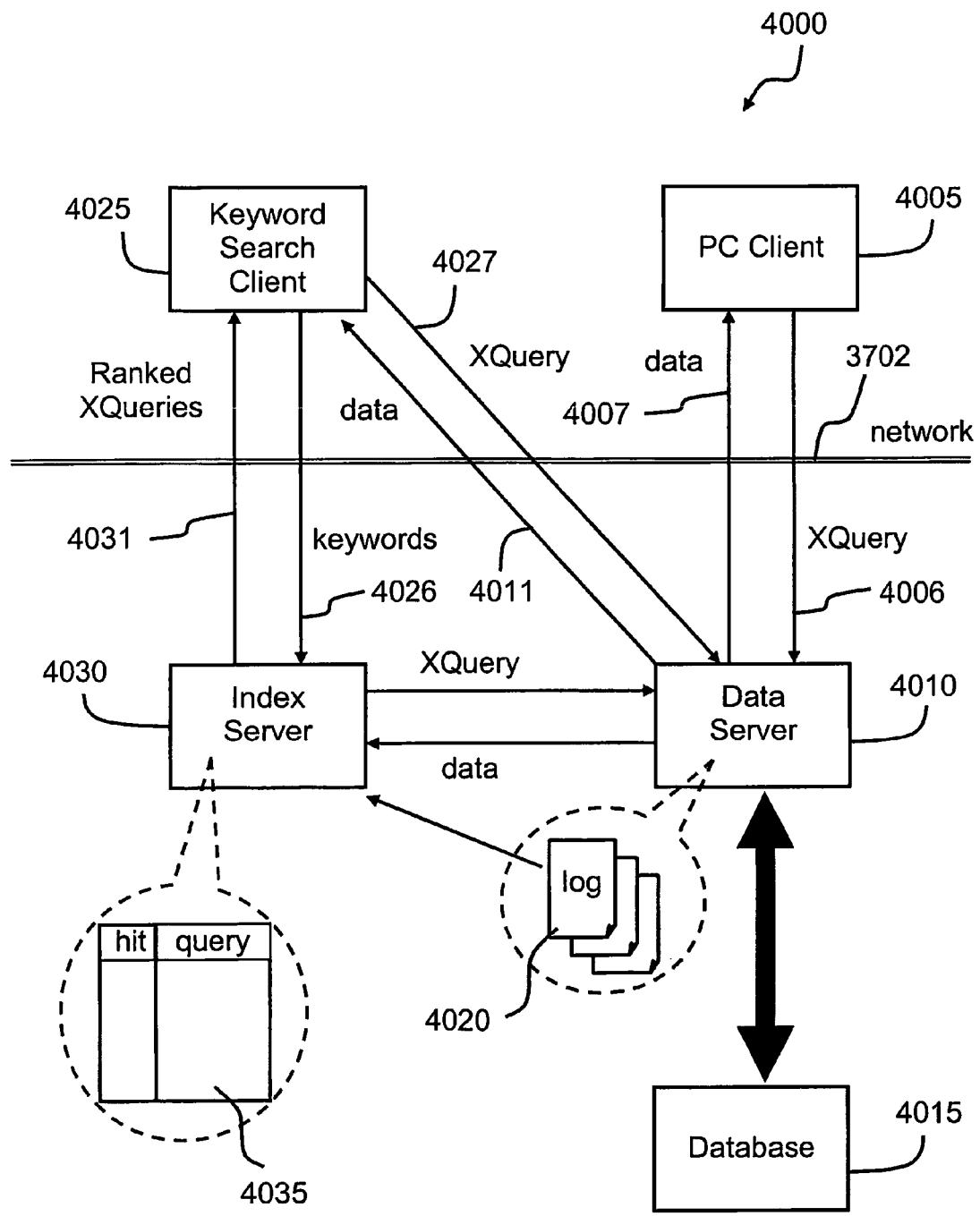
FIG. 4 is a diagram of a network of server and client computers.

FIG. 4 shows a preferred configuration 4000 and generalised mode of operation of the keyword searching methods. The configuration 4000 comprises a PC client 4005, a data server 4010, a database 4015, a keyword search client 4025, and an index server 4030 connected together in a network.

Each of the devices 4005, 4010, 4025 and 4030 is typically formed by a corresponding general purpose computer system, such as the system 3700, each linked by the network 3720, which is only illustrated conceptually in FIG. 4. This conceptual illustration is used to provide for an uncluttered representation of data flows between the various devices 4005, 4010, 4025 and 4030, and which occur across the network 3720. When necessary, appropriate or convenient, the various devices 4005, 4010, 4025 and 4030 may be combined into a smaller number of distinct computer systems 3700. For example, in some implementations, it may be convenient to combine the servers 4010 and 4030 into one computer system 3700, and combine the clients 4005 and 4025 into another computer system 3700, those systems 3700 being linked by the network 3720.

Data stored in the database 4015 is typically accessed by a user browsing at the PC client 4005. A browsing application, operating in the client 4005 issues commands preferably in the form of XQueries 4006 which are then transmitted to the data server 4010. Each XQuery 4006 is recorded in a log 4020 and analysed by the data server 4010, after which the requested data 4007 is fetched from the database 4015 and delivered to the PC client user 4005. At some point in time, preferably after a sufficient amount of XQueries 4006 have been logged, the index server 4030 is activated and the logged XQueries 4020 are analysed to build an index table 4035. This process involves constructing a schema graph representation of the data stored in the database 4015 and its existing views represented by the logged XQueries 4020, building various frequency tables associated with these views, identifying searchable keywords in the database, determining one or more context trees and constructing a corresponding XQuery for each context tree, and finally recording these keywords and XQueries in an index table 4035 for later quick retrieval.

Once the building process of the index table 4035 completes, the system 4000 is ready to perform keyword search operations invoked at the keyword search client 4025. Search keywords 4026 entered by the user are transmitted to the index server 4030 where they are looked-up against the index table 4035 and one or more XQueries 4031 are retrieved and presented to the user, appropriately ranked according to their relevance to the search keywords. When the user selects an XQuery 4027 from the list, the XQuery 4027 is transmitted by the keyword search client 4025 to the data server 4010 which responds with the appropriate data 4011.

Figure 2:
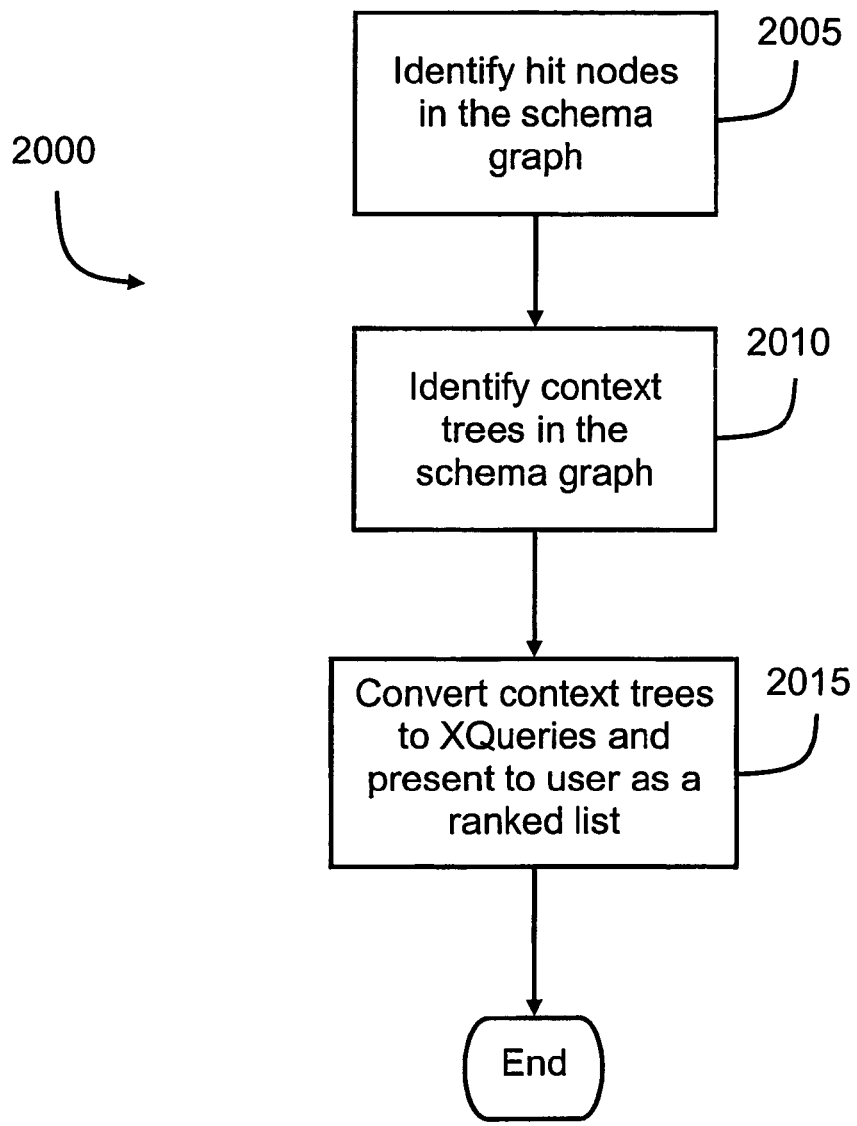
FIG. 2 is a flowchart of a keyword searching method.

The method 2000 of keyword searching involving one or more hierarchical data sources is summarised by the flowchart in FIG. 2. The method 2000 is preferably executed on the computer of the index server 4030. The method 2000 begins at step 2005, where hit nodes are identified in the schema graph. In an XML environment, there are potentially two ways in which a hit node can arise in the schema graph: (i) its element name may contain one of the search keywords or (ii) one or more XML nodes it represents may contain one of the search keywords. Subsequent to step 2005, step 2010 identifies context trees in the schema graph, each comprising nodes in the data sources represented by the hit and context nodes in the schema graph. Finally at step 2015, the identified context trees are converted to XQueries and presented to the user as a ranked list.

Methods for identifying context trees denoted by step 2010 in FIG. 2 are now described in detail. A method is first presented for the special case where there is a single hit node in the schema graph, followed later by a more general method that can handle cases involving more than one hit node. Both methods operate in two phases. The first is a bottom-up traversal of the schema graph from the hit nodes to determine which of their parents and ancestors are context nodes, from which the second phase proceeds in a top-down fashion to determine which of their descendants are also context nodes. The topmost ancestor of the hit nodes determined to be a context node then represents the root node of the context tree presented to the user as a result of the keyword search operation. For the purpose of determining whether a node in the schema graph is a context node, preferably at least an occurrence frequency table and a co-occurrence frequency table are maintained. The former records the frequencies at which each node in the schema graph occurred in a logged query or data view whilst the latter records the frequencies at which pairs of nodes in the schema graph co-occur in the same logged query or data view. When the schema graph is updated with a new query or data view containing new nodes, new entries are added to the occurrence frequency table to represent the new nodes, and are each given an initial frequency value of 1 indicating that the nodes are new and have not previously been observed. Likewise, for each node-pair from the new query comprising two new nodes or a new node and an existing node, a new entry is added to the co-occurrence frequency table and given an initial frequency value of 1, whilst for each node-pair comprising a new node and an existing node not present in the new query, a new entry is added to the co-occurrence frequency table but is given an initial frequency value of 0.

As the schema graph is traversed, an occurrence probability is computed for each node, given the occurrences of the hit nodes. These conditional probability values are computed or approximated from values stored in the frequency tables due to previously logged queries and data views, and are used to determine whether a node is a context node.

The following is a description of the first method for the special case where there is a single hit node. Let this hit node be denoted by X.

In the first phase, a bottom-up traversal through the schema graph is made beginning at node X. Each of X's ancestors $Y_i$ is considered in turn and its occurrence probability, given the occurrence of X, is computed:

$$Pr[Y_i \mid X] = \frac{Pr[Y_i \wedge X]}{Pr[X]} \quad \text{Eq. 1}$$
$$\approx \frac{freq(Y_i, X)}{freq(X)}$$

where the probability value has been approximated by an occurrence frequency freq(X) and a co-occurrence frequency freq($Y_i$, X). The latter denotes the frequency that X and $Y_i$ co-occur, where $Y_i$ is an ancestor of X. Both are obtained directly from the occurrence and co-occurrence frequency tables stated earlier. From these probability values computed for the ancestor nodes of X it is possible to determine the probability that a particular ancestor $Y_i$ is a root node, given X. Let $Z_1, \ldots Z_n$ denote the parent nodes of $Y_i$, then $$Pr[Y_i \text{root} \mid X] = Pr[\neg Z_1 \wedge \ldots \wedge \neg Z_n \wedge Y_i \mid X] \quad \text{Eq. 2}$$

That is, the probability that $Y_i$ is root, given X, is the probability that $Y_i$ is present and none of its parents are present, given X. Expanding the right hand side of Eq. 2 gives:

$$Pr[Y_i \text{root} \mid X] = Pr[\neg Z_1 \wedge \ldots \wedge \neg Z_n \mid Y_i \wedge X] Pr[Y_i \mid X] \quad \text{Eq. 3}$$
$$= (1 - Pr[Z_1 \vee \ldots \vee Z_n \mid Y_i \wedge X]) Pr[Y_i \mid X]$$

Since $Z_1, \ldots Z_n$ are mutually exclusive given $Y_i$, ($Y_i$ can have at most one parent in any actual hierarchical data structure), $$Pr[Y_i \text{root} \mid X] = \left(1 - \sum_j Pr[Z_j \mid Y_i \wedge X]\right) Pr[Y_i \mid X] \quad \text{Eq. 4}$$
$$= Pr[Y_i \mid X] - \sum_j Pr[Z_j \mid Y_i \wedge X] Pr[Y_i \mid X]$$
$$= Pr[Y_i \mid X] - \sum_j Pr[Z_j \wedge Y_i \mid X]$$

But since there is at most one directed path between $Z_j$ and X (a characteristic of the schema graph), it follows that this path must include $Y_i$, and hence:

$$Pr[Z_j \wedge Y_i \wedge X] = Pr[Z_j \wedge X] \Leftrightarrow \quad \text{Eq. 5}$$

$$Pr[Z_j \wedge Y_i \mid X] = Pr[Z_j \mid X] \Leftrightarrow \quad \text{Eq. 6}$$

$$Pr[Y_i \text{root} \mid X] = Pr[Y_i \mid X] - \sum_j Pr[Z_j \mid X] \quad \text{Eq. 7}$$

In a preferred implementation, a number of alternative context trees are returned to the user as results of a keyword search operation, one for each ancestor node $Y_i$ of X whose associated probability Pr[$Y_i$root|X] is greater than zero. These alternative context trees are each assigned a score being the associated probability Pr[$Y_i$root|X] and sorted according to these scores, from highest to lowest. Context trees with higher scores are considered to be of more interest to the user than those with lower scores. In an alternative implementation, only the context tree with the highest score is presented to the user as the result of the keyword search operation.

For each ancestor node $Y_i$ that can serve as the root node of a context tree (ie. whose Pr[$Y_i$root|X]>0), a second phase, top-down traversal from $Y_i$ is performed to determine which of its descendants (except the hit node X) are context nodes. For each parent node $P_j$ visited during this phase, an analysis is performed to determine which of its children are context nodes. For each child node determined to be a context node, its children are in turn analysed in a top-down fashion to identify context nodes among them.

Figure 3B:
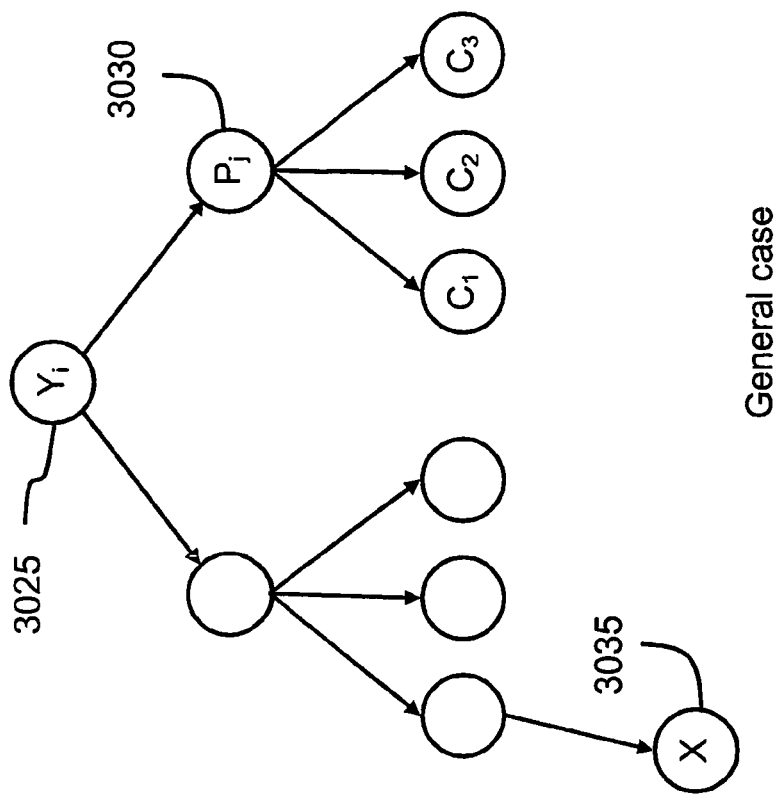
FIGS. 3A and 3B show two example parent nodes in a schema graph.
Figure 3A:
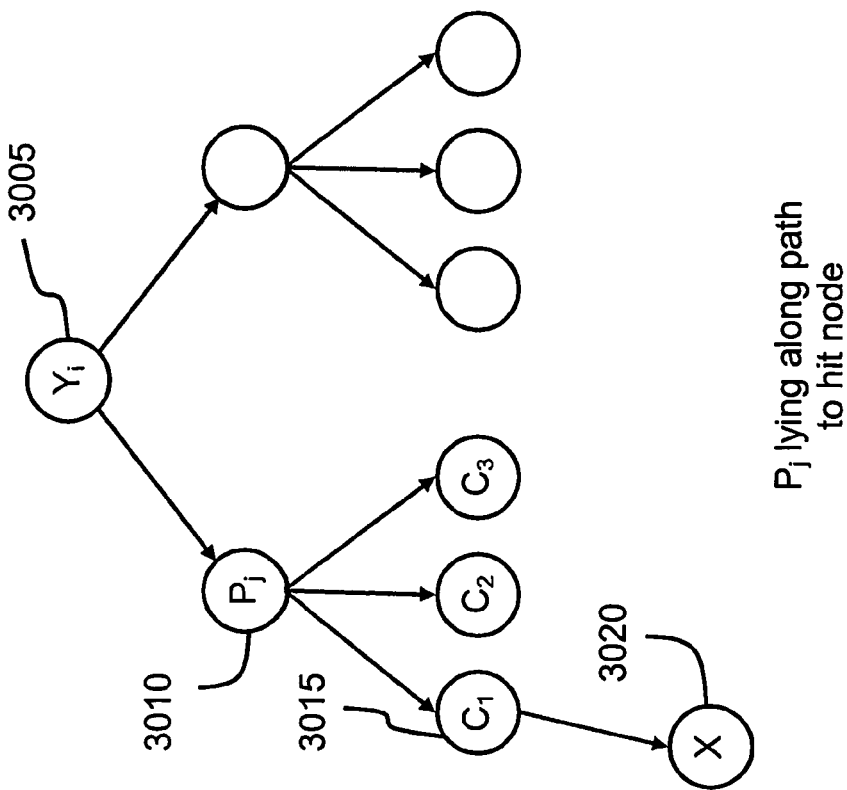

There are two distinct scenarios in the analysis of a parent node $P_j$, as illustrated in FIGS. 3A and 3B. The first is a special case shown in FIG. 3A where $P_j$ lies along the path from the root node $Y_i$ 3005 to the hit node X 3020. This includes the case $P_j = Y_i$ but excludes the case $P_j = X$. In this scenario, at least one child node of $P_j$, 3010, in this case the child node $C_i$ 3015, that lies along the path from $P_j$ to X, must be identified as a context node. In the more general second scenario, encompassing all remaining cases as shown in FIG. 3B, the parent node $P_j$ 3030 does not lie along a directed path from the root node $Y_i$ to the hit node X 3035 and thus it is not compulsory to identify any child nodes of $P_j$ as context nodes. An algorithm for handling the second scenario will be presented first.

For a given hit node X and a specific node $Y_i$ to serve as the root node of a context tree, the choice of whether some child node $C_k$ of a parent node $P_j$ is to be identified as a context node is in general a function of the probability that $C_k$ occurs given the presence of all nodes along the directed path from $Y_i$ to X:

$$Pr[C_k | X \wedge \ldots \wedge Y_i \text{root} \wedge \ldots \wedge P_j]$$

Since the evaluation or estimation of this probability is not possible with just the occurrence and co-occurrence frequency tables mentioned earlier, some form of simplification or approximation is needed. One such simplification preferably adopted is to ignore the effects of all nodes other than those from $Y_i$ to $C_k$ in the above probability expression, resulting in the expression:

$$Pr[C_k | Y_i\text{root} \wedge \ldots \wedge P_j] \quad \text{Eq. 8}$$

where $$Pr[C_k | Y_i\text{root} \wedge \ldots \wedge P_j] = Pr[C_k | Y_i\text{root} \wedge P_j]$$
$$= \frac{Pr[C_k \wedge Y_i\text{root} \wedge P_j]}{Pr[Y_i\text{root} \wedge P_j]}$$
$$= \frac{Pr[C_k \wedge Y_i\text{root}]}{Pr[Y_i\text{root} \wedge P_j]}$$

Let $Z_l$, $l=1, \ldots, p$ denote the parent nodes of $Y_i$, then the right hand side of Eq. 8 can be expanded to $$\frac{Pr[C_k \wedge Y_i] - \sum_{l=1}^{p} Pr[C_k \wedge Z_l]}{Pr[P_j \wedge Y_i] - \sum_{l=1}^{p} Pr[P_j \wedge Z_l]} \approx \frac{freq(Y_i, C_k) - \sum_{l=1}^{p} freq(Z_l, C_k)}{freq(Y_i, P_j) - \sum_{l=1}^{p} freq(Z_l, P_j)} \quad \text{Eq. 9}$$

The above expression however, only deals with each individual child node $C_k$ in isolation. Unless $C_k$ are independent from one another (given $Y_i$ root), it is necessary to consider their joint probabilities. This however would require maintaining frequency tables storing the joint-occurrence frequencies of a large number of combinations of nodes, many of which would rarely be observed and hence it would not be possible to reliably estimate their joint probabilities from their joint-occurrence frequencies. On the other hand, assuming independence among $C_k$ (given $Y_i$ root) may lead to undesirable results, such as none of the child nodes $C_k$ being selected if their individual occurrence probabilities (given $Y_i$ root) are low.

Figure 5:
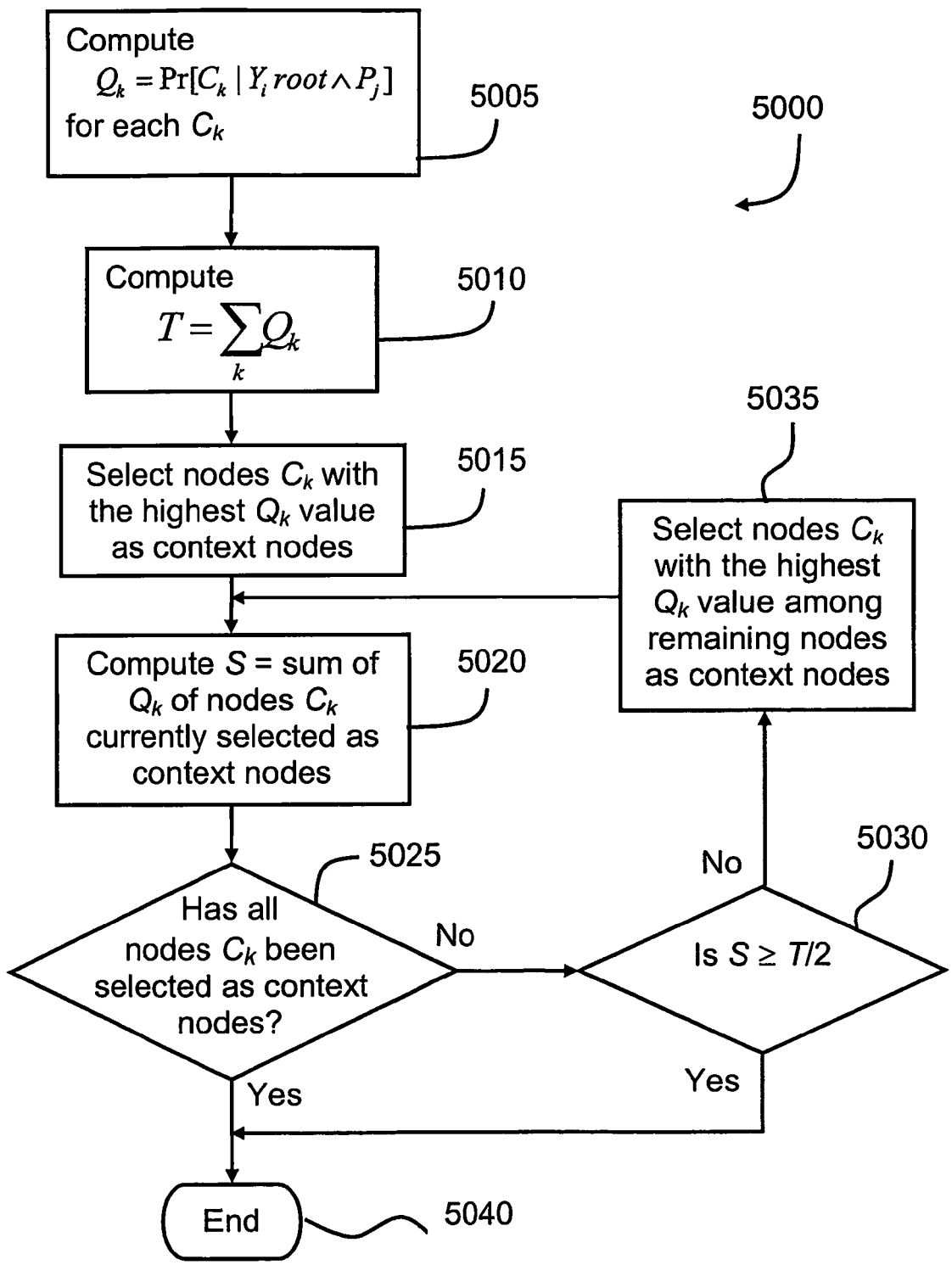
FIG. 5 is a flowchart of a method for identifying context nodes among a set of child nodes of a parent node not lying along a directed path from the root node to a hit node.

In order to avoid the undesirable effects of independence assumptions among $C_k$, whilst at the same time avoiding the need to maintain a large number of joint-occurrence frequency values, a heuristic method 5000 depicted by the flowchart in FIG. 5 may be used for selecting child nodes as context nodes. The method 5000 preferably operates as a subprogram within the method 2000 upon the server 4030.

The method 5000 begins at step 5005 where the occurrence probability of each child node $C_k$ given the root node $Y_i$, denoted by $Q_k = Pr[C_k | Y_i\text{root} \wedge P_j]$ is computed using Eq. 8 and Eq. 9. At the next step 5010, the probabilities $Q_k$ are summed over all child nodes $C_1$, the sum being denoted by T. The method 5000 continues at step 5015 where those nodes $C_k$ with the highest probability value are selected as context nodes. If more than one child node exists with the same highest probability value then all such nodes are selected as context nodes. The sum S of the probabilities of all child nodes so far selected as context nodes is then computed at step 5020. Execution then proceeds to the decision step 5025, at which point if all child nodes $C_k$ have been selected as context nodes then the method terminates at step 5040. If however there are one or more child nodes $C_k$ not yet selected as context nodes then the method 5000 continues to another decision step 5030. At step 5030 a check is made to ascertain whether $S \geq T/2$ and if so the method again terminates at step 5040. If $S < T/2$ then execution proceeds to step 5035. Here the list of child nodes $C_k$ not yet currently selected as context nodes are examined to identify those with the highest probability value among themselves. These are selected as context nodes and the method 5000 returns to step 5020 for further processing in the manner discussed above.

The method 5000 has a number of desirable properties:

If logged queries or data views intersect with sufficiently high frequencies, (ie. with a relatively large number of child nodes in common) then the method 5000 tends to return their intersections as context nodes. This is likely to lead to an acceptable result since an intersection that is sufficiently large tends to carry sufficient context information (for the hit node).

If logged queries or data views have relatively few child nodes in common, then the resulting set of context nodes tends to comprise not only their intersections but also additional nodes. Experiments conducted by the present inventor show the resulting set of context child nodes tends to reflect that of the most frequent logged query or data view. This is significant since the intersections alone would not likely contain sufficient context information.

Due to the inclusion of child nodes with identically highest probability value as a whole, the method 5000 is biased towards identifying more rather than less nodes as context nodes. In the case where the sets of child nodes present in logged queries are mutually exclusive and occur with equal frequencies, the method identifies all child nodes as context nodes.

In the method 5000 when a parent node is identified as a context node, one or more of its children are always identified as context nodes as well. This may be undesirable if there are many logged queries or data views in which the parent node occurs without any of its children (ie. occurs as a leaf node). Intuitively, if this occurs sufficiently often then the parent node alone should be identified as a context node without any of its children to reflect the frequently observed behaviour.

To remedy this issue, a preferred implementation makes use of an additional leaf co-occurrence frequency table, generated and stored by the index server 4030. This table stores the frequency at which a node $P_j$ co-occurs as a leaf node in past logged queries and data views with its ancestor $Y_i$, for every possible pairs of such nodes $P_j$ and $Y_i$, excluding those nodes $P_j$ that have no children in the schema graph. This new frequency table is then used to estimate the probability that a node $P_j$ occurs as a leaf node, given $P_j$ and some root node $Y_i$:

$$Pr[P_j\text{leaf} \mid Y_i\text{root} \wedge P_j] = \frac{Pr[P_j\text{leaf} \wedge Y_i\text{root}]}{Pr[Y_i\text{root} \wedge P_j]} \quad \text{Eq. 10}$$

$$\approx \frac{freq(Y_i, P_j\text{leaf}) - \sum_{l=1}^{p} freq(Z_l, P_j\text{leaf})}{freq(Y_i, P_j) - \sum_{l=1}^{p} freq(Z_l, P_j)}$$

where $Z_l$, $l=1, \ldots, p$ denote the parent nodes of $Y_i$ as defined earlier, and $freq(Y_i, P_j\text{ leaf})$ and $freq(Z_j, P_j\text{ leaf})$ are co-occurrence frequency values obtained from the new leaf co-occurrence frequency table.

The probability $Pr[P_j\text{leaf}|Y_i\text{root}\hat{\ }P_j]$ is preferably determined in an additional decision step prior to the method 5000 given in FIG. 5 for identifying which child nodes of $P_j$ are context nodes. If $Pr[P_j\text{leaf}|Y_i\text{root}\hat{\ }P_j]$ is less than 0.5, then no child nodes of $P_j$ are selected as context nodes, otherwise the method 5000 is performed to identify which child nodes are context nodes.

Figure 6:
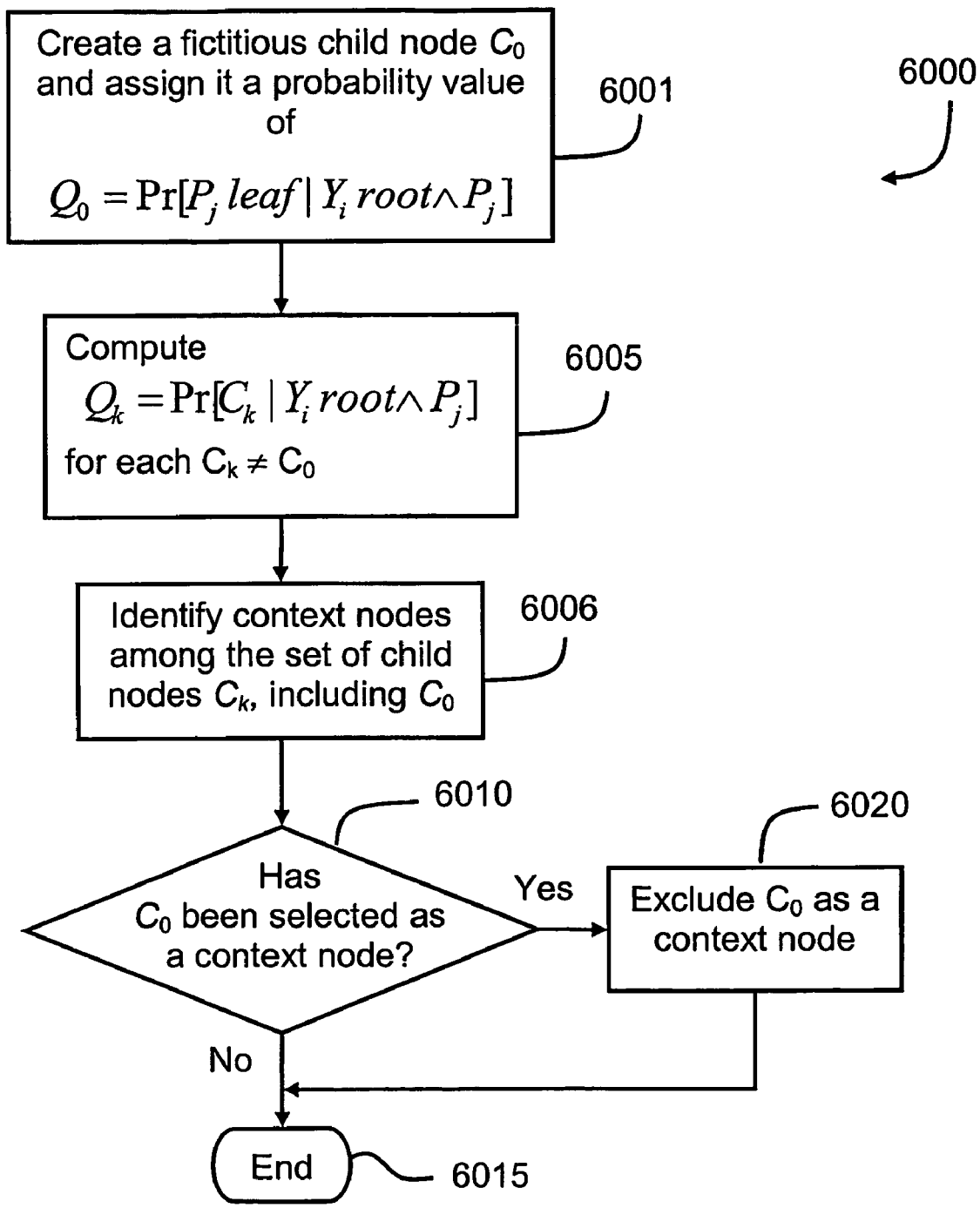
FIG. 6 is a flowchart of another method for identifying context nodes among a set of child nodes of a parent node not lying along a directed path from the root node to a hit node.

An alternative implementation is also possible, and employs an alternative method 6000 whose flowchart is given in FIG. 6 for selecting context nodes among a set of child nodes $C_k$, $k=1, \ldots, m$. The method 6000, which is also performed by the index server 4030, begins at step 6001 where a fictitious child node $C_0$ is conceptually created and added to the list of actual child nodes $C_1, \ldots, C_m$ and is assigned a probability value $Pr[P_j\text{leaf}|Y_i\text{root}\hat{\ }P_j]$ using Eq. 10. At the next step 6005, the actual child nodes $C_k$ are assigned their usual probability values $Q_k=Pr[C_k|Y_i\text{root}\hat{\ }P_j]$ using Eq. 8 and Eq. 9. The method 6000 then continues at step 6006 by invoking method 5000 at step 5010 (skipping step 5005) to select among the child nodes $C_0, \ldots, C_m$ a set of context nodes. When the method 5000 exits, the method 6000 resumes at decision step 6010 where a check is made to determine if the fictitious child node $C_0$ has been selected as a context node. If so then execution continues at step 6020 where $C_0$ is excluded as a context node. The method 6000 subsequently terminates at step 6015. If the test at 6010 fails, then the method 6000 proceeds directly to the termination step 6015.

The idea behind the alternative method 6000 for incorporating the possibility that none of $P_j$'s child nodes are context nodes is essentially identical to that of the first. That is, when $Pr[P_j\text{leaf}|Y_i\text{root}\hat{\ }P_j]$ is sufficiently large. However, the effects of $Pr[P_j\text{leaf}|Y_i\text{ root}\hat{\ }P_j]$ on the resulting set of context nodes are more gradual in this alternative approach, which is generally more favourable than the abrupt on/off behaviour of the first approach.

For the special scenario where the parent node $P_j$ lies along the directed path from the root node $Y_i$ to the hit node $X$, special considerations must be made to ensure that the child node of $P_j$ that lies along the path from $P_j$ to $X$ is identified as a context node. Without loss of generality, let this child node be $C_1$ as illustrated in FIG. 3 as item 3015. Whilst the method 5000 presented earlier for the general scenario can be modified (for example by inflating the occurrence probability of $C_1$ above those of all other child nodes prior to step 5015), such an approach may not yield correct results. This is because the method 5000 as described has been devised to select a set of the most frequently occurring child nodes as context nodes given the root $Y_i$ and parent $P_j$. If this set does not naturally contain $C_1$, then it basically means that $C_1$ is not related to nodes in the set. Forcefully including $C_1$ would simply result in a set of child nodes that have little in common and provide little context for $C_1$ (and subsequently for $X$).

Figure 7:
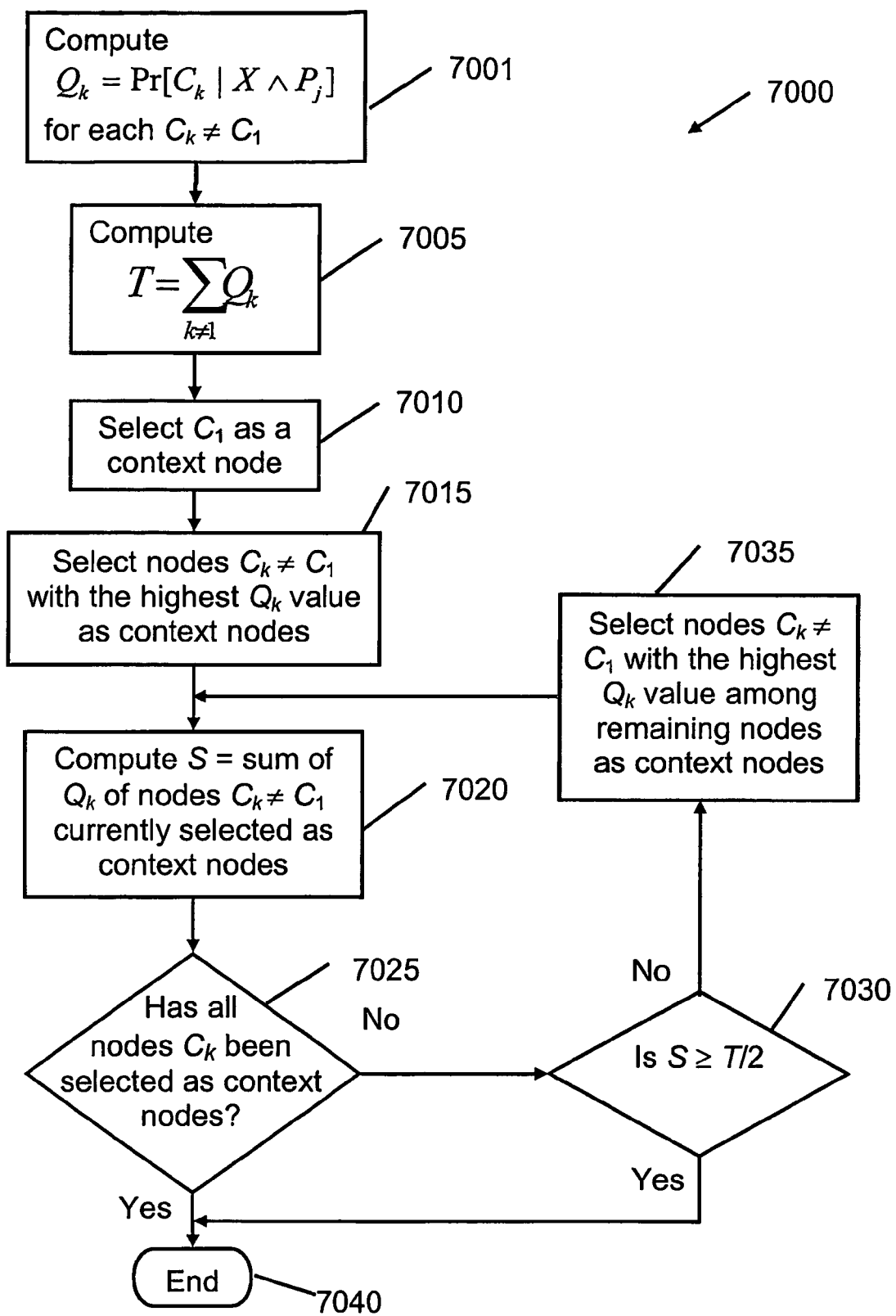
FIG. 7 is a flowchart of a method for identifying context nodes among a set of child nodes of a parent node lying along a directed path from the root node to a hit node.

Instead of modifying the method 5000, a different but somewhat procedurally similar method 7000 illustrated in FIG. 7 is preferably adopted in another implementation. The difference between this new 7000 and the previous 5000 methods lies in the independence of probability assumption used. Recall that the first simplification made in the general case where $P_j$ does not lie along the directed path from $Y_i$ to $X$ was the assumption that $$Pr[C_k|X\hat{\ } \ldots \hat{\ }Y_i\text{root}\hat{\ } \ldots \hat{\ }P_j]$$

is independent of nodes other than those from $Y_i$ to $P_j$. In the current scenario where one child node $C_1$ of $P_j$ lies along the path from $X$ to $P_j$, it would not be sensible to assume that $C_k$ is independent of nodes from $P_j$ to $X$ (including $C_1$) as they are necessary ancestors of $X$ that link the hit keyword $X$ to $C_k$. Since some simplifications are necessary to keep the problem tractable, it follows that a better choice is to assume an independence of probability assumption between $C_k$ and its ancestors above $P_j$ towards the root node $Y_i$. With this assumption, the probabilities of interest are $$Pr[C_k|X\hat{\ } \ldots \hat{\ }C_1\hat{\ }P_j] \; k \neq 1$$

Again, since there is at most one directed path linking $X$ and $P_j$, the above expression is equivalent to $$Pr[C_k \mid X \wedge P_j] = \frac{Pr[C_k \wedge X \wedge P_j]}{Pr[X \wedge P_j]} \quad \text{Eq. 11}$$

The numerator on the right hand side of Eq. 11 can not be obtained from the occurrence and co-occurrence frequency tables so far mentioned, since it involves three rather than two nodes. An extra joint-occurrence frequency table between 3-tuples of nodes is therefore required. Fortunately as each of these 3-tuples comprises a pair of parent-child nodes $C_k$ and $P_j$ (rather than any arbitrary pair of nodes), and since each node $C_k$ in practice has only a small number of parents, the new joint-occurrence frequency table would only be slightly larger than a co-occurrence frequency table involving pairs of nodes.

With the new joint-occurrence frequency table, $Pr[C_k|X\hat{\ }P_j]$ can be estimated as $$Pr[C_k \mid X \wedge P_j] \approx \frac{freq(C_k, P_j, X)}{freq(P_j, X)} \quad \text{Eq. 12}$$

where $freq(C_k, P_j, X)$ denotes the joint-occurrence frequency between nodes $C_k$, $P_j$ and $X$, $P_j$ is a parent of $C_k$ and an ancestor of $X$, and $C_k$ is neither $X$ nor an ancestor of $X$.

The method 7000 for determining the set of siblings of $C_1$ to be included with $C_1$ as context nodes is very similar to method 5000 already described. The method 7000 begins at step 7001 where the occurrence probability of each child node $C_k \neq C_1$ given the parent node $P_j$ and the hit node $X$, denoted by $Q_k=Pr[C_k|X \wedge P_j]$ is computed using Eq. 12. At the next step 7005, the probabilities $Q_k$ are summed over all child nodes $C_k \neq C_1$, the sum being denoted by T. The method 7000 continues at step 7010 where node $C_1$ is selected as a context node, and then subsequently at step 7015 where those nodes $C_k \neq C_1$ with the highest probability value are also selected as context nodes. If more than one child node exists with the same highest probability value then all such nodes are selected as context nodes. The sum of the probabilities of all child nodes so far selected as context nodes excluding $C_1$ is then computed at step 7020, the sum being denoted by S. Execution then proceeds to the decision step 7025, at which point if all child nodes $C_k$ have been selected as context nodes then the method 7000 terminates at step 7040. If however there are one or more child nodes $C_k$ not yet selected as context nodes then the method continues to another decision step 7030. At step 7030 a check is made to ascertain whether $S \geq T/2$ and, if so, the method 7000 again terminates at step 7040. If $S<T/2$ then execution proceeds to step 7035. Here the list of child nodes $C_k \neq C_1$ not yet currently selected as context nodes are examined to identify those with the highest probability value among themselves. These are selected as context nodes and the method returns to step 7020 for further processing.

Some modifications are needed to method 7000 to allow for cases where no siblings of $C_1$ are included in the solution. This is achieved by introducing a sole child co-occurrence frequency table that stores the frequency that a node $P_j$ co-occurs with one of its descendants X such that only one child node of $P_j$ ($C_1$ along the path from $P_j$ to X) is present in past logged queries and data views. This frequency table is then used to estimate the probability that $C_1$ has no sibling given its parent $P_j$ and the hit node X:

$$\begin{aligned}Pr[C_1 \text{ no sibling}| P_j \wedge X] &= Pr[C_1 \wedge \neg C_k \forall k \neq 1 | P_j \wedge X] \quad \text{Eq. 13}\\ &= Pr[P_j \text{ has 1 child}| P_j \wedge X]\\ &= \frac{Pr[P_j \text{ has 1 child} \wedge P_j \wedge X]}{Pr[P_j \wedge X]}\\ &= \frac{Pr[P_j \text{ has 1 child} \wedge X]}{Pr[P_j \wedge X]}\\ &\approx \frac{freq(P_j \text{ has 1 child}, X)}{freq(P_j, X)}\end{aligned}$$

where $freq(P_j \text{ has 1 child}, X)$ denotes the frequency at which node $P_j$ co-occurs with its descendant X and $P_j$ has a single child node ($C_1$), and is obtained from the new frequency table.

In one implementation, the probability $Pr[C_1$ no sibling$|P_j \wedge X]$ is used in an additional decision step prior to the method 7000 given in FIG. 7 for identifying which child nodes of $P_j$ are context nodes. If $Pr[C_1$ no sibling$|P_j \wedge X]$ is less than 0.5, then no child nodes of $P_j$ other than $C_1$ are selected as context nodes, otherwise method 7000 is performed to identify which child nodes are context nodes.

An alternative implementation is also possible. This employs an alternative method 8000 whose flowchart is given in FIG. 8 for selecting context nodes among a set of child nodes $C_k$, $k=1, \ldots, m$. The method 8000 begins at step 8001 where a fictitious child node $C_0$ is conceptually created and added to the list of actual child nodes $C_1, \ldots, C_m$ and is assigned a probability value $Q_0=Pr[C_1$ no sibling$|P_j \wedge X]$ using Eq. 13. At the next step 8005, the actual child nodes $C_k$ except $C_1$ are assigned their usual probability values $Q_k=Pr[C_k|X \wedge P_j]$ using Eq. 11. The method 8000 then continues at step 8006 by invoking method 7000 at step 7005 (skipping step 7001) to select among the child nodes $C_0, \ldots, C_m$ a set of context nodes. When method 7000 exits, method 8000 resumes at decision step 8010 where a check is made to determine if the fictitious child node $C_0$ has been selected as a context node. If so then execution continues at step 8020 where $C_0$ is excluded as a context node. The method 8000 subsequently terminates at step 8015. If the test at 8010 fails, then the method proceeds directly to the termination step 8015.

The preceding discussion describes two distinct methods 6000 and 8000 for determining from a set of child nodes which are context nodes. Preferably the latter is applied in the scenario where the parent node $P_j$ lies along the directed path from the root node $Y_i$ to the hit element X, whilst the former is used for all other parent nodes. In an alternative implementation, the first method 6000 is employed even for the case where $P_j$ lies along the path from $Y_i$ to X. If this results in a set of context child nodes that includes $C_1$, then the set is adopted, otherwise the set is discarded and the second method 8000 is applied to determine a new set of context child nodes. The rationale behind this favouring of the first method is that the probability values computed there are conditional on the root element $Y_i$, rather than on the hit node X. Tests conducted by the present inventor seem to suggest that the root element of a data view tends to be a better indicator of what nodes are present in the view.

The keyword searching system 4000 disclosed herein is a form of a learning system. From a set of logged queries and existing data views, which are akin to training examples, the system is able to synthesise new views of data. If patterns exist in the logged queries or data views, then they will be reflected in the frequency tables which in turn will affect the behaviour of the system 4000. A desirable feature for any learning system is an ability to make some form of generalisation that allows it to use patterns learned from one set of problems to improve its performance when handling related but yet unseen problems. One aspect of generalisation that is important in a hierarchical environment is the ability to observe occurrence patterns of certain sub-structures of data and generalise them to other similar or identical sub-structures.

Figure 9:
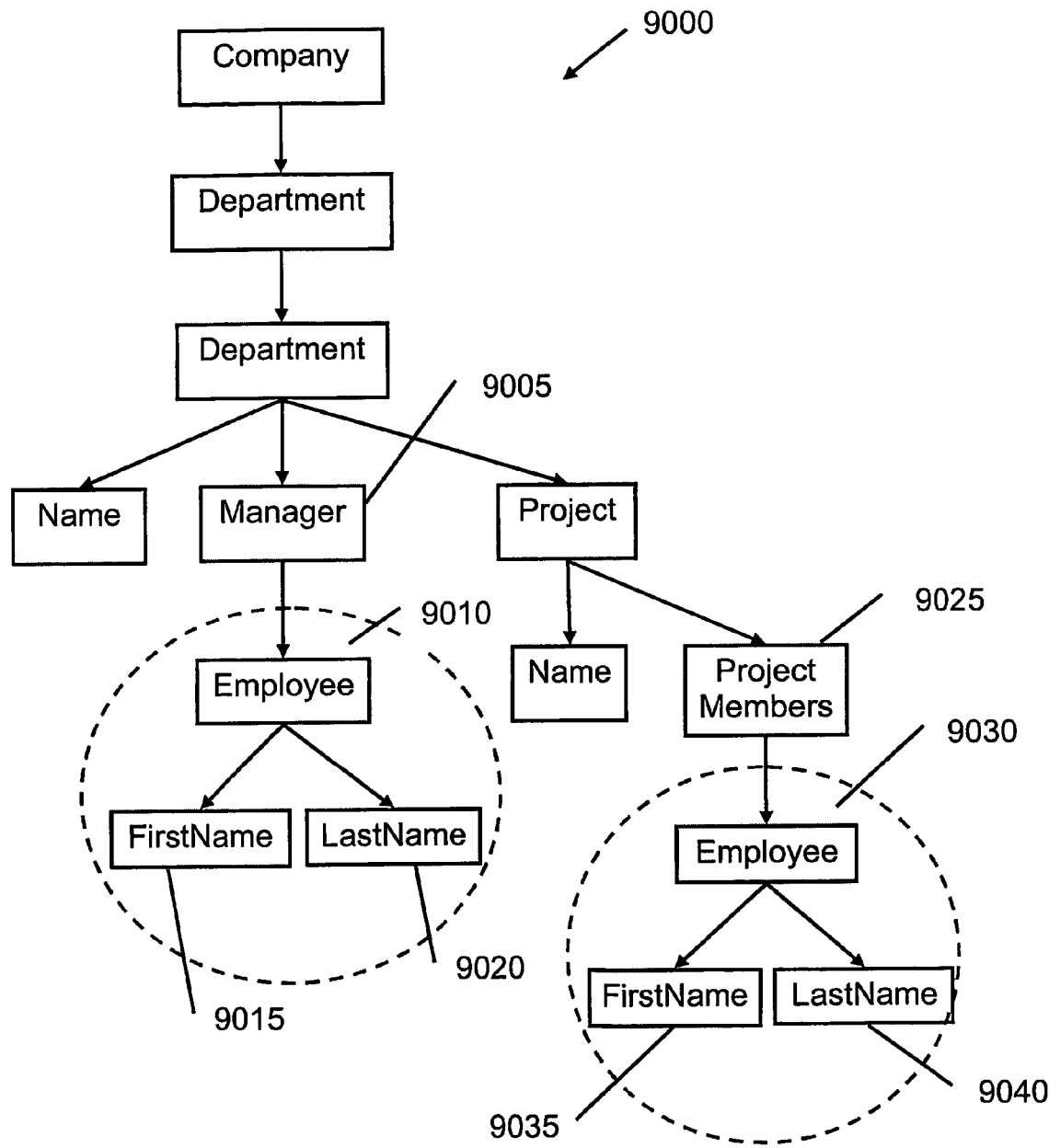
FIG. 9 is an example schema graph with two identical sub-trees.

Consider the data structure 9000 shown in FIG. 9, in which there are two identical "Employee" sub-structures 9010 and 9030 (enclosed within the dotted curves), one under "Manager" 9005 and the other under "Project Members" 9025. Suppose that in all logged queries and data views, the sub-elements "FirstName" 9015 and "LastName" 9020 in the first Employee sub-tree have always been observed to appear together, whilst no queries or data views containing the second "Employee" sub-tree 9030 have yet to be observed. Suppose further that a keyword search operation for an employee's name is invoked in which a "hit" is found in the "FirstName" sub-element 9035 of the second "Employee" sub-tree 9030, making 9035 the hit node. Even though no example queries or views have been encountered with this sub-element present, it is intuitively apparent that from the occurrence patterns observed for the first "Employee" sub-tree 9010, the sub-element "LastName" 9040 in the second "Employee" sub-tree 9030 should be identified as a context node.

Such a generalisation ability is particularly important when working with XML data since identical data sub-structures often exist at several locations in a data hierarchy (for example, as a result of the use of referenced schema elements). Such may be realised through probability averaging. Probability averaging works by appropriately averaging the occurrence probabilities of nodes in the schema graph that have identical names or IDs or labels. The application of probability averaging is now described firstly for the first top-down phase of the construction of the context tree, and then subsequently for the second bottom-up phase.

Recall that the operation of the first phase relies on the probability values $Pr[Y_i|X]$, where $Y_i$ are ancestors of the hit node X. To facilitate probability averaging, $Pr[Y_i|X]$ is preferably first reformulated into an incremental form, as follows: Let W be a child of $Y_i$ that lies along the one and only directed path from $Y_i$ to X. $Pr[Y_i|X]$ can then be rewritten as (the path from $Y_i$ to X must include W)

$$Pr[Y_i | X] = \frac{Pr[Y_i \wedge X]}{Pr[X]} \qquad \text{Eq. 14}$$

$$= \frac{Pr[Y_i \wedge W \wedge X]}{Pr[X]}$$

(the path from $Y_i$ to $X$ must include $W$)

$$= \frac{Pr[Y_i | W \wedge X] Pr[W \wedge X]}{Pr[X]}$$

$$= Pr[Y_i | W \wedge X] Pr[W | X]$$

That is, $Pr[Y_i|X]$ can be incrementally obtained from the probability value of its child node W, namely $Pr[W|X]$. The idea is to begin the procedure at the hit node X and make use of the above expression to obtain probability values for successively higher ancestor nodes. At each step, the method of probability averaging is then applied to the first term on the right hand side of Eq. 14. Thus, let $Pr'[B|X]$ denote the modified probability value of some node B as a result of probability averaging, then $Pr'[Y_i|X]$ can be defined by the following recursive formulae:

and denotes the weighted average or mean probability of $Y_i$ given W and X computed over all pairs of nodes $(Y_{ik}, X_k)$ (for some values of k) that are equivalent to $(Y_i, X)$, with $X_0$ and $Y_{i0}$ (ie. k=0) being aliases for X and $Y_i$ respectively. For each of these equivalent pairs $(Y_{ik}, X_k)$, the term $W_k$ in the summations denotes the immediate child of $Y_{ik}$ lying along the directed path from $Y_{ik}$ to $X_k$.

A node pair $(Y_{ik}, X_k)$ is said to be equivalent to a node pair $(Y_i, X)$ if
  (i) $Y_{ik}$ has the same name or label or ID as $Y_i$ and $X_k$ has the same name, label or ID as X,
  (ii) there are direct ancestor-descendant relationship between $Y_{ik}$ and $X_k$ and similarly between $Y_i$ and X,
  (iii) for each node $W_k$ along the directed path from $Y_{ik}$ to $X_k$, there must exist a corresponding node W along the directed path from $Y_i$ and X such that $(W_k, X_k)$ is equivalent to (W, X) and $(Y_i, W_k)$ is equivalent to $(Y_i, W)$.
  (iv) $Y_i$ and $Y_{ik}$ have exactly the same number of parents and for each parent $Z_j$ of $Y_i$, there exists a parent $Z_{kj}$ of $Y_{ik}$ such that $(Z_{kj}, Y_{ik})$ and $(Z_j, Y_i)$ satisfy conditions (i) to (iii) above.

The modified probability that $Y_i$ is root given X due to probability averaging is then given by $$Pr'[Y_i root | X] = Pr'[Y_i | X] - \sum_j Pr'[Z_j | X] \qquad \text{Eq. 18}$$

where $$Pr'[Z_j | X] = Pr_{mean}[Z_j | Y_i \wedge X] Pr'[Y_i | X] \qquad \text{Eq. 19}$$

as obtained from Eq. 16 by replacing $Y_i$ with $Z_j$ and W with $Y_i$.

In the event that the denominator on the right hand side of Eq. 17 is zero, indicating that none of the node pairs $(W_k, X_k)$ has been observed in logged queries and data views, Eq. 17 and hence Eq. 19 and Eq. 18 are undefined and consequently $$Pr'[X | X] = 1 \qquad \text{Eq. 15}$$

$$Pr'[Y_i|X] = \begin{cases} 0 & \text{if } Pr'[W | X] = 0 \\ Pr_{mean}[Y_i | W \wedge X] Pr'[W | X] & \text{otherwise} \end{cases} \qquad \text{Eq. 16}$$

where $$Pr_{mean}[Y_i | W \wedge X] = \frac{\sum_k Pr[Y_{ik} | W_k \wedge X_k] Pr[W_k \wedge X_k]}{\sum_k Pr[W_k \wedge X_k]} \qquad \text{Eq. 17}$$

$$= \frac{\sum_k Pr[Y_{ik} \wedge W_k \wedge X_k]}{\sum_k Pr[W_k \wedge X_k]}$$

$$= \frac{\sum_k Pr[Y_{ik} \wedge X_k]}{\sum_k Pr[W_k \wedge X_k]} \text{ (the path from } Y_{ik} \text{ to } X_k \text{ must include } W_{ik}\text{)}$$

$$\approx \frac{\sum_k freq(Y_{ik}, X_k)}{\sum_k freq(W_k, X_k)}$$

some alternative methods for identifying context nodes are needed. A preferred approach is to alternatively define $Pr_{mean}[Z_j|Y_i {\char`\^} X]$ in terms of the distance of $Z_j$ from the hit node X as follows:

$$Pr_{mean}[Z_j | Y_i \wedge X] = \qquad \text{Eq. 20}$$

$$\begin{cases} \dfrac{\sum_k freq(Z_{jk}, X_k)}{\sum_k freq(Y_{ik}, X_k)} & \text{if } \sum_k freq(Y_{ik}, X_k) \neq 0 \\ 1 & \text{if } \sum_k freq(Y_{ik}, X_k) = 0, dist(Z_j, X) \leq d_{max} \\ 0 & \text{if } \sum_k freq(Y_{ik}, X_k) = 0, dist(Z_j, X) > d_{max} \end{cases}$$

where $d_{max}$ is some threshold constant, and dist(A, B) is the distance between two nodes A and B in the schema graph, defined as the number of links along the path between A and B. In the absence of relevant past logged queries and data views, the distance between two nodes should give a good indication of how they are related to one another since in practice related data are usually stored in proximity of each other.

Figure 10:
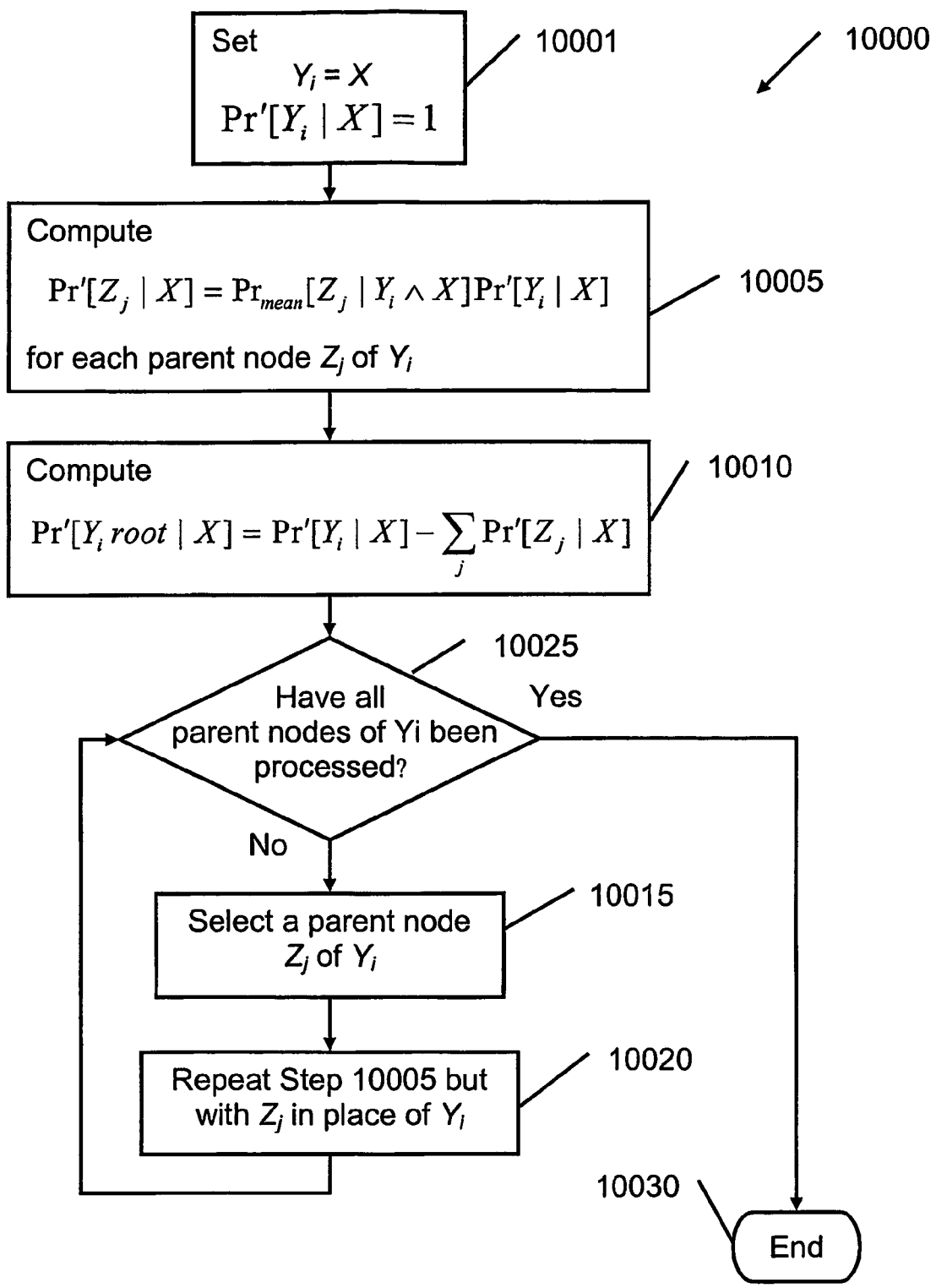
FIG. 10 is a flowchart of the first, bottom-up traversal phase of the context node identification method with probability averaging.

A flowchart of a method 10000 for computing the probability that an ancestor node $Y_i$ of a hit node X is the root node of a context tree with probability averaging, for all ancestor nodes $Y_i$, is shown in FIG. 10. The method 10000 begins at step 10001 with $Y_i = X$ and hence $Pr'[Y_i|X]=1$. At the next step 10005, Eq. 19 and Eq. 20 are used to compute $Pr'[Z_j|X]$ for each parent node $Z_j$ of $Y_i$. Subsequent to step 10005, step 10010 computes $Pr'[Y_i \text{ root } X]$ according to Eq. 18. Step 100025 then tests to determine whether all parent nodes of $Y_i$ have been processed. If not, the method 10000 then proceeds to step 10015 where a parent node $Z_j$ of $Y_i$ is selected. Upon reaching step 10020, the method 10000 is recursively invoked at step 10005 (skipping step 10001) but with the selected parent node $Z_j$ playing the role of $Y_i$. When this invocation returns, the current execution of method 10000 resumes and returns to step 10025 to check for more parent nodes. When all parent nodes have been processed the method 10000 ends at step 10030

Probability averaging is also applied to the second top-down traversal phase. In this phase, for the general case in where a parent node $P_j$ does not lie along a directed path from the root node $Y_i$ to the hit node X, probability averaging can be applied in the same way as that used in the first phase. The selection of child nodes $C_k$ of $Y_i$ for inclusion in the keyword search result as a context node is based on the probabilities $$Pr[C_k|Y_i \text{root}{\char`\^}P_j]$$

With probability averaging, the above expression is replaced by a mean probability $$Pr_{mean}[C_k | Y_i root \wedge P_j] = \frac{\sum_h Pr[C_{kh} \wedge Y_{ih} root]}{\sum_h Pr[Y_{ih} root \wedge P_{jh}]} \qquad \text{Eq. 21}$$

where $(Y_{ih}, C_{kh})$ is equivalent to $(Y_i, C_k)$ and $(P_{jh}, C_{kh})$ is equivalent to $P_j, C_k$, with $Y_{i0}, C_{k0}$ and $P_{j0}$ (ie. h=0) being aliases for $Y_i, C_k$ and $P_j$ respectively. Let $Z_j$ denote the parents of $Y_i$, and similarly $Z_{jh}$ the corresponding parents of $Y_{ih}$. The above expression can be expanded to $$Pr_{mean}[C_k | Y_i root \wedge P_j] = \frac{\sum_h \left\{ Pr[C_{kh} \wedge Y_{ih}] - \sum_j Pr[C_{kh} \wedge Z_{jh}] \right\}}{\sum_h \left\{ Pr[P_{jh} \wedge Y_{ih}] - \sum_j Pr[P_{jh} \wedge Z_{jh}] \right\}} \qquad \text{Eq. 22}$$

$$\approx \frac{\sum_h \left\{ freq(Y_{ih}, C_{kh}) - \sum_j freq(Z_{jh}, C_{kh}) \right\}}{\sum_h \left\{ freq(Y_{ih}, P_{jh}) - \sum_j freq(Z_{jh}, P_{jh}) \right\}}$$

For the above expression to be an accurate approximation of the mean probability $Pr_{mean}[C_k|Y_i \text{root}{\char`\^}P_j]$, the denominator on the right hand side must be sufficiently large (eg. >some positive constant $f_{min}$). When this is not the case, a preferred remedial method adopted in a preferred implementation is used to first approximate $Pr_{mean}[C_k|Y_i \text{root}{\char`\^}P_j]$ by $Pr_{mean}[C_k|Y_i {\char`\^} P_j]$, where the probability is conditional on $Y_i {\char`\^} P_j$ rather than $Y_i \text{root}{\char`\^}P_j$. Thus $$Pr_{mean}[C_k | Y_i root \wedge P_j] \approx Pr_{mean}[C_k | Y_i \wedge P_j] \qquad \text{Eq. 23}$$

$$= \frac{\sum_h Pr[C_{kh} \wedge Y_{ih}]}{\sum_h Pr[Y_{ih} \wedge P_{jh}]}$$

$$\approx \frac{\sum_h freq(Y_{ih}, C_{kh})}{\sum_h freq(Y_{ih}, P_{jh})}$$

If the denominator on the right hand side of Eq. 23 is still not sufficiently large, then $Pr_{mean}[C_k|Y_i {\char`\^} P_j]$ is further approximated by a probability conditioned on W rather than $Y_i$, where W is the immediate child of $Y_i$ and an ancestor of $C_k$. That is $$Pr_{mean}[C_k | Y_i root \wedge P_j] \approx Pr_{mean}[C_k | W \wedge P_j] \qquad \text{Eq. 24}$$

$$= \frac{\sum_h Pr[C_{kh} \wedge W_h]}{\sum_h Pr[W_h \wedge P_{jh}]}$$

$$\approx \frac{\sum_h freq(W_h, C_{kh})}{\sum_h freq(W_h, P_{jh})}$$

The method is repeated further until a sufficiently large value is obtained for the denominator on the right hand side, or if not, until W denotes a parent of $C_k$. If the latter then $Pr_{mean}[C_k|Y_i \text{root}{\char`\^}P_j]$ is assigned a value based on the distance between $C_k$ and $Y_i$ $$Pr_{mean}[C_k | Y_i root \wedge P_j] \approx \begin{cases} 1 & \text{if } dist(C_k, Y_i) \leq d_{max} \\ 0 & \text{otherwise} \end{cases} \qquad \text{Eq. 25}$$

or the distance between $C_k$ and the hit node X:

$$Pr_{mean}[C_k \mid Y_i root] \approx \begin{cases} 1 & \text{if } dist(C_k, X) \leq d_{max} \\ 0 & \text{otherwise} \end{cases} \quad \text{Eq. 26}$$

Depending on whether $Pr_{mean}[C_k \mid Y_i root\hat{\,} P_j]$ is eventually approximated by Eq. 22, Eq. 23, Eq. 24, Eq. 25 or Eq. 26, the mean probability that a parent node $P_j$ has no context child nodes given the root node $Y_i$, is computed using Eq. 27, Eq. 28, Eq. 29, Eq. 30 or Eq. 31 respectively $$Pr_{mean}[P_j leaf \mid Y_i root \wedge P_j] = \frac{\sum_h Pr[P_{jh} leaf \wedge Y_{ih} root]}{\sum_h Pr[Y_{ih} root \wedge P_{jh}]} \quad \text{Eq. 27}$$

$$\approx \frac{\sum_h \left\{ \begin{array}{c} freq(Y_{ih}, P_{jh} leaf) - \\ \sum_j freq(Z_{jh}, P_{jh} leaf) \end{array} \right\}}{\sum_h \left\{ \begin{array}{c} freq(Y_{ih}, P_{jh}) - \\ \sum_j freq(Z_{jh}, P_{jh}) \end{array} \right\}}$$

$$Pr_{mean}[P_j leaf \mid Y_i root \wedge P_j] \approx Pr_{mean}[P_j leaf \mid Y_i \wedge P_j] \quad \text{Eq. 28}$$

$$= \frac{\sum_h Pr[P_{jh} leaf \wedge Y_{ih}]}{\sum_h Pr[Y_{ih} \wedge P_{jh}]}$$

$$\approx \frac{\sum_h freq(Y_{ih}, P_{jh} leaf)}{\sum_h freq(Y_{ih}, P_{jh})}$$

$$Pr_{mean}[P_j leaf \mid Y_i root \wedge P_j] \approx Pr_{mean}[P_j leaf \mid W \wedge P_j] \quad \text{Eq. 29}$$

$$= \frac{\sum_h Pr[P_{jh} leaf \wedge W_h]}{\sum_h Pr[W_h \wedge P_{jh}]}$$

$$\approx \frac{\sum_h freq(W_h, P_{jh} leaf)}{\sum_h freq(W_h, P_{jh})}$$

$$Pr_{mean}[P_j leaf \mid Y_i root \wedge P_j] \approx \begin{cases} 0 & \text{if } dist(P, Y_i) + 1 \leq d_{max} \\ 1 & \text{otherwise} \end{cases} \quad \text{Eq. 30}$$

$$Pr_{mean}[P_j leaf \mid Y_i root \wedge P_j] \approx \begin{cases} 0 & \text{if } dist(P, X) + 1 \leq d_{max} \\ 1 & \text{otherwise} \end{cases} \quad \text{Eq. 31}$$

Figure 13:
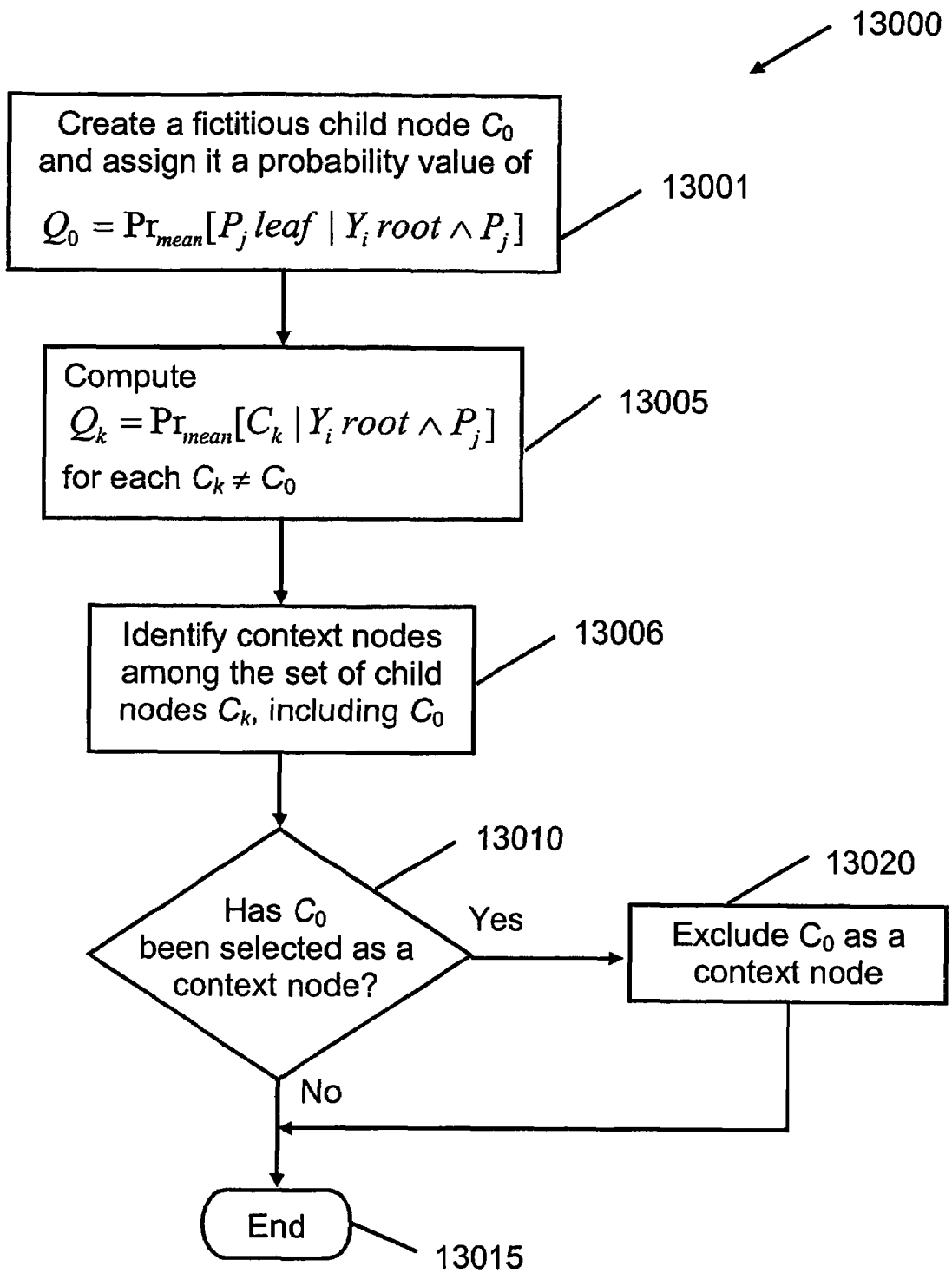
FIG. 13 is a flowchart of a method for identifying context nodes among a set of child nodes of a parent node not lying along a directed path from the root node to a hit node, with probability averaging.

A preferred procedure for determining context child nodes for a parent node $P_j$ given a root element $Y_i$ for the general case where $P_j$ does not lie along the directed path from $Y_i$ to the hit node X with probability averaging is similar to that shown in FIG. 6, and is shown in FIG. 13. The method 13000 begins at step 13001 where a fictitious child node $C_0$ is conceptually created and added to the list of actual child nodes $C_1, \ldots, C_m$ and is assigned a probability value $Q_0 = Pr_{mean}[P_j leaf \mid Y_i root\hat{\,} P_j]$ computed using Eq. 27, Eq. 28, Eq. 29, Eq. 30 or Eq. 31 and at the next step 13005, the actual child nodes $C_k$ are correspondingly assigned probability values $Q_k = Pr_{mean}[C_k \mid Y_i root\hat{\,} P_j]$ computed using Eq. 22, Eq. 23, Eq. 24, Eq. 25 or Eq. 26 respectively. In any case, step 13006 follows step 13005 and invokes the method 5000 at step 5010 (skipping step 5005) to select among the child nodes $C_0, \ldots, C_m$ a set of context nodes. When method 5000 exits, the method 13000 resumes at decision step 13010 where a check is made to determine if the fictitious child node $C_0$ has been selected as a context node. If so then execution continues at step 13020 where $C_0$ is excluded as a context node. The method 13000 subsequently terminates at step 13015. If the test at 13010 fails, then the method proceeds directly to the termination step 13015.

Apart from their use in keyword searching, the methods 13000 and 6000 can also be used as means of selective presentation of hierarchical data. As already discussed, a practical hierarchical data source typically contains much more data than a user may wish to see at any given time. When a user views a hierarchical data source by selecting a node within its the data structure, a presentation application typically displays all data items in the sub-tree below the selected node, some of which may often not be of interest to the user. It would be highly desirable if the presentation application is able to filter out uninteresting data based on some previously observed viewing patterns of the user. The methods 13000 and 6000 as described are well suited for this task. By setting $Y_i$=root node selected for viewing by the user, the set of context nodes identified by the methods constitute nodes that are likely to be of interest and preferably be displayed to the user, whilst the remaining nodes not identified as context nodes are preferably filtered out.

For the special case where a parent node $P_j$ lies on the directed path from the root node $Y_i$ to the hit node X, recall that the selection of child nodes $C_k$ of $Y_i$ for inclusion as context nodes is based on the probabilities $$Pr[C_k \mid X \wedge P_j] = \frac{Pr[C_k \wedge X \wedge P_j]}{Pr[X \wedge P_j]} \quad \text{Eq. 32}$$

With probability averaging these are replaced by a mean probability:

$$Pr_{mean}[C_k \mid X \wedge P_j] = \quad \text{Eq. 33}$$

$$\frac{\sum_h Pr[C_{kh} \wedge X_h \wedge P_{jh}]}{\sum_h Pr[X_h \wedge P_{jh}]} \approx \frac{\sum_h freq(C_{kh}, P_{jh}, X_h)}{\sum_h freq(P_{jh}, X_h)}$$

where $(P_{jh}, C_{kh})$ is equivalent to $(P_j, C_k)$ and $(P_{jh}, X_h)$ is equivalent to $(P_j, X)$, with $P_{j0}$, $C_{k0}$ and $X_0$ (ie. h=0) being aliases for $P_j$, $C_k$ and X respectively.

For the above expression to be an accurate approximation of the mean probability $Pr_{mean}[C_k \mid X\hat{\,} P_j]$X the denominator on the right hand side of Eq. 33 must be sufficiently large (eg. $>f_{min}$). When this is not the case, another remedial method that may be used is to approximate $Pr_{mean}[C_k \mid X\hat{\,} P_j]$ by $Pr_{mean}[C_k \mid X'\hat{\,} P_j]$, a probability conditioned on X' rather than X, where X' is the immediate parent of X lying on the directed path from $Y_i$ to X.

Figure 22:
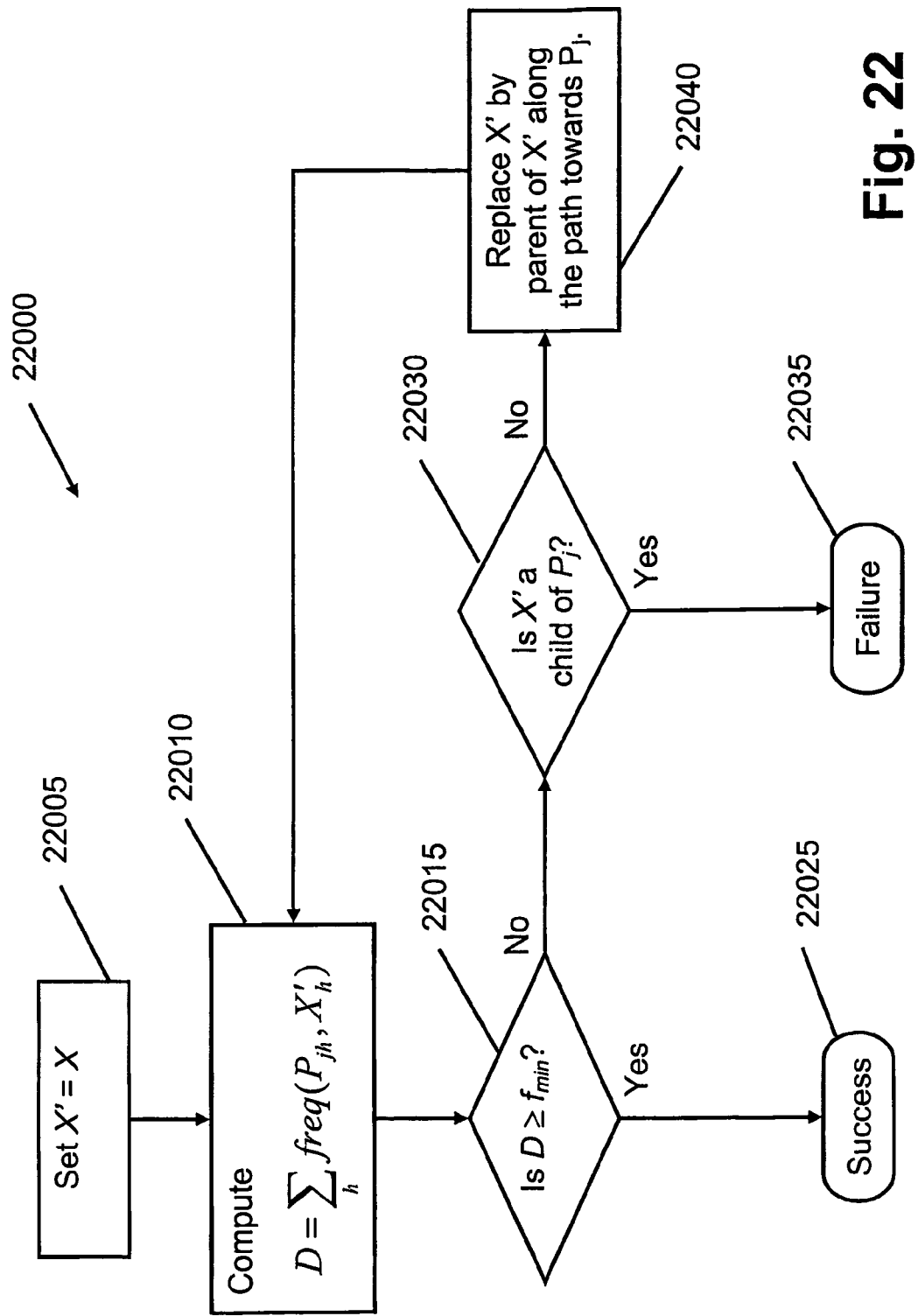
FIG. 22 is a flowchart of a method for selecting an ancestor of a set of hit nodes that has a higher observation frequency than the set of hit nodes.

A flowchart of a method 22000 for identifying a node X' used for determining an approximation for $Pr_{mean}[C_k \mid X\hat{\,} P_j]$ is shown in FIG. 22. The method 22000 begins at step 22005 where X' is first initialised to X. At the next step 22010 the sum $$\sum_h freq(P_{jh}, X'_h)$$

is computed and assigned to D, where the node pairs $(P_{jh}, X'_h)$ are equivalent to $(P_j, X')$. Decision step 22015 then follows and test if D is greater than or equal to some positive threshold constant $f_{min}$. If so, the method 22000 exits with success at step 22025. If the decision step 22015 fails then execution proceeds to another decision step 22030, where a test is made to determine whether X' is an immediate child of $P_j$. If so then the method exits with failure at step 22035, otherwise it continues at step 22040 where X' is replaced by its parent lying along the directed path from $P_j$ to X. The method 22000 then loops back to step 22010.

If method 22000 succeeds with a node X' and a corresponding value D, then $Pr_{mean}[C_k|X^{\wedge}P_j]$ is assigned the value $$Pr_{mean}[C_k | X \wedge P_j] \approx \frac{\sum_h freq(C_{kh}, P_{jh}, X'_h)}{D} \quad \text{Eq. 34}$$

In the event that method 22000 exits with failure, $Pr_{mean}[C_k|X^{\wedge}P_j]$ is assigned a value based on the distance between $C_k$ and $Y_i$ $$Pr_{mean}[C_k | X \wedge P_j] \approx \begin{cases} 1 & \text{if } dist(C_k, Y_i) \leq d_{max} \\ 0 & \text{otherwise} \end{cases} \quad \text{Eq. 35}$$

or the distance between $C_k$ and the hit node X $$Pr_{mean}[C_k | X \wedge P_j] \approx \begin{cases} 1 & \text{if } dist(C_k, X) \leq d_{max} \\ 0 & \text{otherwise} \end{cases} \quad \text{Eq. 36}$$

Depending on whether $Pr_{mean}[C_k|X^{\wedge}P_j]$ is eventually approximated by Eq. 34, Eq. 35 or Eq. 36, the mean probability that a parent node $P_j$ has no context child nodes other than the child node $C_1$ lying on the directed path from $P_j$ to X, given $P_j$ and the hit node X, is computed using Eq. 37, Eq. 38, or Eq. 39 respectively:

$$Pr_{mean}[C_1 \text{ no sibling}| P_j \wedge X] \approx \frac{\sum_h freq(P_{jh} \text{ has 1 child, } X'_h)}{D} \quad \text{Eq. 37}$$

$$Pr_{mean}[C_1 \text{ no sibling}| P_j \wedge X] \approx \begin{cases} 0 & \text{if } dist(P, Y_i)+1 \leq d_{max} \\ 1 & \text{otherwise} \end{cases} \quad \text{Eq. 38}$$

$$Pr_{mean}[C_1 \text{ no sibling}| P_j \wedge X] \approx \begin{cases} 0 & \text{if } dist(P, X)+1 \leq d_{max} \\ 1 & \text{otherwise} \end{cases} \quad \text{Eq. 39}$$

where $(P_{jh}, X'_h)$ are equivalent to $(P_j, X')$, and X' and D are obtained by method 22000.

Figure 8:
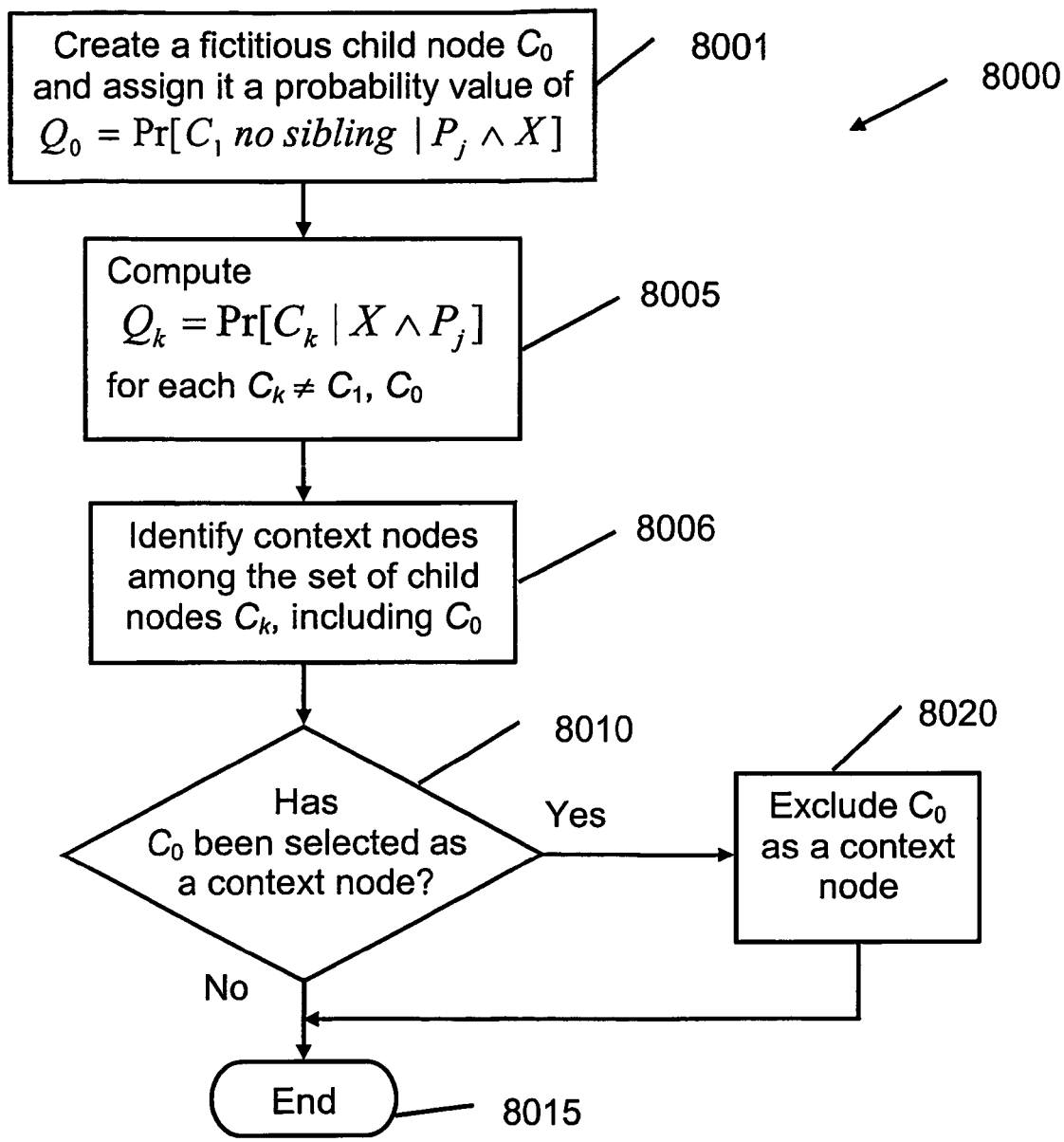
FIG. 8 is a flowchart of another method for identifying context nodes among a set of child nodes of a parent node lying along a directed path from the root node to a hit node.
Figure 14:
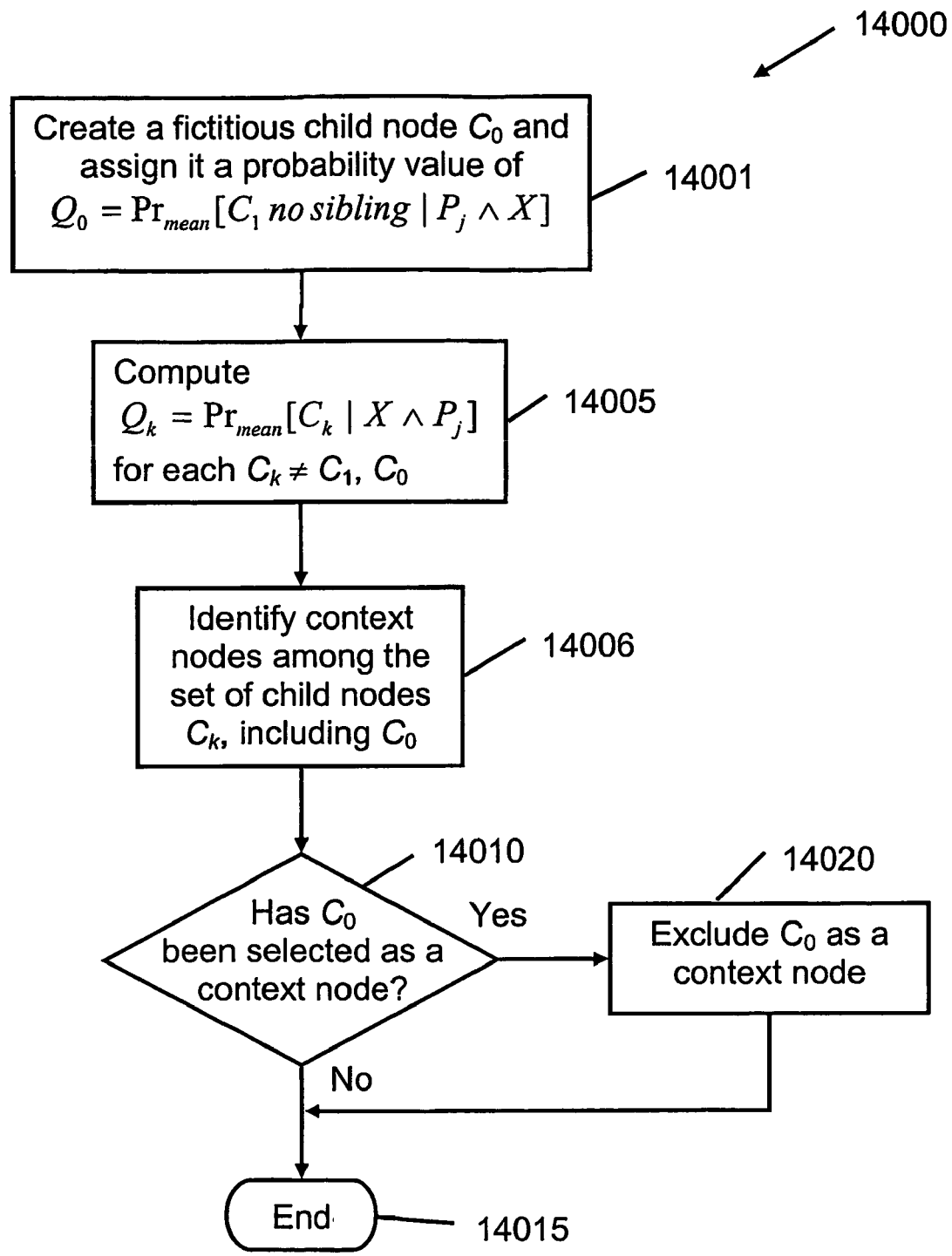
FIG. 14 is a flowchart of a method for identifying context nodes among a set of child nodes of a parent node lying along a directed path from the root node to a hit node, with probability averaging.

A preferred procedure for determining context child nodes for a parent node $P_j$ for the special case where $P_j$ lies along the directed path from $Y_i$ to the hit node X with probability averaging is very similar to that shown in FIG. 8, and is shown in FIG. 14.

A method 14000 shown in FIG. 14 begins at step 14001 where a fictitious child node $C_0$ is conceptually created and added to the list of actual child nodes $C_1, \ldots, C_m$ and is assigned a probability value $Q_0 = Pr_{mean}[C_1 \text{ no sibling}|P_j^{\wedge}X]$ computed using Eq. 37, Eq. 38 or Eq. 39, and at the next step 14005, the actual child nodes $C_k$ except $C_1$ are correspondingly assigned probability values $Q_k = Pr_{mean}[C_k|X^{\wedge}P_j]$ computed using Eq. 34, Eq. 35 or Eq. 36 respectively. In any case, step 14006 follows step 14005 and invokes method 7000 at step 7005 (skipping step 7001) to select among the child nodes $C_0, \ldots, C_m$ a set of context nodes. When the method 7000 exits, the method 14000 resumes at decision step 14010 where a check is made to determine if the fictitious child node $C_0$ has been selected as a context node. If so then execution continues at step 14020 where $C_0$ is excluded as a context node. The method 14000 subsequently terminates at step 14015. If the test at 14010 fails, then the method proceeds directly to the termination step 14015.

The preceding discussion describes methods for identifying context nodes in the special case where there is at most a single hit node in the schema graph. This is a usual scenario when the user enters only a single search keyword. In the event that the keyword appears in multiple locations in the schema graph, signifying there are more than one hit, then each hit is preferably treated separately. That is, the methods as described are applied for a first hit node in the schema graph and a plurality of context trees are determined for the hit node. The same methods are then subsequently applied for each of the remaining hit nodes to obtain a new plurality of context trees, and so on. When all hit nodes have been processed, the generated context trees may be re-scored if they are found to encompass multiple hit nodes, and in addition duplicated context trees are removed. The list of the remaining context trees are then reordered according to their new scores (if any) and returned to the user as the result of the keyword search operation.

If the user however initiates a 'find all' keyword search operation involving multiple search keywords combined with a Boolean AND operation, then keyword hits can potentially appear in two or more hit nodes in the schema graph. A more general method for determining context trees is now described for handling such a scenario.

Figure 11:
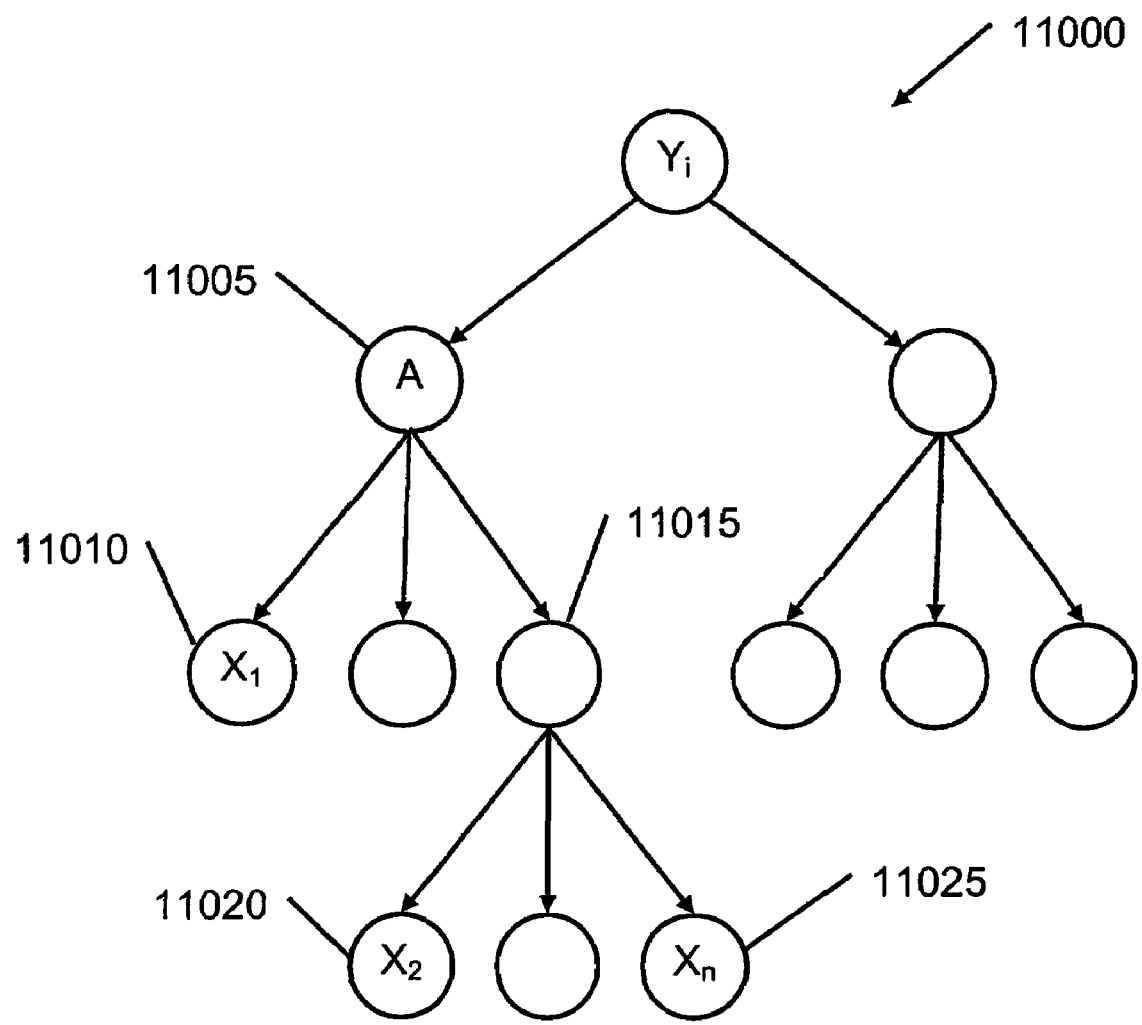
FIG. 11 is an example of a schema graph with multiple hit nodes.

FIG. 11 shows an example of a schema graph 11000 within which there are multiple hit nodes 11010, 11020 and 11025. Let these hit nodes be denoted by $X_1, \ldots, X_n$. Naturally, for a context tree to include all hit nodes, the root node of the smallest sub-tree containing all hit nodes, denoted by A (node 11005) must be returned as a context node, as well as all nodes lying along the directed path from A to each hit node. Thus node 11015 must be a context node since it lies along the directed path from A to $X_2$ (and from A to $X_3$).

The first, bottom-up phase of the context tree determination method begins at node A and traverses upwards. Let $Y_i$ be A or an ancestor of A, whose probability given the hit nodes, $Pr[Y_i|X_1^{\wedge} \ldots ^{\wedge}X_n]$, needs to be evaluated in order to determine the possible root node of a context tree. Expressed mathematically $$Pr[Y_i | X_1 \wedge \ldots \wedge X_n] = \frac{Pr[Y_i \wedge X_1 \wedge \ldots \wedge X_n]}{Pr[X_1 \wedge \ldots \wedge X_n]} \quad \text{Eq. 40}$$

At this point some independence of probability assumptions are necessary since both the numerator and denominator on the right hand side of Eq. 40 cannot be obtained or estimated directly from the existing frequency tables for a general value of n (except for the denominator when n≤2). A plausible assumption is that the set of $X_l$ are independent of one another given a common ancestor $Y_i$. In other words:

$$Pr[X_1 \wedge \ldots \wedge X_n \mid Y_i] = Pr[X_1 \mid Y_i] \ldots Pr[X_n \mid Y_i] \quad \text{Eq. 41}$$

Thus $$\begin{aligned}Pr[Y_i \wedge X_1 \wedge \ldots \wedge X_n] &= Pr[X_1 \wedge \ldots \wedge X_n \mid Y_i]Pr[Y_i] \quad \text{Eq. 42}\\ &= Pr[X_1 \mid Y_i] \ldots Pr[X_n \mid Y_i]Pr[Y_i]\\ &= \frac{Pr[X_1 \wedge Y_i] \ldots Pr[X_n \wedge Y_i]}{Pr[Y_i]^{n-1}}\end{aligned}$$

In order to remove the singularity when $Pr[Y_i]=0$, $Pr[Y_i \hat{} X_1 \hat{} \ldots \hat{} X_n]$ is redefined as $$Pr[Y_i \wedge X_1 \wedge \ldots \wedge X_n] = \quad \text{Eq. 43}$$
$$\begin{cases} 0 & \text{if } Pr[Y_i] = 0 \\ \dfrac{Pr[X_1 \wedge Y_i] \ldots Pr[X_n \wedge Y_i]}{Pr[Y_i]^{n-1}} & \text{otherwise} \end{cases}$$

Similarly $$\begin{aligned}Pr[X_1 \wedge \ldots \wedge X_n] &= Pr[A \wedge X_1 \wedge \ldots \wedge X_n] \quad \text{Eq. 44}\\ &= Pr[X_1 \wedge \ldots \wedge X_n \mid A]Pr[A]\\ &= Pr[X_1 \mid A] \ldots Pr[X_n \mid A]Pr[A]\\ &= \frac{Pr[X_1 \wedge A] \ldots Pr[X_n \wedge A]}{Pr[A]^{n-1}}\end{aligned}$$

As in the case where there is only a single hit node, the occurrence probability of $Y_i$ given all hit nodes is preferably expressed incrementally in terms of the probability of its immediate child node to facilitate probability averaging, as follows: Let W denote the immediate child node of $Y_i$ along the directed path from $Y_i$ to A, then $$Pr'[Y_i \mid X_1 \wedge \ldots \wedge X_n] = \quad \text{Eq. 45}$$
$$\begin{cases} 1 & Y_i = A \\ 0 & Y_i \ne A, Pr'[W \mid X_1 \wedge \ldots \wedge X_n] = 0 \\ Pr_{mean}[Y_i \mid W \wedge X_1 \wedge \ldots \wedge X_n] \cdot & \\ Pr'[W \mid X_1 \wedge \ldots \wedge X_n] & \text{otherwise} \end{cases}$$

where $$Pr_{mean}[Y_i \mid W \wedge X_1 \wedge \ldots \wedge X_n] = \frac{\sum_h Pr[Y_{ih} \wedge W_h \wedge X_{1h} \wedge \ldots \wedge X_{nh}]}{\sum_h Pr[W_h \wedge X_{1h} \wedge \ldots \wedge X_{nh}]} \quad \text{Eq. 46}$$

where the pairs $(Y_{ih}, W_h)$ are equivalent to $(Y_i, W)$, and $(W_h, X_{lh})$ are equivalent to $(W, X_l)$ for $l=1, \ldots, n$, and $Y_{i0}$, $W_0$ and $X_{l0}$ (h=0) are aliases for $Y_i$, W, and $X_l$ respectively. The term inside the summation on the numerator can be substituted by Eq. 43. The term inside the summation of the denominator can also be substituted by Eq. 43 by letting W play the role of $Y_i$, thus resulting in $$Pr_{mean}[Y_i \mid W \wedge X_1 \wedge \ldots \wedge X_n] = \sum_h N_h \Big/ \sum_h D_h \quad \text{Eq. 47}$$

where $$N_h = \begin{cases} 0 & \text{if } Pr[Y_{ih}] = 0 \\ \dfrac{Pr[Y_{ih} \wedge X_{1h}] \ldots Pr[Y_{ih} \wedge X_{nh}]}{Pr[Y_{ih}]^{n-1}} & \text{otherwise} \end{cases} \quad \text{Eq. 48}$$

$$\approx \begin{cases} 0 & \text{if } freq(Y_{ih}) = 0 \\ \dfrac{freq(Y_{ih}, X_{1h}) \ldots freq(Y_{ih}, X_{nh})}{freq(Y_{ih})^{n-1}} & \text{otherwise} \end{cases}$$

$$D_h = \begin{cases} 0 & \text{if } Pr[W_h] = 0 \\ \dfrac{Pr[W_h \wedge X_{1h}] \ldots Pr[W_h \wedge X_{nh}]}{Pr[W_h]^{n-1}} & \text{otherwise} \end{cases} \quad \text{Eq. 49}$$

$$\approx \begin{cases} 0 & \text{if } freq(W_h) = 0 \\ \dfrac{freq(W_h, X_{1h}) \ldots freq(W_h, X_{nh})}{freq(W_h)^{n-1}} & \text{otherwise} \end{cases}$$

$Pr_{mean}[Y_i \mid W \hat{} X_1 \hat{} \ldots \hat{} X_n]$ is undefined if $$\sum_h D_h = 0.$$

When this occurs $Pr_{mean}[Y_i \mid W \hat{} X_1 \hat{} \ldots \hat{} X_n]$ is preferably assigned a value based on the distances from $Y_i$ to the hit nodes $X_1, \ldots, X_n$ as follows $$Pr_{mean}[Y_i \mid W \wedge X_1 \wedge \ldots \wedge X_n] = \begin{cases} 1 & \text{if } \min_{l=1,\ldots,n} dist(Y_i, X_l) \le d_{max} \\ 0 & \text{otherwise} \end{cases} \quad \text{Eq. 50}$$

Figure 12:
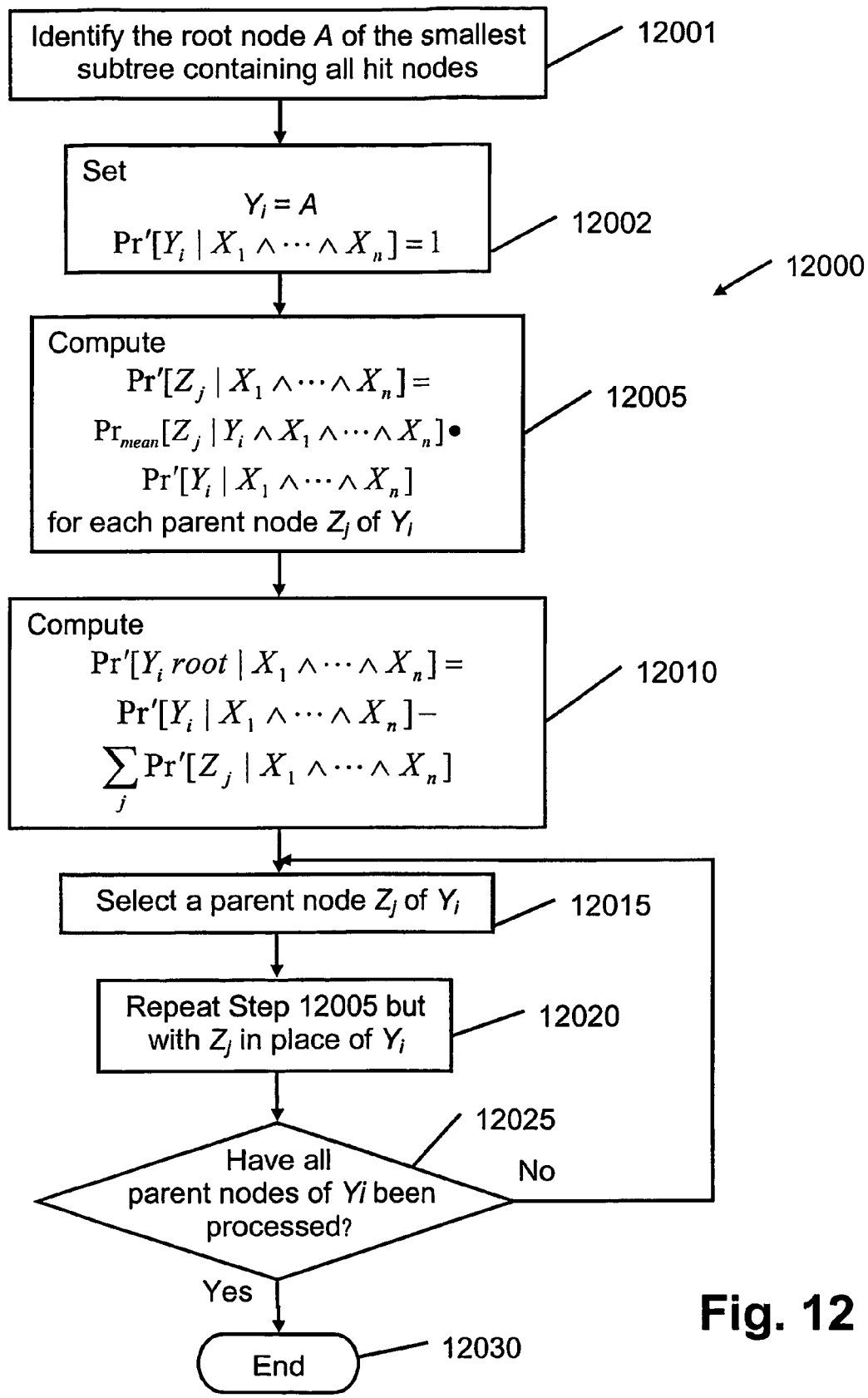
FIG. 12 is a flowchart of the first, bottom-up traversal phase of the context node identification method with probability averaging and involving multiple hit nodes.

A flowchart of a method 12000 for computing the probability that a node $Y_i$ is the root node of a context tree containing all hit nodes, for all choices of $Y_i$, is shown in FIG. 12. The method 12000 begins at step 12001 where the root node of the smallest subtree in the schema graph that contains all hit nodes is identified and denoted as A. Execution then continues at step 12002 where $Y_i$ is initialised to A and consequently $Pr'[Y_i \mid X_1 \hat{} \ldots \hat{} X_n]=1$. At the next step 12005 Eq. 45, Eq. 47 together with Eq. 48 and Eq. 49, or alternatively Eq. 50, are used to compute $Pr'[Z_j \mid X_1 \hat{} \ldots \hat{} X_n]$ for each parent node $Z_j$ of $Y_i$. Following step 12005, step 12010 computes $Pr'[Y_i \text{root} \mid X_1 \hat{} \ldots \hat{} X_n]$ according to the equation $$Pr'[Y_i \text{ root} \mid X_1 \wedge \ldots \wedge X_n] = \quad \text{Eq. 51}$$
$$Pr'[Y_i \mid X_1 \wedge \ldots \wedge X_n] - \sum_j Pr'[Z_j \mid X_1 \wedge \ldots \wedge X_n]$$

The method 12000 then proceeds to step 12015 where a parent node $Z_j$ of $Y_i$ is selected. Upon reaching step 12020, the method 12000 is recursively invoked at step 12005 (skipping Steps 12001 and 12002) but with the selected parent node $Z_j$ playing the role of $Y_i$. When the recursive invocation returns, execution resumes at decision step 12025 where a test is made to determine whether all parent nodes of $Y_i$ has been processed. If so, the method ends at step 12030, otherwise it continues at step 12015 where another parent node $Z_j$ of $Y_i$ is selected for processing.

In the second top-down traversal phase, for the general case where a parent node $P_j$ does not lie along the directed path from the root node $Y_i$ to any hit node, the method for determining whether a child node of $P_j$ is a context node remains unchanged from the method 13000 used previously for the case where there is only a single hit node.

For the special case where the parent node $P_j$ lies along the directed path from $Y_i$ to one or more hit nodes, it is necessary to modify the method used for the single hit node case to allow for the possibility that more than one child node of $P_j$ must be included as context nodes. Recall that for the case involving only one hit node X, the determination of whether a child node $C_k$ is a context node is based on the probability value $$Pr[C_k|X \wedge P_j]$$

where X is a descendant of $P_j$ but is not $C_k$ or a descendant of $C_k$. An extension when there are more than one hit nodes is to base the selection process of child nodes $C_k$ k=1, ..., m on the probabilities of $C_k$ given the parent node $P_j$ and all hit nodes $X_l$ that are descendants of $P_j$, whilst ignoring the effects of hit nodes that are not descendants of $P_j$. Naturally, all child nodes $C_k$ that are themselves hit nodes or are ancestors of one or more hit nodes must be context nodes. Without loss of generality, let these child nodes be $C_1, \ldots, C_r$, where $1 \leq r \leq nm$. S,milarly let the set of hit nodes that are descendants of $C_1, \ldots, C_r$ be $X_1, \ldots, X_s$, where $r \leq s \leq n$. If s=1 (and hence r=1) then this scenario is equivalent to the case where there is only a single hit node, and hence the method 14000 described for this case can be used. A method adopted in a preferred implementation for generalising for the case s>1 is to replace the term $Pr[C_k|X \wedge P_j]$ with the expression $$\sum_{l=1}^{s} Pr[C_k | X_l \wedge P_j]$$

which becomes $$Q_k = \sum_{l=1}^{s} Pr_{mean}[C_k | X_l \wedge P_j] \qquad \text{Eq. 52}$$

after probability averaging, where $Pr_{mean}[C_k|X_l \wedge P_j]$ is as defined in Eq. 33. $Q_k$ is undefined if $freq_{mean}(P_j, X_l)=0$ for any $X_l$, l=1, ..., s.

where $$freq_{mean}(P_j, X_l) = \sum_{h} freq(P_{jh}, X_{lh})$$

and $(P_{jh}, X_{lh})$ are equivalent to $(P_j, X_l)$. Even when $freq_{mean}(P_j, X_l)$ is non-zero but a small number (eg. $<f_{min}$), $Q_k$ cannot be estimated from the frequency tables with sufficient accuracy. As in the case involving a single hit node, this problem can be overcome by replacing the hit nodes $X_1, \ldots, X_s$ by a new set of nodes S in which some or all of the hit nodes are replaced by their ancestors, after which $Q_k$ is redefined in terms of elements of S.

Figure 21:
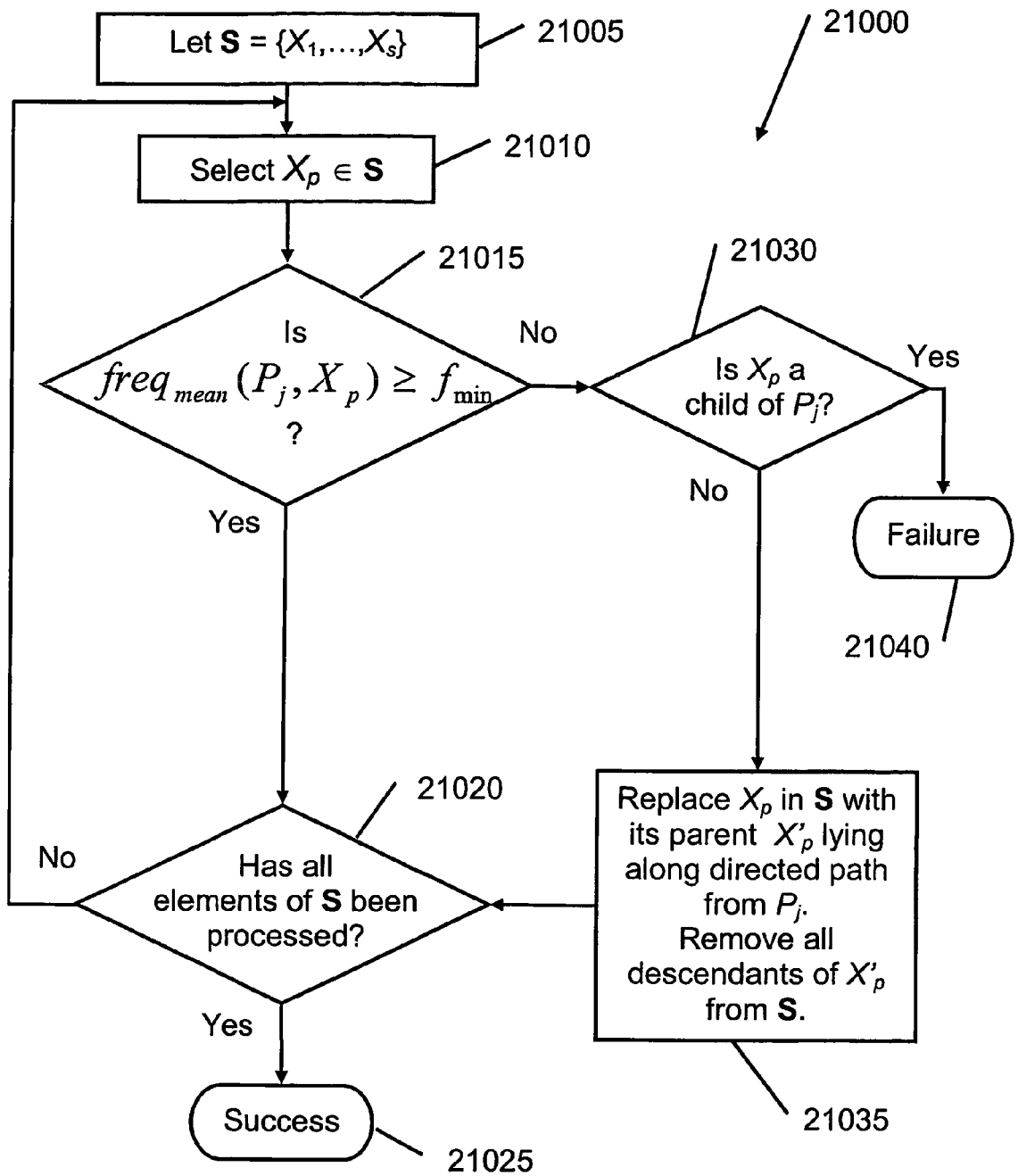
FIG. 21 is a flowchart of a method for constructing an alternative set of hit nodes that have higher observation frequencies than those in an original set of hit nodes.

A method 21000 depicted by the flowchart of FIG. 21 is preferably used to determine this new set of nodes S that replaces the hit nodes $X_1, \ldots, X_s$. The method 21000 begins at step 21005 where the initial set of hit nodes $X_1, \ldots, X_s$ is denoted by S. At the next step 21010 an unprocessed element $X_p$ of S is selected. Decision step 21015 then follows in which a check is made to determine if $freq_{mean}(P_j, X_p)$ is greater than or equal to some threshold constant $f_{min}$. If so then $X_p$ is retained in the set S and the method 21000 continues to decision step 21020 where a check is made to determine if all elements in S has been processed. If one or more unprocessed elements remain then execution returns to step 21010 to select another element of S for processing. If on the other hand all elements have been processed, then the method ends at step 21025 with success.

Returning now to decision step 21015. If the test condition fails then another decision step 21030 follows, which tests if the selected node $X_p$ is a child node of $P_j$. If it is then the method 21000 ends at step 21040 with failure, otherwise step 21035 follows. At step 21035, the element $X_p$ in S is replaced by its parent $X'_p$ that lies along the directed path from $P_j$ to $X_p$, and all descendants of $X'_p$ are removed from S. Execution then proceeds to step 21020.

If method 21000 as described above returns with success, then the elements in the resulting set S are used to compute a value $Q_k$ for each child node $C_1, \ldots, C_r$:

$$Q_k = \sum_{X \in S} Pr_{mean}[C_k | X \wedge P_j] \qquad \text{Eq. 53}$$

If however method 21000 returns with failure, then the value $Q_k$ is preferably determined from the distance between $C_k$ and the root node $Y_i$:

$$Q_k = \begin{cases} 1 & dist(C_k, Y_i) \leq d_{max} \\ 0 & \text{otherwise} \end{cases} \qquad \text{Eq. 54}$$

or alternatively the distances between $C_k$ and the hit nodes $X_1, \ldots, X_n$:

$$Q_k = \begin{cases} 1 & \min_{l=1,\ldots,n} dist(C_k, X_l) \leq d_{max} \\ 0 & \text{otherwise} \end{cases} \qquad \text{Eq. 55}$$

Recall also that in the case where there is a single hit node X, it is necessary to evaluate the probability that given a parent node $P_j$ and a hit node X, only one child node $C_1$ of $P_j$ occurs, where $C_1$ is or is an ancestor of X:

$$Pr[C_1 \text{ no sibling}|X \wedge P_j]$$

Figure 15:
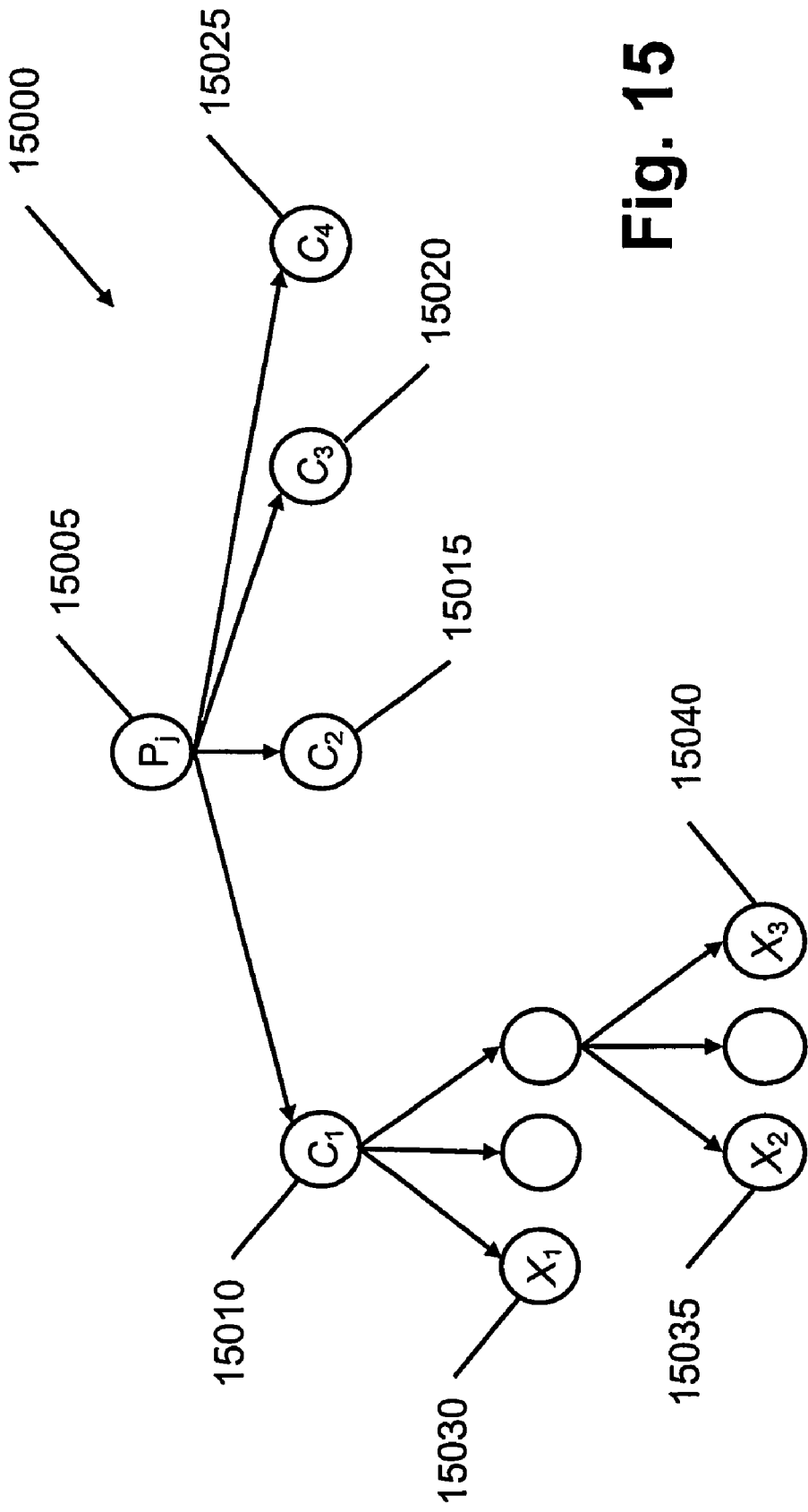
FIG. 15 is an example of a parent node whose descendant hit nodes are all located under a single child node.

In generalising this quantity to the present scenario, two possibilities can arise, namely the special case where r=1, and the more general case r>1. An example of the former is shown in FIG. 15 where, there are three hit nodes 15030, 15035 and 15040 located within the sub-tree rooted at node 15005. However, all three hit nodes reside under a single child node 15010 of node 15005.

An approach for handling this special case is to replace the term $Pr[C_1 \text{ no sibling}|X \wedge P_j]$ with the expression $$Q_0 = \sum_{l=1}^{s} Pr_{mean}[C_1 \text{ no sibling}| X_l \wedge P_j] \qquad \text{Eq. 56}$$

in an analogous fashion to the use of the quantity $Q_k$ in Eq. 52. As in the case of $Q_k$ above, there is a possibility that Eq. 56 is undefined when $freq_{mean}(P_j, X_l)=0$ for any $X_l$, l=1, ..., s.

Consequently, the actual value assigned to $Q_0$ is based on the set S obtained from the method 21000, if the method 21000 returns with success:

$$Q_0 = \sum_{X \in S} Pr_{mean}[C_1 \text{ no sibling} | X \wedge P_j] \qquad \text{Eq. 57}$$

Otherwise if the method 21000 fails, then $Q_0$ is assigned a value based on the distance of $P_j$ from the root node $Y_i$:

$$Q_0 = \begin{cases} 0 & dist(P_j, Y_i) + 1 \le d_{max} \\ 1 & \text{otherwise} \end{cases} \qquad \text{Eq. 58}$$

or alternatively the distances between $P_j$ and the hit nodes $X_1, \ldots, X_n$:

$$Q_0 = \begin{cases} 0 & \min_{l=1,\ldots,n} dist(P_j, X_l) + 1 \le d_{max} \\ 1 & \text{otherwise} \end{cases} \qquad \text{Eq. 59}$$

Figure 16:
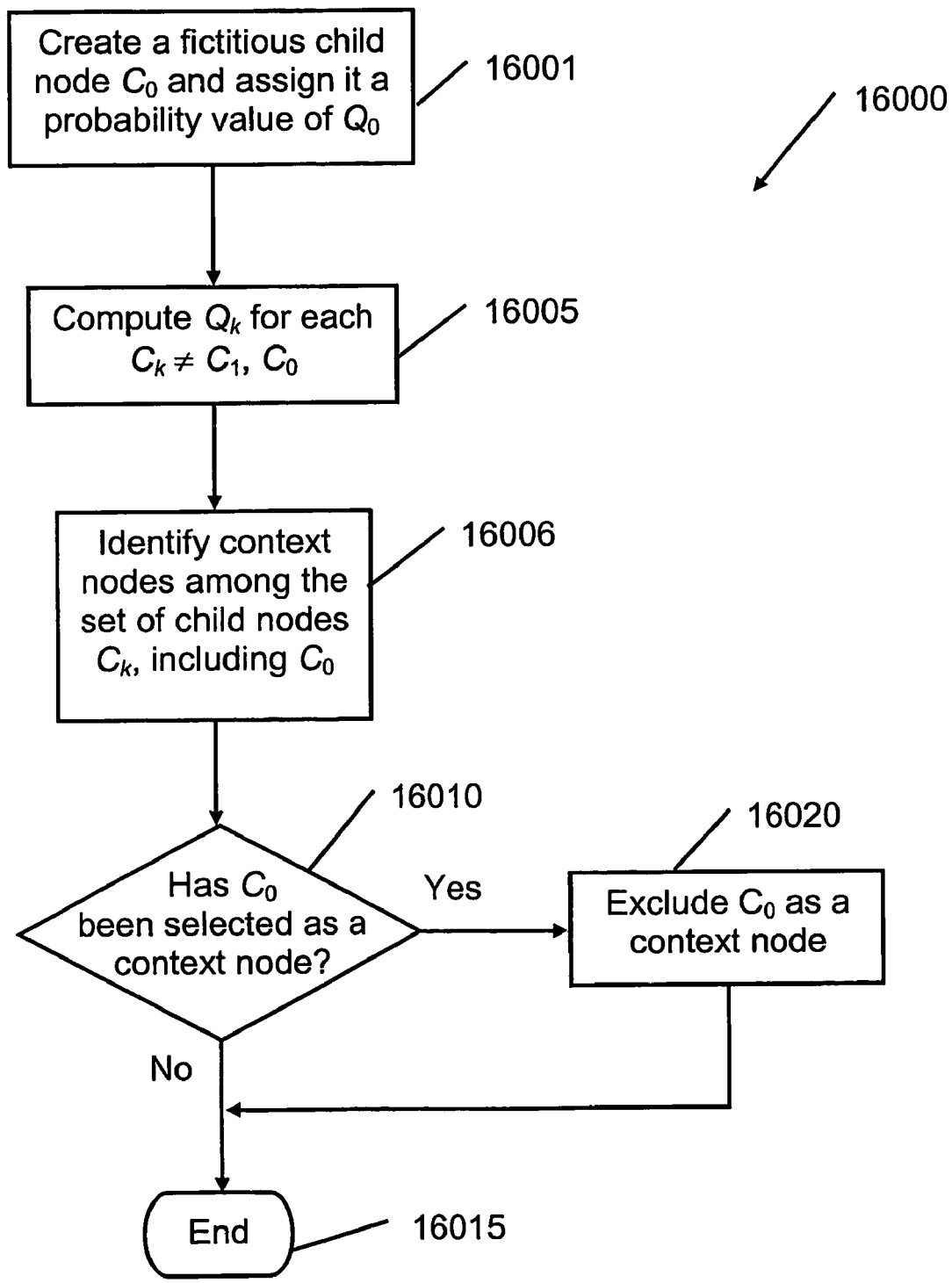
FIG. 16 is a flowchart of a method for identifying context nodes among a set of child nodes of a parent node lying along a directed path from the root node to a hit node, with probability averaging, for the case where all multiple hit nodes are located under a single child node.

A method 16000 depicted in the flowchart of FIG. 16 for identifying context nodes among the set of child nodes $C_k$ of a parent node $P_j$ for the case r=1, s>1 is very similar to the method 14000 for the single hit node case. The method 16000 begins at step 16001 where a fictitious child node $C_0$ is conceptually created and added to the list of actual child nodes $C_1, \ldots, C_m$ and is assigned a value $Q_0$ defined in Eq. 57, Eq. 58, or Eq. 59, and at the next step 16005, the actual child nodes $C_k$ except $C_1$ are assigned values $Q_k$ correspondingly defined in Eq. 53, Eq. 54, or Eq. 55 respectively. Step 16006 follows step 16005 and invokes the method 7000 at step 7005 (skipping step 7001) to select among the child nodes $C_0, \ldots, C_m$ a set of context nodes. When the method 7000 exits, the method 16000 resumes at decision step 16010 where a check is made to determine if the fictitious child node $C_0$ has been selected as a context node. If so then execution continues at step 16020 where $C_0$ is excluded as a context node. The method 16000 subsequently terminates at step 16015. If the test at 16010 fails, then the method 16000 proceeds directly to the termination step 16015.

For the general case where r>1 (and hence s>1), an analogous quantity to $Pr[C_1 \text{ no sibling}|X_1\hat{}\ldots\hat{}X_s\hat{}P_j]$ used in the case r=1 is $$\sum_{X \in S} Pr[C_1 \wedge \ldots \wedge C_r \wedge \neg C_{r+1} \wedge \ldots \wedge \neg C_m | X \wedge P_j]$$

where S is the set returned by the method 21000 if it exits with success. Unfortunately the probability in the summation cannot be easily estimated from the existing frequency tables. Consequently, a slightly different expression is used in its place. Let the elements of set S that are not located in the sub-tree rooted at each child node $C_k$, $1 \le k \le r$ be denoted by $H_{kl}$ for $1 \le l \le s_k$, where $s_k \le |S|$. For each child node $C_k$, $1 \le k \le r$, the following is computed:

$$Q_k = \sum_{l=1}^{s_k} Pr_{mean}[C_k | H_{kl} \wedge P_j] \qquad \text{Eq. 60}$$

The rationale behind the quantity above expression is that when summed together over all $C_k$, $1 \le k \le r$, a quantity approximating the probability of child nodes $C_1, \ldots, C_r$ occurring together is obtained (although not a true probability since it can take on a value >1). As in the case r=1, if method 21000 returns with failure then $Q_k$ is obtained from the distance of $P_j$ to from the root node $Y_i$, for $1 \le k \le r$:

$$Q_k = \begin{cases} 0 & dist(P_j, Y_i) + 1 \le d_{max} \\ 1 & \text{otherwise} \end{cases} \qquad \text{Eq. 61}$$

or alternatively the distances between $P_j$ and the hit nodes $X_1, \ldots, X_n$:

$$Q_k = \begin{cases} 0 & \min_{l=1,\ldots,n} dist(P_j, X_l) + 1 \le d_{max} \\ 1 & \text{otherwise} \end{cases} \qquad \text{Eq. 62}$$

Figure 17:
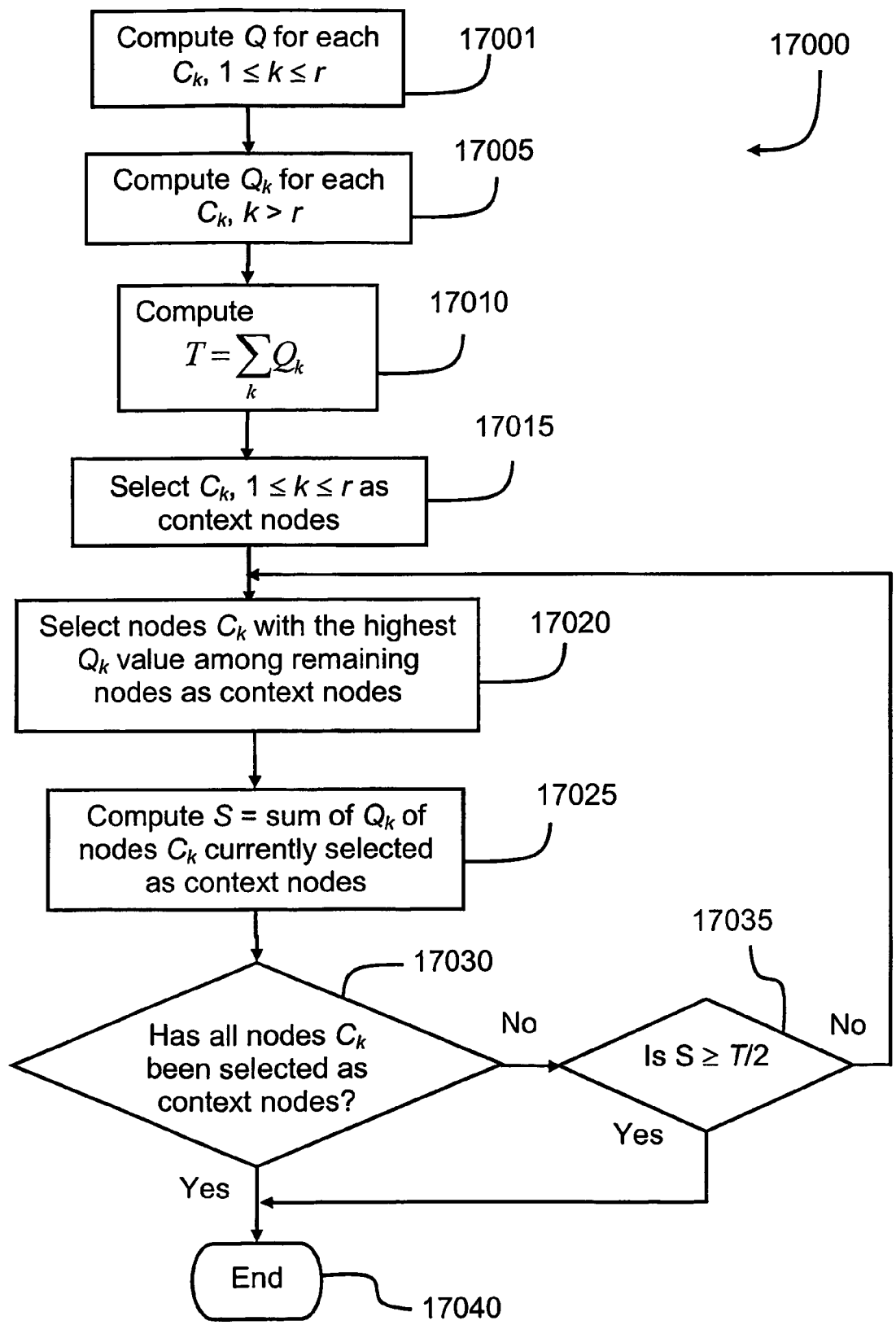
FIG. 17 is a flowchart of a method for identifying context nodes among a set of child nodes of a parent node lying along a directed path from the root node to a hit node, with probability averaging, for the case where hit nodes are located under multiple child nodes.
Figure 18:
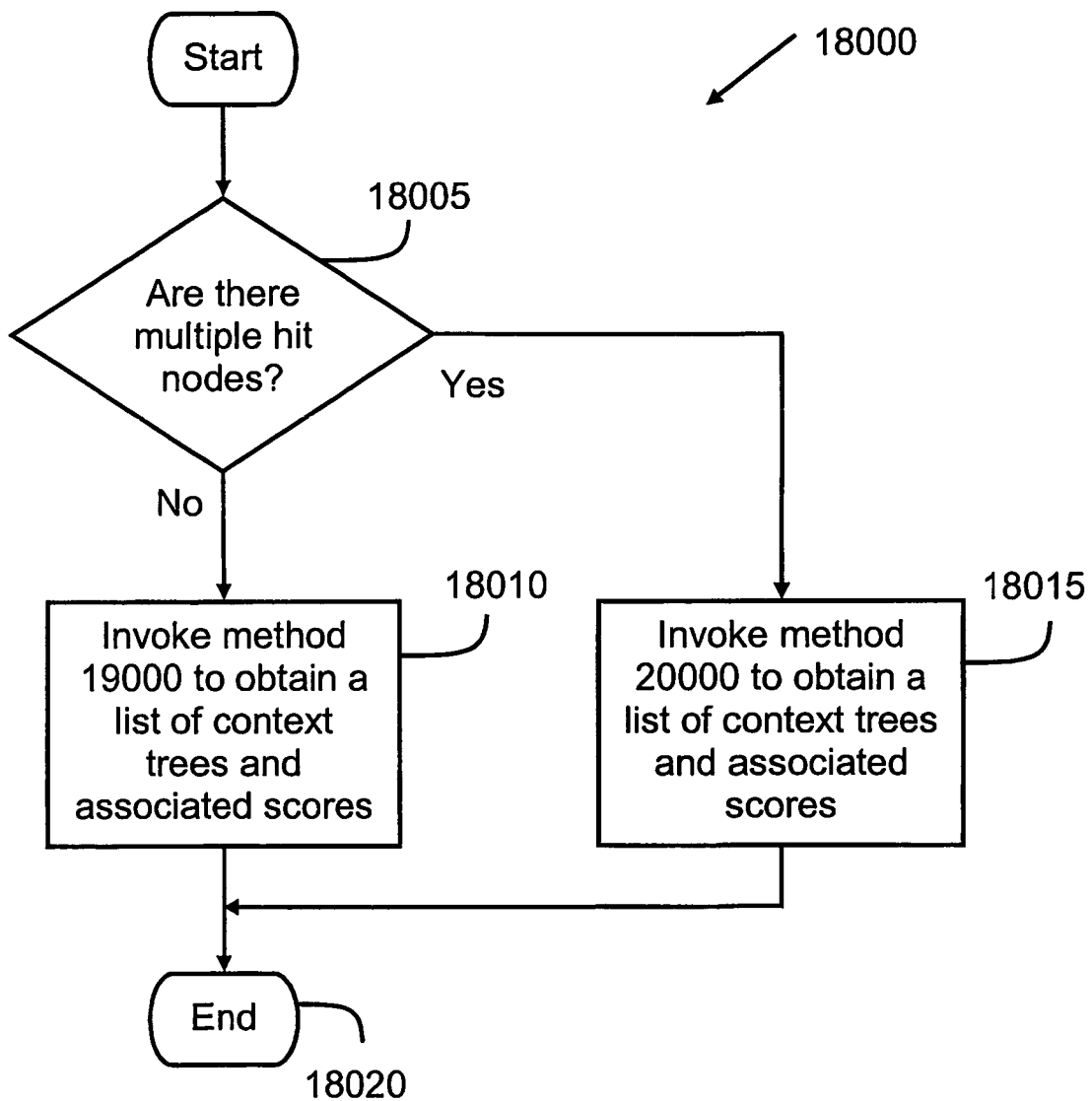
FIG. 18 is a flowchart of a method for identifying context nodes in which one or multiple hit nodes may be present.
Figure 19:
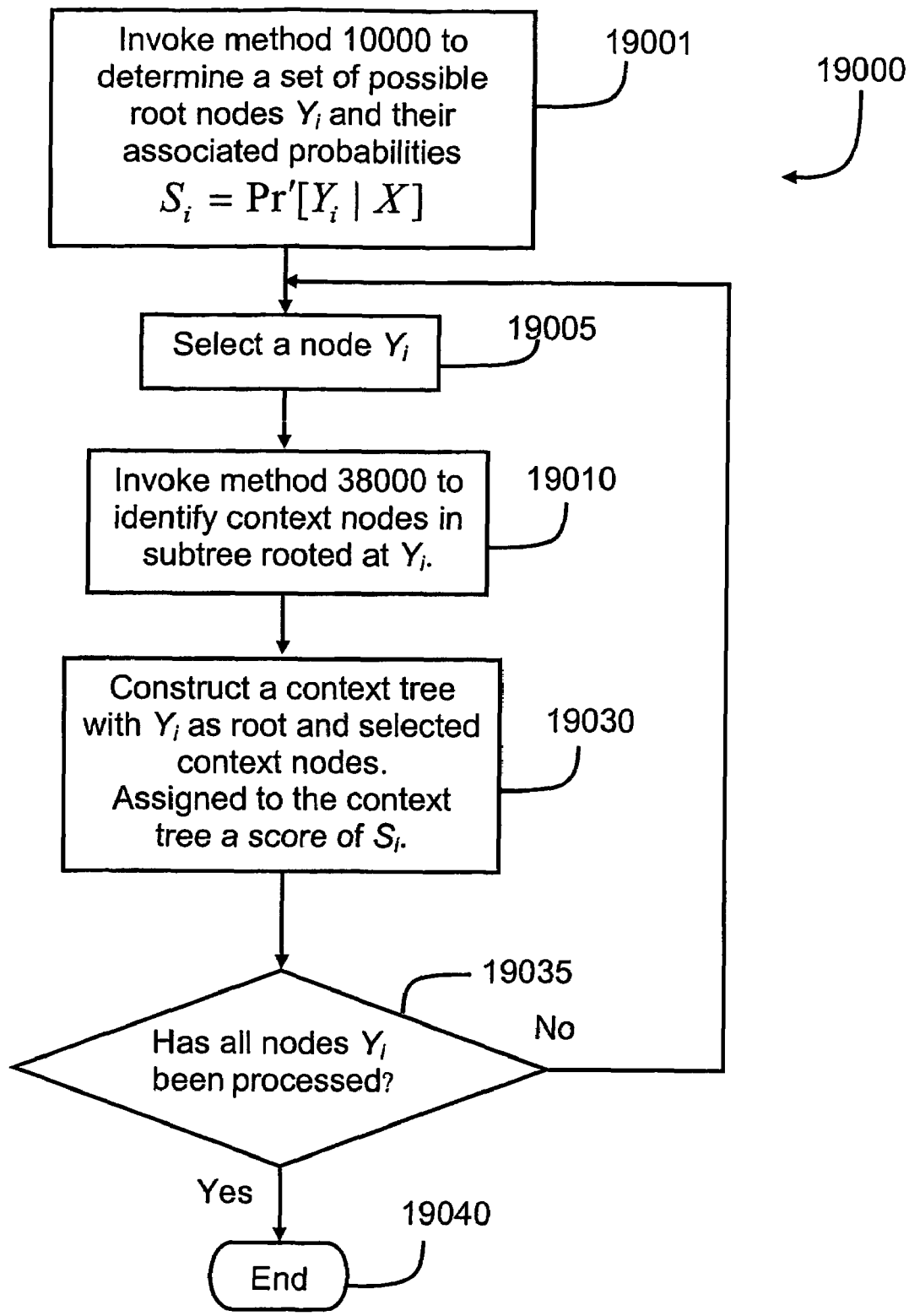
FIG. 19 is a flowchart of a method for constructing context trees for cases involving a single hit node.
Figure 20:
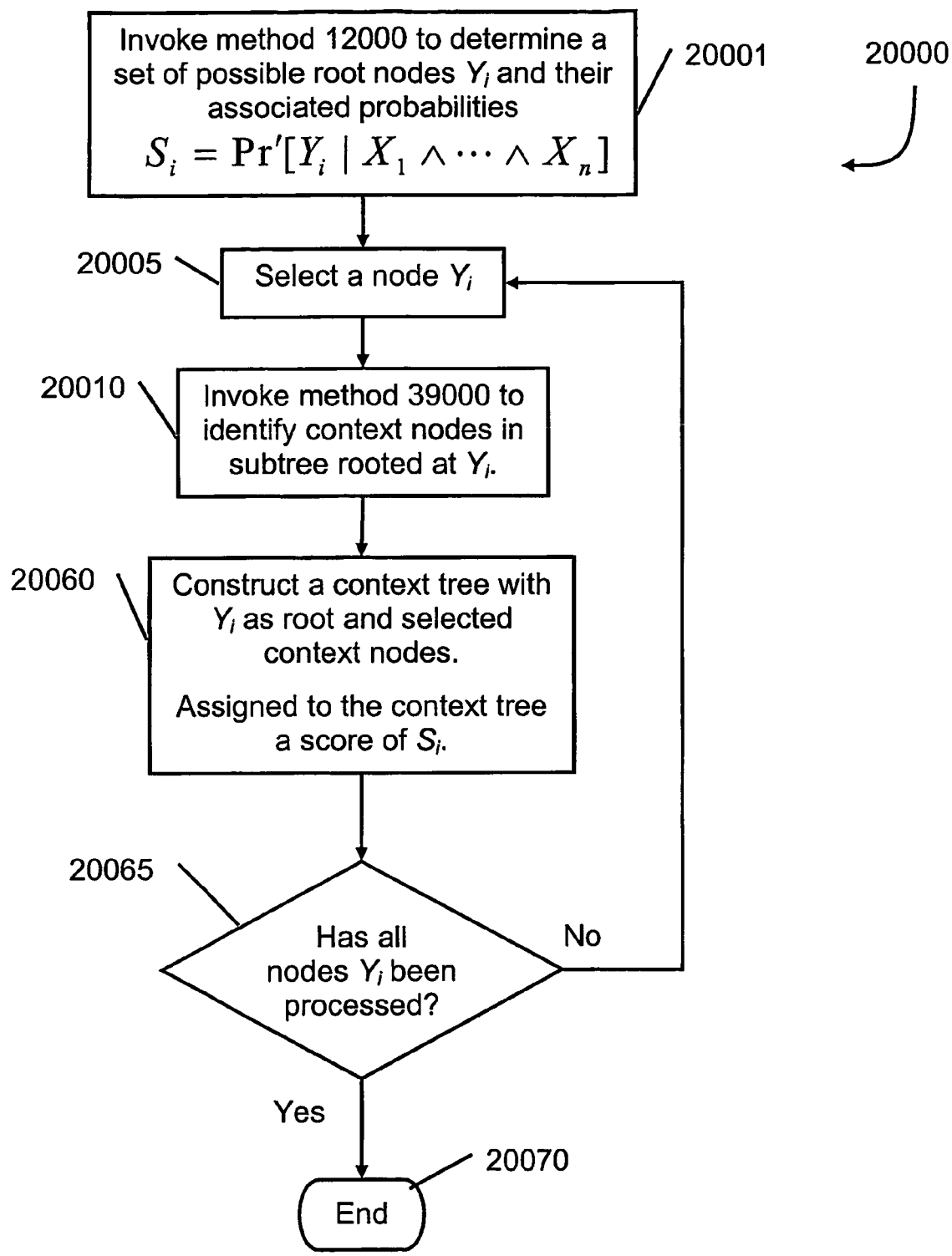
FIG. 20 is a flowchart of a method for constructing context trees for cases involving multiple hit nodes.

A method 17000 for selecting context nodes among the set of child nodes $C_1, \ldots, C_m$ is now described for the general case r>1, s>1, with reference to the flowchart of FIG. 17. Method 17000 begins at step 17001 where each child node $C_k$, $1 \le k \le r$ is assigned a value $Q_k$ computed using Eq. 60, Eq. 61, or Eq. 62. Step 17005 follows in which the remaining child nodes are assigned values $Q_k$ correspondingly computed using Eq. 53, Eq. 54, or Eq. 55 respectively. At the next step 17010, the values $Q_k$ are summed over all child nodes and denoted by T. The method 17000 continues at step 17015 where all child nodes containing hit nodes in their sub-trees, namely $C_k$, $1 \le k \le r$, are selected as context nodes. At the next step 17020, nodes $C_k$ with the highest assigned value among the remaining child nodes are also selected as context nodes. If more than one child node exists with the same highest value then all such nodes are selected as context nodes. The sum of the assigned values of all child nodes so far selected as context nodes is then computed at step 17025 and denoted by S. Execution then proceeds to the decision step 17030, at which point if all child nodes $C_k$ have been selected as context nodes then the method 17000 terminates at step 17040. If however there are one or more child nodes $C_k$ not yet selected as context nodes then the method 17000 continues to another decision step 17035. At step 17035 a check is made to ascertain whether $S \ge T/2$ and if so the method 17000 again terminates at step 17040. If $S<T/2$ then execution returns to step 17020 where more nodes are selected as context nodes.

The preceding descriptions present various methods for handling different stages and operating scenarios encountered when performing keyword searching in hierarchical data structures. These methods are incorporated into a single overall procedure 18000 which elaborates on step 2010 of FIG. 2, illustrated by the flowchart in FIG. 18 which comprises sub procedures 19000 and 20000 shown in FIG. 19 and FIG. 20, respectively. The method 18000 begins at decision step 18005 where a check is made to determine whether there are multiple hit nodes in the schema graph. If so then execution proceeds to step 18015 where the method 20000 is invoked, otherwise it proceeds to step 18010 where the method 19000 is invoked. In either case, the method 20000 or 19000 returns with a list of context trees, each having an associated score. The following is a detailed description of the method 19000, followed by that of the method 20000.

The method 19000 begins at step 19001 where the method 10000 is invoked to determine a list of possible root nodes $Y_i$ that are ancestor nodes of the hit node X. Each $Y_i$ is the root node of a possible context tree. The method 10000 also computes a value $S_i = Pr'[Y_i|X]$ for each node $Y_i$. The method 19000 then continues at step 19005 where a node $Y_i$ determined in the previous step is selected for processing. At the next step 19010, method 38000 which is a sub-process within method 19000 is invoked to identify context nodes in the subtree rooted at node $Y_i$. Method 19000 then continues at step 19030, where a context tree is constructed comprising all identified context nodes and with $Y_i$ as the root node. The tree is assigned a score of $S_i$ computed at step 19001. The method 19000 then proceeds to decision step 19035. If all nodes $Y_i$ obtained at step 19001 have been processed, then the method ends at step 19040, otherwise it returns to step 19005 to process another node $Y_i$.

The method 38000 invoked within method 19000 begins at step 38010 where node $Y_i$ is first assigned to $P_j$. Execution proceeds to the decision step 38015 and then to step 38020 if $P_j$ does not lie on the directed path from $Y_i$ to the hit node X. At step 38020, the method 13000 is invoked to select among the child nodes of $P_j$ a set of context nodes. At the subsequent step 38025, the method 38000 is recursively invoked at step 38020 (skipping steps 38010 and 38015) for each non-leaf child node $C_k$ selected as context node, with $C_k$ playing the role of $P_j$ in order to identify additional context nodes among its descendants. When the invocations for all such child nodes return, method 38000 terminates at step 38040. Method 38000 also proceeds directly to the termination step 38040 if $P_j$ has no child nodes, or if none of its non-leaf child nodes have been selected as context nodes at step 38020.

The decision step 38015 succeeds if $P_j$ lies on the directed path from $Y_i$ to X, in which case executions proceeds to step 38045. Here the method 14000 is invoked to select among the child nodes of $P_j$ a set of context nodes, with $C_1$ denoting the child node lying on the directed path from $P_j$ to X. A the subsequent step 38050, method 38000 is recursively invoked at step 38015 (skipping step 38010) for each non-leaf child node $C_k$ selected as context node, with $C_k$ playing the role of $P_j$ in order to identify additional context nodes among its descendants. When the invocations for all such child nodes return, method 38000 terminates at step 38040.

The method 20000 begins at step 20001 where the method 12000 is invoked to determine a list of possible root nodes $Y_i$ that are ancestor nodes of the hit nodes $X_1, \ldots X_n$. Each $Y_i$ is the root node of a possible context tree. The method 12000 also computes a value $S_i = Pr'[Y_i|X_1 \ldots X_n]$ for each node $Y_i$. The method 20000 then continues at step 20005 where a node $Y_i$ determined in the previous step is selected for processing. At the next step 20010, method 39000 which is a sub-process within method 20000 is invoked to identify context nodes in the subtree rooted at node $Y_i$. Method 20000 then continues at step 20060, where a context tree is constructed comprising all identified context nodes and with $Y_i$ as the root node. The tree is assigned a score of $S_i$ computed at step 20001. The method 20000 then proceeds to decision step 20065. If all nodes $Y_i$ obtained at step 20001 have been processed, then the method ends at step 20070, otherwise it returns to step 20005 to process another node $Y_i$.

The method 39000 invoked within method 19000 begins at step 39010 where node $Y_i$ is first assigned to $P_j$. Execution proceeds to the decision step 39015 and then to step 39020 if there are no hit nodes in the sub-tree root at $P_j$. At step 39020, the method 13000 is invoked to select among the child nodes of $P_j$ a set of context nodes. At the subsequent step 39025, the method 39000 is recursively invoked at step 39020 (skipping steps 39010 and 39015) for each non-leaf child node $C_k$ selected as context node, with $C_k$ playing the role of $P_j$ in order to identify additional context nodes among its descendants. When the invocations for all such child nodes return, method 39000 terminates at step 39060. Method 39000 also proceeds directly to the termination step 39060 if $P_j$ has no child nodes, or if none of its non-leaf child nodes have been selected as context nodes at step 39020.

The decision step 39015 succeeds if there is one or more hit nodes within the subtree rooted at $P_j$, in which case execution proceeds to another decision step 39030. If there is only a single hit node in the sub-tree under $P_j$ then this decision step fails and execution proceeds to step 39035, otherwise it continues to yet another decision step 39040. At decision step 39040, a test is made to determine whether all hit nodes under $P_j$ are located under only one of its child nodes. If so, then execution proceeds to step 39045, otherwise it proceeds to step 39050. At step 39050, with $C_1, \ldots, C_r$ denoting the child nodes of $P_j$ under which one or more hit nodes reside, the method 17000 is invoked to select among the child nodes of $P_j$ a set of context nodes. If however decision step 39040 leads to step 39045, then the method 16000 is invoked to select among the child nodes of $P_j$ a set of context nodes, with $C_1$ being the sole child node of $P_j$ that contains hit nodes in its sub-tree.

Returning now to step 39035, let the path from $P_j$ to its one and only descendant hit node pass through its child node $C_1$. The method 14000 is invoked to select among the child nodes of $P_j$ a set of context nodes.

At the completion of each of steps 39035, 39045 and 39050, the method 39000 recursively invokes itself at step 39015 (skipping step 39010) for each non-leaf child node $C_k$ selected as context node, with $C_k$ playing the role of $P_j$ in order to identify additional context nodes among its descendants. When the invocations for all such child nodes return, method 39000 terminates at step 39060.

ILLUSTRATIVE EXAMPLE

Figure 23:
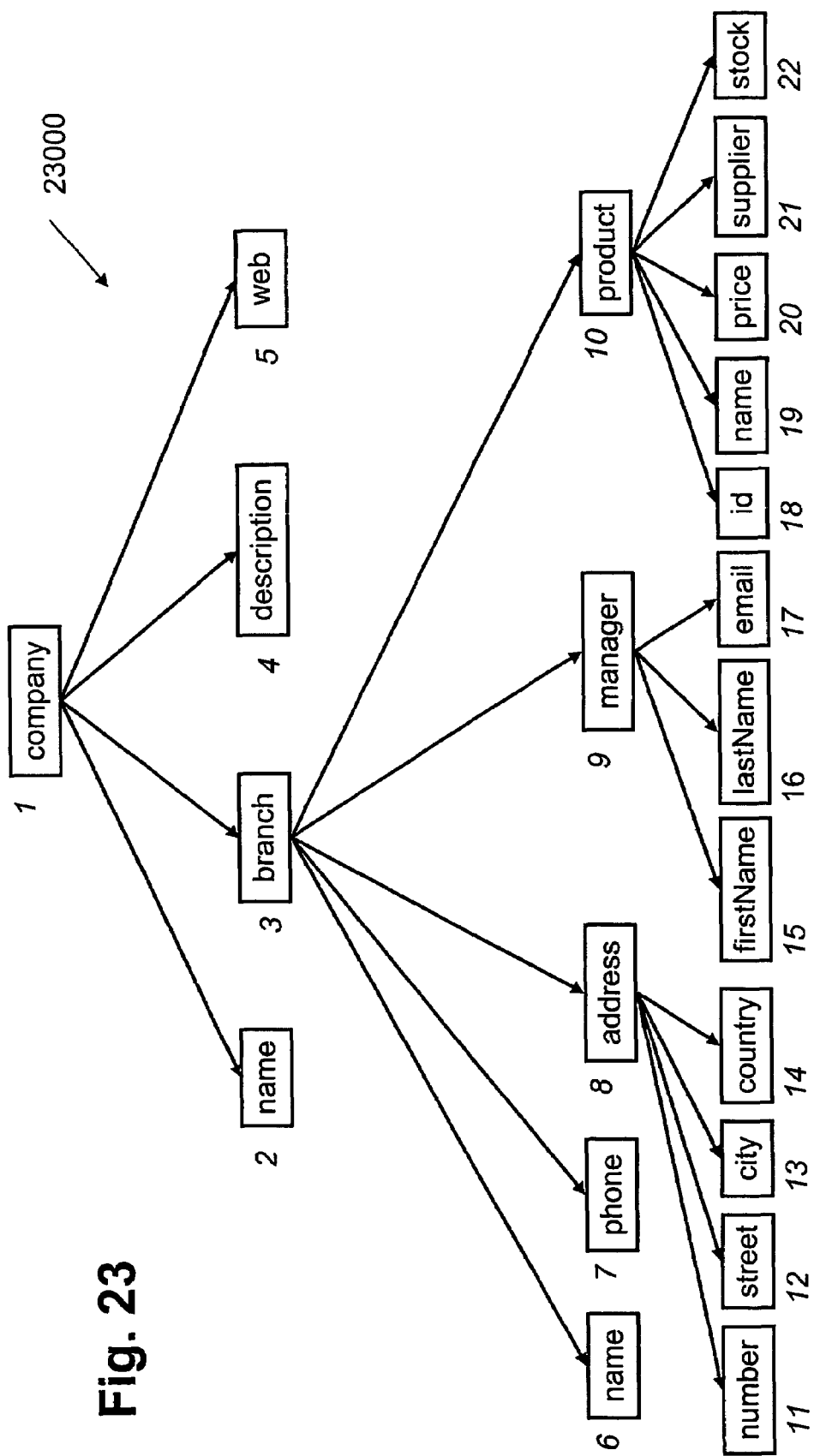
FIG. 23 is an example schema graph.

The operation of a preferred implementation is now demonstrated with an example hierarchical XML data source below. The XML source comprises data relating to a company named "XYZ" such as its web addresses, branch names and locations, and its range of sales products at each branch. A schema graph representation of the XML data is shown in FIG. 23.

```
XML SOURCE
    <company>
        <name>XYZ</name>
        <web>http://www.xyz.com</web>
        <description>
            Company founded in 1999 specialising
            in hi-tech consumers electronics
        </description>
        <branch>
            <name>North Ryde</name>
            <phone>0291230000</phone>
            <address>
                <number>1</number>
                <street>Lane Cove</street>
                <city>Sydney</city>
                <country>Australia</country>
            </address>
```

-continued

```
<manager>
    <firstName>Jim</firstName>
    <lastName>Smith</lastName>
    <email>jsmith@xyz.com</email>
</manager>
<product>
    <id>1</id>
    <name>Plasma TV</name>
    <price>$10000</price>
    <supplier>JEC</supplier>
    <stock>10</stock>
</product>
<product>
    <id>2</id>
    <name>Mp3 player</name>
    <price>$500</price>
    <supplier>HG</supplier>
    <stock>20</stock>
</product>
</branch>
<branch>
    <name>Morley</name>
    <phone>0891230000</phone>
    <address>
        <number>1</number>
        <street>Russel</street>
        <city>Perth</city>
        <country>Australia</country>
    </address>
    <manager>
        <firstName>Ted</firstName>
        <lastName>White</lastName>
        <email>twhite@xyz.com</email>
    </manager>
    <product>
        <id>3</id>
        <name>Video phone</name>
        <price>$2000</price>
        <supplier>NVC</supplier>
        <stock>15</stock>
    </product>
    <product>
        <id>4</id>
        <name>PDA</name>
        <price>$1000</price>
        <supplier>LP</supplier>
        <stock>50</stock>
    </product>
</branch>
</company>
```

Figures 24, 25:
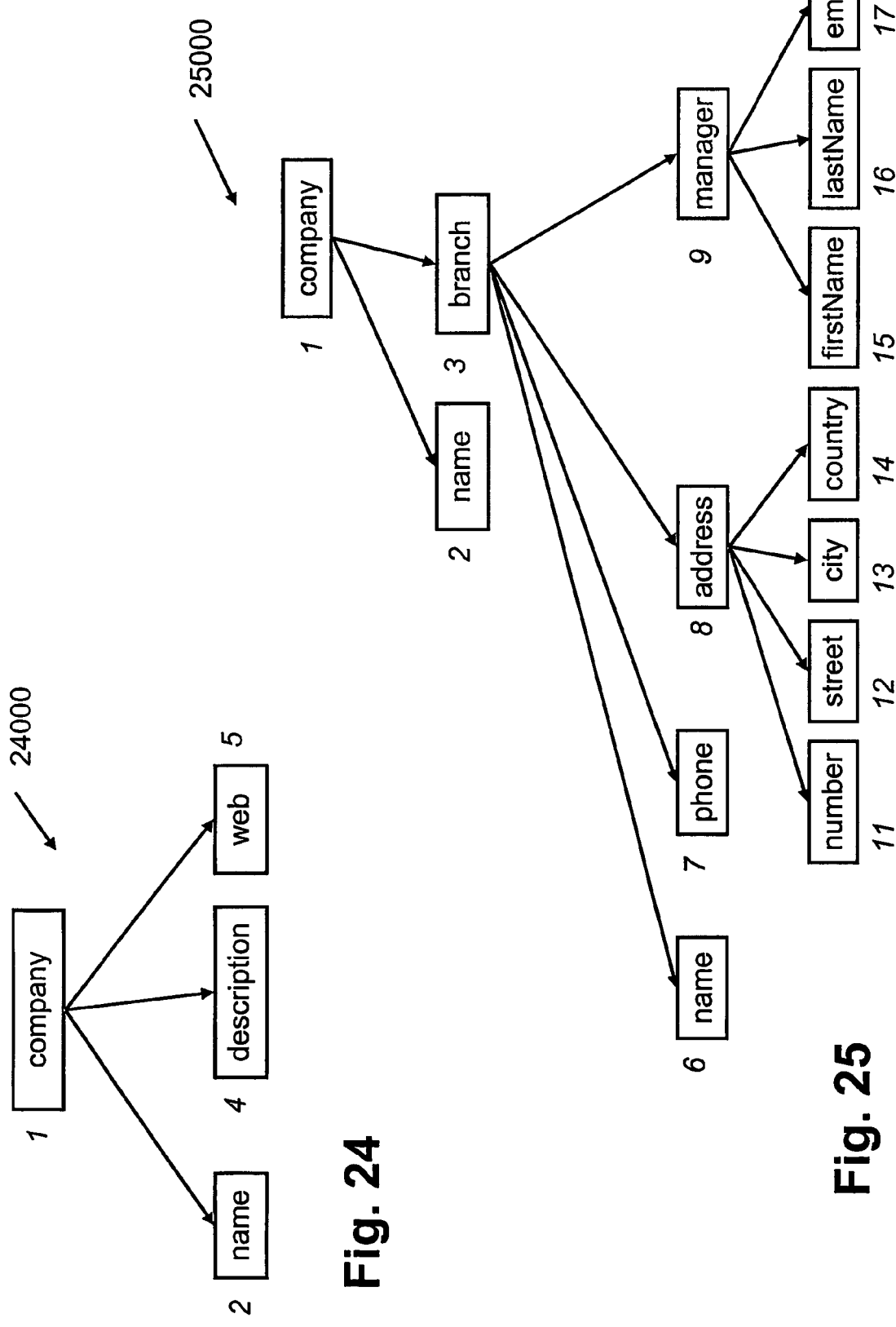
FIG. 24 is a schema graph of an example data view.
FIG. 25 is a schema graph of another example data view.
Figure 26:
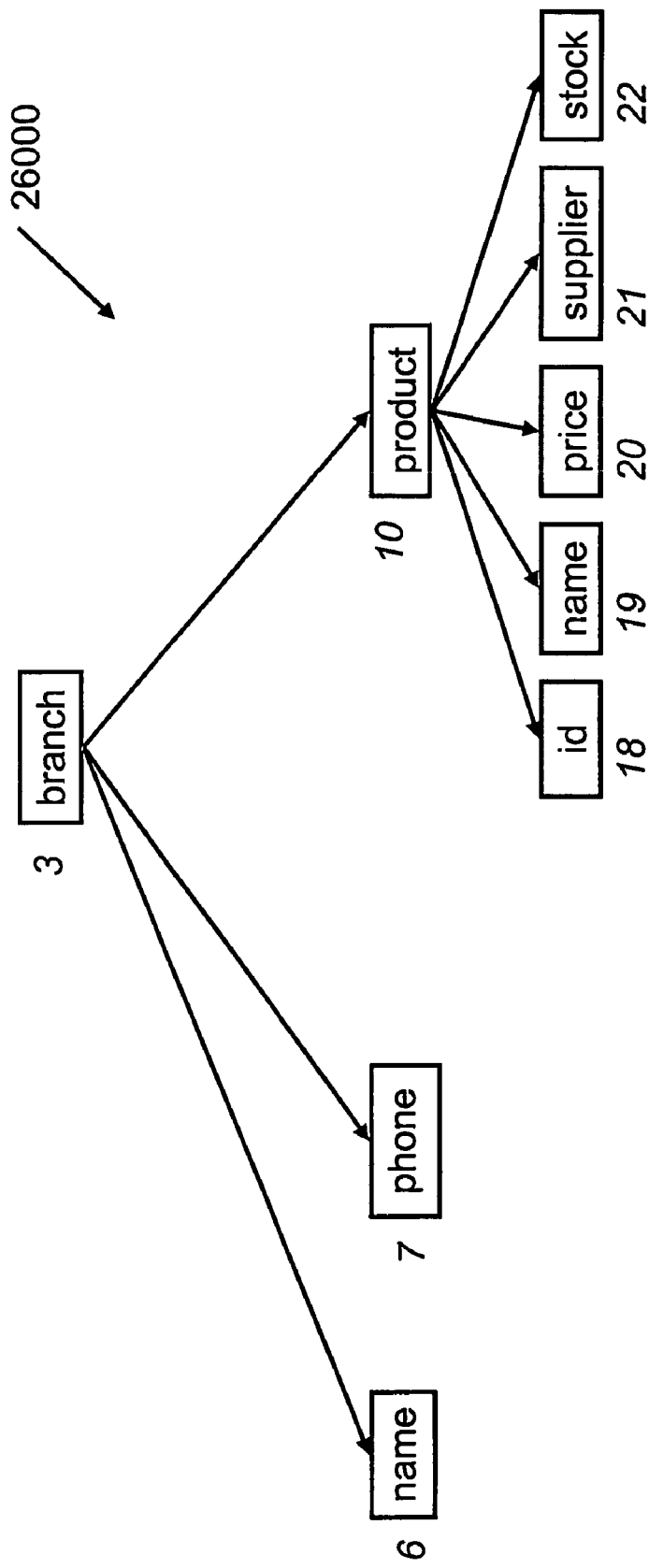
FIG. 26 is a schema graph of yet another example data view.
Figure 27:
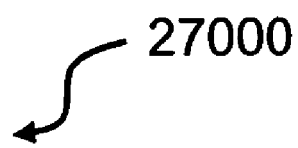
FIG. 27 is an occurrence frequency table arising from the data views in FIGS. 24, 25 and 26.

In FIG. 23, the integer shown next to each node is a unique ID number assigned to the node. Suppose that there are three existing views of this data source. The first is a view displaying the company's name, description and web address. The second is a listing of the company's branches and their locations, and finally the third view lists the line of products at each branch. Schema graph representations of these views are shown in FIG. 24, FIG. 25 and FIG. 26 respectively. As a result of these views, the occurrence 27000, co-occurrence 28000, leaf co-occurrence 29000, and sole child co-occurrence 30000 frequency tables are as shown in FIG. 27, FIG. 28, FIG. 29 and FIG. 30 respectively. The joint-occurrence frequency table, being three-dimensional, is depicted by five separate two-dimensional tables 31000, 32000, 33000, 34000 and 35000. FIG. 31 comprises entries freq($C_k$, $P_j$, X) in the table with $P_j$=node 1. S$_i$milarly FIG. 32, FIG. 33, FIG. 34 and FIG. 35 each comprises entries with $P_j$=node 3, node 8, node 9, and node 10 respectively. In all frequency tables shown, an empty cell such as Item 28005, as seen in FIG. 28, denotes an invalid node combination whose associated frequency is riot required to be stored.

uppose that a user wishes to locate a particular product in the city where the user resides. The user enters the product's name, "Mp3 player", and the name of the city, "Sydney" and performs a keyword search for both names. As seen from FIG. 23 this results in two hit nodes $X_1$=node 19 and $X_2$=node 13. To determine possible context trees for the keyword search operation, the system 4000 invokes method 18000 of FIG. 18. Since there is more than one hit node, the method 18000 subsequently invokes the method 20000 at step 18015. The method 20000 in turn invokes the method 12000 at step 20001 to obtain a list of nodes $Y_i$ to serve as root nodes of the resulting context trees.

The method 12000 first identifies at step 12001 node 3 as the root node of the smallest sub-tree containing both hit nodes $X_1$ and $X_2$. Thus A=node 3. The method 12000 then begins a recursive procedure to compute an occurrence probability value for each of A and its ancestors, given the hit nodes. At node A $$Pr'[A|X_1 \wedge X_2]=1$$

At $Y_1$=node 1, the parent of node A, using Eq. 47, Eq. 48 and Eq. 49

$$Pr_{mean}[\text{node } 1 \mid A \wedge X_1 \wedge X_2] =$$
$$\frac{freq(\text{node 1, node 19})freq(\text{node 1, node 13})freq(\text{node 3})}{freq(\text{node 3, node 19})freq(A, \text{node 13})freq(\text{node 1})} = 0$$

Thus $$Pr'[\text{node } 1 \mid X_1 \wedge X_2] = 0$$

and $$Pr'[A \text{ root} \mid X_1 \wedge X_2] = 1$$

Consequently the method 12000 exits with node A as a single candidate root node for a context tree. This context tree is assigned a score of 1. After the completion of the method 12000, the method 20000 continues and with the second, top-down traversal phase where descendants of the root node $Y_i$=A are processed to identify context nodes among them. This phase begins at step 20010 where $P_j$ is first set to be node 3. Since this node is an ancestor of the hit nodes $X_1$ and $X_2$, which are located under two distinct child nodes, execution proceeds eventually to step 39050 of method 39000, where the method 17000 is invoked to determine context nodes among its children. The values $Q_1, \ldots, Q_5$ assigned to the child nodes 6-10 respectively of node 3 due to method 17000 are as follows:

$$Q_1 = Pr_{mean}[\text{node } 6|X_1 \wedge P_j] + Pr_{mean}[\text{node } 6|X_2 \wedge P_j]$$
$$= \frac{freq(\text{node 6, node 3, node 19})}{freq(\text{node 3, node 19})} + \frac{freq(\text{node 6, node 3, node 13})}{freq(\text{node 3, node 13})}$$
$$= \frac{1}{1} + \frac{1}{1}$$
$$= 2$$

$$Q_2 = Pr_{mean}[\text{node } 7|X_1 \wedge P_j] + Pr_{mean}[\text{node } 7|X_2 \wedge P_j]$$
$$= \frac{freq(\text{node 7, node 3, node 19})}{freq(\text{node 3, node 19})} + \frac{freq(\text{node 7, node 3, node 13})}{freq(\text{node 3, node 13})}$$
$$= 2$$

-continued $$Q_3 = Pr_{mean}[\text{node } 8 | X_1 \wedge P_j]$$
$$= \frac{freq(\text{node } 8, \text{node } 3, \text{node } 19)}{freq(\text{node } 3, \text{node } 19)}$$
$$= 0$$

$$Q_4 = Pr_{mean}[\text{node } 9 | X_1 \wedge P_j] + Pr_{mean}[\text{node } 9 | X_2 \wedge P_j]$$
$$= \frac{freq(\text{node } 9, \text{node } 3, \text{node } 19)}{freq(\text{node } 3, \text{node } 19)} + \frac{freq(\text{node } 9, \text{node } 3, \text{node } 13)}{freq(\text{node } 3, \text{node } 13)}$$
$$= 1$$

$$Q_5 = Pr_{mean}[\text{node } 10 | X_2 \wedge P_j]$$
$$= \frac{freq(\text{node } 10, \text{node } 3, \text{node } 13)}{freq(\text{node } 3, \text{node } 13)}$$
$$= 0$$

Thus the set $Q_1, \ldots, Q_5$ sorted in descending order is $\{Q_1, Q_2, Q_4, Q_3, Q_5\}$ and sums to T=5. The set of context nodes selected by the method 17000 thus comprises node 6, node 7 (since $Q_1+Q_2>T/2$), and node 8, node 10 (since they are ancestors of hit nodes). Resuming at step 39055, the method 39000 then recursively invokes itself to identify context child nodes for each of the selected nodes that have children.

For $P_j=$node 8, execution proceeds to step 39035 since node 8 has a single descendant hit node (node 13), at which point method 14000 is invoked to identify context nodes among the set of child nodes 11-14. The probability values $Q_1$, $Q_2$, and $Q_4$ assigned to the child nodes 11, 12, and 14 respectively of $P_j$ due to the method 14000 are as follows:

$$Q_1 = Pr_{mean}[\text{node } 11 | X_2 \wedge P_j]$$
$$= \frac{freq(\text{node } 11, \text{node } 8, \text{node } 13)}{freq(\text{node } 8, \text{node } 13)}$$
$$= 1$$

$$Q_2 = Pr_{mean}[\text{node } 12 | X_2 \wedge P_j]$$
$$= \frac{freq(\text{node } 12, \text{node } 8, \text{node } 13)}{freq(\text{node } 8, \text{node } 13)}$$
$$= 1$$

$$Q_4 = Pr_{mean}[\text{node } 14 | X_2 \wedge P_j]$$
$$= \frac{freq(\text{node } 14, \text{node } 8, \text{node } 13)}{freq(\text{node } 8, \text{node } 13)}$$
$$= 1$$

In addition, the method 14000 also computes a value $Q_0$ for a fictitious child node $C_0$:

$$Q_0 = Pr_{mean}[\text{node } 13 \text{ no sibling} | X_2 \wedge P_j]$$
$$= \frac{freq(\text{node } 8 \text{ has } 1 \text{ child}, \text{node } 13)}{freq(\text{node } 8, \text{node } 13)}$$
$$= 0$$

Thus the set of probability values sorted in descending order is $\{Q_1, Q_2, Q_4, Q_0\}$ and sums to T=3. The set of context nodes selected by the method 14000 thus comprises node 11, node 12, node 14 (since $Q_1+Q_2+Q_4>T/2$ and $Q_1=Q_2=Q_4$), and node 13 (since it is an ancestor of a hit node).

A similar execution path is followed for the case $P_j=$node 10, with similar results being obtained. The set of context child nodes of node 10 are nodes' 18-22. The schema graph 3600 of the context tree is thus as shown in FIG. 36, comprising the hit nodes 19 and 13, and context nodes 3, 6-8, 10-14, 18-22. The actual context tree returned to the user comprising data items represented by these nodes is as follows:

```
<branch>
    <name>North Ryde</name>
    <phone>0291230000</phone>
    <address>
        <number>1</number>
        <street>Lane Cove</street>
        <city>Sydney</city>
        <country>Australia</country>
    </address>
    <product>
        <id>1</id>
        <name>Plasma TV</name>
        <price>$10000</price>
        <supplier>JEC</supplier>
        <stock>10</stock>
    </product>
    <product>
        <id>2</id>
        <name>Mp3 player</name>
        <price>$500</price>
        <supplier>HG</supplier>
        <stock>20</stock>
    </product>
</branch>
<branch>
    <name>Morley</name>
    <phone>0891230000</phone>
    <address>
        <number>1</number>
        <street>Russel</street>
        <city>Perth</city>
        <country>Australia</country>
    </address>
    <product>
        <id>3</id>
        <name>Video phone</name>
        <price>$2000</price>
        <supplier>NVC</supplier>
        <stock>15</stock>
    </product>
    <product>
        <id>4</id>
        <name>PDA</name>
        <price>$1000</price>
        <supplier>LP</supplier>
        <stock>50</stock>
    </product>
</branch>
```

INDUSTRIAL APPLICABILITY

It is apparent from the above that the arrangements described are applicable to the computer and data processing industries, and particularly in respect of presenting information from multiple searches.

The foregoing describes only some embodiments of the present invention, and modifications and/or changes can be made thereto without departing from the scope and spirit of the invention, the embodiments being illustrative and not restrictive.

(Australia Only) In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of presenting data from a hierarchical data source, said method comprising the steps of:
   (i) constructing a first view of the hierarchical data source;
   (ii) obtaining an occurrence probability of at least one context data from at least the first view of the hierarchical data source;
   (iii) identifying a compulsory entity in the first view;
   (iv) selecting a context entity from the first view and the context data based on the occurrence probability; and
   (v) presenting a hierarchical data structure, wherein the hierarchical data structure is a subset of the hierarchical data source, comprising a plurality of context data, wherein each of the plurality of context data corresponds to the identified compulsory entity and the selected context entity,
   wherein the hierarchical data structure is assigned a score equal to an occurrence probability of an ancestor node of the compulsory entity given the occurrence probability of the context data associated with the compulsory entity, and the context entity is selected from the group consisting of:
   (a) the ancestor node;
   (b) a first set of nodes along a directed path in the hierarchical data source from the ancestor node to the compulsory entity;
   (c) a second set of nodes selected from a descendent node of the ancestor node in the first view, each of the second set of nodes being selected based on a corresponding occurrence probability, said occurrence probability being derived from the occurrence probability of the ancestor node;
   (d) a third set of nodes selected from a descendent node of the ancestor node in the first view based on a corresponding distance from each of the third set of nodes to the ancestor node in the first view; and
   (e) a fourth set of nodes selected from a descendent node of the ancestor node in the first view based on a corresponding distance from each of the fourth set of nodes to the compulsory entity in the first view.

2. A method according to claim 1 wherein the hierarchical data source comprises a schema representation of said at least one data source and at least one previous view of the hierarchical data source.

3. A method according to claim 1 wherein said context data comprises data ranked according to relevance of said context entities to said compulsory entity.

4. A method according to claim 3 wherein said context data comprises at least one associated data.

5. A method according to claim 4 wherein said associated data comprises occurrence probability and a plurality of joint-occurrence frequencies of entities in said hierarchical data source observed in a previous view of the hierarchical data source.

6. A method according to claim 1 wherein said second set of nodes comprises one or more child nodes of at least one parent node in said first view of the hierarchical data source lying along said directed path from said ancestor node to said compulsory entity.

7. A method according to claim 1 wherein said corresponding distance comprises a number of links separating the nodes in said first view of the hierarchical data source.

8. A method according to claim 6 wherein, step (iv) comprises selecting said child nodes as context entities from all child nodes of said parent node, said selecting comprising the steps of:
   (iv-a) computing a first occurrence probability of said parent node appearing with none of its child nodes other than a fifth set of nodes, given an occurrence probability of said parent node, the ancestor node and said compulsory entity, said fifth set comprising at least one child node of said parent node lying along a directed path from said parent node to said compulsory entity;
   (iv-b) computing a second occurrence probability of each of said child nodes in a sixth set of nodes, given the occurrence probability of said parent node, the ancestor and said compulsory entity, said sixth set comprising at least one child node of said parent node that do not lie along a directed path from said parent node to said compulsory entity;
   (iv-c) computing a total sum of said first occurrence probability and said second occurrence probability;
   (iv-d) creating a fictitious node and assigning said fictitious node said first occurrence probability;
   (iv-e) selecting the fifth set of nodes or a seventh set of nodes as a set of context entities wherein the seventh set of child nodes is formed from said sixth set of child nodes and said fictitious node arranged in an order of descending values of said first occurrence probability or said second occurrence probability, and wherein a sum of said first occurrence probability or said second occurrence probabilities of said seventh set of nodes equals or exceeds half of said total sum; and
   (iv-f) deselecting as a context entity said fictitious node if said fictitious node is selected in said seventh set of child nodes,
   wherein said first occurrence probability and said second occurrence probability are approximated using an occurrence probability of a node in said hierarchical data source, a co-occurrence probability between a pair of nodes in said hierarchical data source, and joint-occurrence probability between an n-tuple of nodes in said hierarchical data source observed in said previous view.

9. A method according to claim 8 wherein said fictitious node prevents other nodes, whose associated probabilities are less than the probability associated with the fictitious node, from being selected, since a set of nodes are selected as a set of context entities when the total sum exceeds half of the total sum.

10. A method according to claim 6 wherein, step (iv) comprises selecting said child nodes as context entities from all child nodes of said parent node, said selecting comprising the steps of:
   (iv-a) computing a first occurrence probability of said parent node appearing with none of its child nodes other than a fifth set of nodes, given an occurrence probability of said parent node, the ancestor node and said compulsory entity, said fifth set comprising at least one child node of said parent node lying along a directed path from said parent node to said compulsory entity;
   (iv-b) selecting said fifth set of child nodes as a set of context entities; and
   if said first occurrence probability is less than or equal to 0.5:
   (iv-c) computing, a second occurrence probability of each of said child nodes in a sixth set of nodes, given the occurrence probability of said parent node, the ancestor node and said compulsory entity, said sixth set comprising at least one child node of said parent node that do not lie along a directed path from said parent node to said compulsory entity;

(iv-d) computing a total sum of said second occurrence probabilities of said second set of child nodes;

(iv-e) selecting as the set of context entities a seventh set of nodes formed from said sixth set of nodes in an order of descending values of said second occurrence probability until the sum of said second occurrence probability of said seventh set of child nodes equals or exceeds half of said total sum, wherein said first occurrence probability and said second occurrence probability are approximated using an occurrence probability of a node in said hierarchical data structure, co-occurrence probability between a pair of nodes in said hierarchical data structure, and joint-occurrence probability between an n-tuple of nodes in said hierarchical data structure observed in said previous view.

11. A method according to claim 1 wherein said second set of nodes comprises one or more child nodes of at least one parent node in said first view of the hierarchical data source not lying along said directed path from said ancestor node to said compulsory entity.

12. A method according to claim 11 wherein, step (iv) comprises selecting said child nodes as a set of context entities from all child nodes of said parent node, said selecting comprising the steps of:

(iv-a) computing a first occurrence probability of said parent node appearing without any of its child nodes given the occurrence probability of said parent node, the ancestor node and said compulsory entity;

(iv-b) computing a second occurrence probability of each of said child nodes of said parent node given the occurrence probability of said parent node the ancestor node and said compulsory entity;

(iv-c) computing a total sum of said first occurrence probability and said second occurrence probability of all child nodes of said parent node;

(iv-d) creating a fictitious node and assigning said fictitious node said first occurrence probability;

(iv-e) selecting the set of context entities from a set of said fictitious node and all child nodes of said parent node arranged in order of descending values of said first occurrence probability or said second occurrence probabilities until the sum of said first occurrence probability or said second occurrence probability of selected nodes equals or exceeds half of said total sum; and (iv-f) deselecting said fictitious node as a context entity if said fictitious node is among said selected nodes, wherein said first occurrence probability and said second occurrence probability are approximated using an occurrence probability of a node in said hierarchical data source, a co-occurrence probability between a pair of nodes in said hierarchical data source representation, and a joint-occurrence probability between an n-tuple of nodes in said hierarchical data source observed in said previous view.

13. A method according to claim 11 wherein, step (iv) comprises selecting said child nodes as a set of context entities from all child nodes of said parent node, said selecting comprising the steps of (iv-a) computing a first occurrence probability of said parent node appearing without any of its child nodes given the occurrence probability of said parent node, the ancestor node and said compulsory entity; and if said first occurrence probability is less than or equal to 0.5:

(iv-b) computing a second occurrence probability of each of the child nodes of said parent node given the occurrence probability of said parent node the ancestor node and said compulsory entity;

(iv-c) computing a total sum of said second occurrence probabilities of all child nodes of said parent node, and (iv-d) selecting the set of context entities from the set of all child nodes of said parent node in order of descending values of said second occurrence probability until the sum of said second occurrence probability of selected nodes equals or exceeds half of said total sum, wherein said first occurrence probability and said second occurrence probability are approximated using an occurrence probability of a node in said hierarchical data source, a co-occurrence probability between a pair of nodes in said hierarchical data source, and a joint-occurrence probability between an n-tuple of nodes in said hierarchical data source observed in at least one said previous view.

14. A method according to claim 1 wherein said compulsory entity represents one of:

(i) a location of one or more search keywords; and (ii) a user-selected entity.

15. A method according to claim 1 wherein said first view of the hierarchical data source comprises a tree representation and step (i) or (iii) includes detecting a user's selection of a sub-tree of said first view, and wherein, step (iv) comprises selecting a child node of a parent node in said user-selected sub-tree, said selecting comprising the steps of:

(iv-a) computing a first occurrence probability of said parent node appearing without any of its child nodes given the occurrence probability of said parent node, and the ancestor node of said user-selected sub-tree;

(iv-b) computing a second occurrence probability of each of said child nodes of said parent node given the occurrence probability of said parent node, and the ancestor node of said user-selected sub-tree;

(iv-c) computing a total sum of said first occurrence probability and said second occurrence probability of all child nodes of said parent node;

(iv-d) creating a fictitious node and assigning said fictitious node said first occurrence probability;

(iv-e) selecting the context entity from the set of said fictitious node and all child nodes of said parent node in order of descending values of said first occurrence probability or said second occurrence probability until the sum of said first occurrence probability or said second occurrence probability of selected nodes equals or exceeds half of said total sum; and (iv-f) deselecting said fictitious node if said fictitious node is among said selected nodes.

16. A method according to claim 1 wherein said first view of the hierarchical data source comprises a tree representation and step (i) or (iii) includes detecting a user's selection of a sub-tree of said first view, and wherein, (iv) comprises selecting a child node of a parent node in said user-selected sub-tree, said selecting comprising the steps of:

(iv-a) computing a first occurrence probability of said parent node appearing without any of its child nodes given the occurrence probability of said parent node, and the ancestor node of said user-selected sub-tree;

if said first occurrence probability is less than or equal to 0.5

(iv-b) computing a second occurrence probability of each of said child node of said parent node given the occurrence probability of said parent node, and the ancestor of said user-selected sub-tree;

(iv-c) computing a total sum of said second occurrence probability of all child nodes of said parent node; and (iv-d) selecting the context entity from the set of all child nodes of said parent node in order of descending values of said second occurrence probability until the sum of said second occurrence probability of selected nodes equals or exceeds half of said total sum.

17. A method of construction and presentation of data for a keyword searching operation in a hierarchical data source involving search keyword, said method comprising the steps of:

(i) constructing a graphical first view of the hierarchical data source;

(ii) identifying a compulsory entity in said graphical first view, wherein said compulsory entity is a node in said graphical first view representing a location of said search keyword;

(iii) obtaining an occurrence probability of at least one context data from at least the first view of the hierarchical data source;

(iv) constructing a hierarchical data structure, wherein the hierarchical data structure is a subset of the hierarchical data source comprising said compulsory entity and one or more context entities corresponding to the search keyword, wherein said context entities are obtained from said graphical first view using the context data and the occurrence probability; and (v) presenting said hierarchical data structure as a result of said keyword searching operation;

wherein the hierarchical data structure is assigned a score equal to an occurrence probability of an ancestor node of the compulsory entity given the occurrence probability of the context data associated with the compulsory entity; and the context entity is selected from the group consisting of:

(a) the ancestor node;

(b) a first set of nodes along a directed path in the hierarchical data source from the ancestor node to the compulsory entity;

(c) a second set of nodes selected from a descendent node of the ancestor node in the first view, each of the second set of nodes being selected based on a corresponding occurrence probability, said occurrence probability being derived from the occurrence probability of the ancestor node;

(d) a third set of nodes selected from a descendent node of the ancestor node in the first view based on a corresponding distance from each of the third set of nodes to the ancestor node in the first view; and (e) a fourth set of nodes selected from a descendent node of the ancestor node in the first view based on a corresponding distance from each of the fourth set of nodes to the compulsory entity in the first view.

18. A computer readable storage medium, having a computer-executable program recorded thereon, wherein the program is configured to make a computer execute a procedure to present data from a hierarchical data source, said program comprising:

(i) code for constructing a first view of the hierarchical data source;

(ii) code for obtaining an occurrence probability of at least one context data from at least the first view of the hierarchical data source;

(iii) code for identifying a compulsory entity in the first view;

(iv) code for selecting one context entity from the first view and the context data based on the occurrence probability; and (v) code for presenting a hierarchical data structure, wherein the hierarchical data structure is a subset of the hierarchical data source, comprising a plurality of context data, wherein each of the plurality of context data corresponds to the identified compulsory entity and the selected context entity;

wherein the hierarchical data structure is assigned a score equal to an occurrence probability of an ancestor node of the compulsory entity given the occurrence probability of the context data associated with the compulsory entity, and the context entity is selected from the group consisting of:

(a) the ancestor node;

(b) a first set of nodes along a directed path in the hierarchical data source from the ancestor node to the compulsory entity;

(c) a second set of nodes selected from a descendent node of the ancestor node in the first view, each of the second set of nodes being selected based on a corresponding occurrence probability, said occurrence probability being derived from the occurrence probability of the ancestor node;

(d) a third set of nodes selected from a descendent node of the ancestor node in the first view based on a corresponding distance from each of the third set of nodes to the ancestor node in the first view; and (e) a fourth set of nodes selected from a descendent node of the ancestor node in the first view based on a corresponding distance from each of the fourth set of nodes to the compulsory entity in the first view.

19. A computer readable storage medium, having a computer-executable program recorded thereon, wherein the program is configured to make a computer execute a procedure to construct and present data for a keyword searching operation in a hierarchical data source involving a search keyword, said program comprising:

(i) code for constructing a first view of the hierarchical data source;

(ii) code for identifying a compulsory entity in said first view, wherein said compulsory entity is a node in said first view representing a location of said search keyword;

(ii) obtaining an occurrence probability of at least one context data from at least the first view of the hierarchical data source;

(iv) code for constructing a hierarchical data structure, wherein the hierarchical data structure is a subset of the hierarchical data source, comprising said compulsory entity and one or more context entities, wherein said context entities are obtained from said first view using the context data and the occurrence probability; and (v) code for presenting said hierarchical data structure as a result of said keyword searching operation, wherein the hierarchical data structure is assigned a score equal to an occurrence probability of an ancestor node of the compulsory entity given the occurrence probability of the context data associated with the compulsory entity, and the context entity is selected from the group consisting of:
(a) the ancestor node;
(b) a first set of nodes along a directed path in the hierarchical data source from the ancestor node to the compulsory entity;
(c) a second set of nodes selected from a descendent node of the ancestor node in the first view, each of the second set of nodes being selected based on a corresponding occurrence probability, said occurrence probability being derived from the occurrence probability of the ancestor node;
(d) a third set of nodes selected from a descendent node of the ancestor node in the first view based on a corresponding distance from each of the third set of nodes to the ancestor node in the first view; and
(e) a fourth set of nodes selected from a descendent node of the ancestor node in the first view based on a corresponding distance from each of the fourth set of nodes to the compulsory entity in the first view.

20. Computer apparatus for constructing at least one data structure from a hierarchical data source, said apparatus comprising a constructing module configured to construct a first view of said hierarchical data source;
an obtaining module configured to obtain an occurrence probability of at least one data element from at least the first view of the hierarchical data source;
an identifying module configured to identify compulsory entity in the first view;
a selecting module configured to select a context entity from the first view and the context data based on the occurrence probability; and
a presenting module configured to present a hierarchical data structure, wherein the hierarchical data structure is a subset of the hierarchical data source, comprising a plurality of context data, wherein each of the plurality of context data corresponds to the identified compulsory entity and the selected context entity;
wherein the hierarchical data structure is assigned a score equal to an occurrence probability of an ancestor node of the compulsory entity given the occurrence probability of the context data associated with the compulsory entity; and
the context entity is selected from the group consisting of:
(a) the ancestor node;
(b) a first set of nodes along a directed path in the hierarchical data source from the ancestor node to the compulsory entity;
(c) a second set of nodes selected from a descendent node of the ancestor node in the first view, each of the second set of nodes being selected based on a corresponding occurrence probability, said occurrence probability being derived from the occurrence probability of the ancestor node;
(d) a third set of nodes selected from a descendent node of the ancestor node in the first view based on a corresponding distance from each of the third set of nodes to the ancestor node in the first view; and
(e) a fourth set of nodes selected from a descendent node of the ancestor node in the first view based on a corresponding distance from each of the fourth set of nodes to the compulsory entity in the first view.

21. Computer apparatus for construction and presentation of data for a keyword searching operation in a hierarchical data source involving a search keyword, said apparatus comprising:
a constructing module configured to construct a first view of the hierarchical data source;
an identifying module configured to identify a compulsory entity in said first view, wherein said compulsory entity is a node in said first view representing a location of search keyword;
an obtaining module configured to obtain an occurrence probability of at least one context data from at least the first view of the hierarchical data source;
a determining module configured to select a context entity from said first view and the occurrence probability context data obtained;
a constructing module configured to construct a hierarchical data structure, wherein the hierarchical data structure is a subset of the hierarchical data source comprising said compulsory entity and said context entity; and
a presenting module configured to present said hierarchical data structure comprising said compulsory entity and said context entity as a result of said keyword searching operation,
wherein the hierarchical data structure is assigned a score equal to an occurrence probability of an ancestor node of the compulsory entity given the occurrence probability of the context data associated with the compulsory entity, and
the context entity is selected from the group consisting of:
(a) the ancestor node;
(b) a first set of nodes along a directed path in the hierarchical data source from the ancestor node to the compulsory entity;
(c) a second set of nodes selected from a descendent node of the ancestor node in the first view, each of the second set of nodes being selected based on a corresponding occurrence probability, said occurrence probability being derived from the occurrence probability of the ancestor node;
(d) a third set of nodes selected from a descendent node of the ancestor node in the first view based on a corresponding distance from each of the third set of nodes to the ancestor node in the first view; and
(e) a fourth set of nodes selected from a descendent node of the ancestor node in the first view based on a corresponding distance from each of the fourth set of nodes to the compulsory entity in the first view.

22. A method according to claim 2 wherein said schema representation is updated as at least one new query is logged.

* * * * *